US007627512B2

(12) United States Patent
Harris et al.

(10) Patent No.: US 7,627,512 B2
(45) Date of Patent: Dec. 1, 2009

(54) ASSET AND LIABILITY MODELING TOOL

(75) Inventors: Trevor Samuel Harris, Closter, NJ (US); Richard Graham Foster, Haslemere (GB); David John Braben, Cambridge (GB); Jonathan Stanley Roach, Cambridgeshire (GB); Marc Daniel Donner, New York, NY (US); Matthew P. Thomas, Rye, NY (US)

(73) Assignee: Morgan Stanley, New York, NY (US)

( * ) Notice: Subject to any disclaimer, the term of this patent is extended or adjusted under 35 U.S.C. 154(b) by 486 days.

(21) Appl. No.: 11/389,962

(22) Filed: Mar. 27, 2006

(65) Prior Publication Data

US 2007/0239572 A1 Oct. 11, 2007

(51) Int. Cl.
*G06Q 40/00* (2006.01)

(52) U.S. Cl. .................. 705/36; 705/36 R; 705/35

(58) Field of Classification Search .................. 705/35, 705/36

See application file for complete search history.

(56) References Cited

U.S. PATENT DOCUMENTS

| | | | |
|---|---|---|---|
| 2002/0138386 A1 | 9/2002 | Maggioncalda et al. | |
| 2003/0126054 A1 | 7/2003 | Purcell, Jr. | |
| 2004/0267651 A1 | 12/2004 | Jenson et al. | |
| 2005/0273414 A1 | 12/2005 | Michaud et al. | |
| 2006/0010060 A1* | 1/2006 | Jones et al. | 705/35 |
| 2007/0100749 A1* | 5/2007 | Bachu et al. | 705/42 |

OTHER PUBLICATIONS

Richard Foster, et al, U.S. Appl. No. 11/784,968, filed Apr. 10, 2007, Asset and Liability Modeling Tool.
Pamela Brewster et al, *Ranking the Vendors of Wealth Management Technology 2002: Financial Planning & Advice*, pp. 3-61, Oct. 2002.
Peter H. M. P. Roelofsma, *Methodological and Theoretical Contributions to the Study of Time Preference*, Leeds University Business School.
Marc C. Steinbach, *Markowitz Revisited: Mean-Variance Models in Financial Portfolio Analysis*, SIAM Review, vol. 43(1), pp. 31-85, 2001.
Michael J. Brennan, et al, *Strategic Asset allocation*, Journal of Economic Dynamics and Control, vol. 21, pp. 1377-1403, 1997.

(Continued)

*Primary Examiner*—Kambiz Abdi
*Assistant Examiner*—Lindsay M. Maguire
(74) *Attorney, Agent, or Firm*—K&L Gates LLP

(57) ABSTRACT

A method of displaying results of a financial model for forecasting at least one financial variable relating to a client. The method comprises the steps of receiving asset and liability data regarding the client; generating forecasted values for the financial variables over a number of simulations using the asset and liability data; and displaying a topographical chart on a user interface. The topographical chart may be positioned on a plane shown in the user interface. The plane may be defined by a time axis and a value axis for the at least one financial variable, such that a coordinate set on the plane represents the value of the at least one financial variable at a time point. The height of a first point on the topographical chart corresponding to the coordinate set may indicate a portion of the simulations that result in the coordinate set.

24 Claims, 52 Drawing Sheets
(49 of 52 Drawing Sheet(s) Filed in Color)

OTHER PUBLICATIONS

*Breakthrough Technology Platforms to Provide Merrill Lynch Financial Advisors with Most Advanced Tools for Client Service*, Press Release dated Nov. 12, 2002.

M.C. Janssen et al, *Preference-Based Asset Liability Management*, pp. 1-28, Mar. 2, 2000.

Lauren Barack, *If You Build It, Will They Come? Can a Calculator with a Las Vegas Jingle Make Clients Trust Their Brokers More?*, On Wall Street, pp. 1-4, Jun. 1, 2005.

Li-Yong Yu et al, *Stochastic Programming Models in Financial Optimization: A Survey*, Advanced Modeling and Optimization, vol. 5(1), pp. 1-26, 2003.

Roy Kouwenberg et al, *Stochastic Programming Models for Asset Liability Management*, Working Paper 01-01, Hermes Center of Excellence on Computational Finance & Economics, University of Cyprus, pp. 1-72, May 2, 2001.

Andrea Consiglio et al, *The Value of Integrative Risk Management for Insurance Products with Guarantees*, The Wharton School Financial Institutions Center, pp. 1-17, Mar. 22, 2001.

Andrea Consiglio, et al, www.Personal_Asset_Allocation, Working Paper 01-21, Hermes Center of Excellence on Computational Finance & Economics, University of Cyprus, pp. 1-31, Jan. 22, 2002.

Andrea Consiglio, et al, www.Personal_Asset_Allocation, Working Paper 01-xx, Hermes Center of Excellence on Computational Finance & Economics, University of Cyprus, pp. 1-32, Sep. 5, 2002.

Ziemba et al, *InnoALM: An Innovest Austrian Pension Fund Financial Planning Model*, University of British Columbia, Joint paper with Alois Geyer, University of Economics, Vienna, Austria, Wolfgang Herold and Konrad Kontriner, Innovest, Vienna, Austria, pp. 1-44.

David R. Carino, et al, *The Russell-Yasuda Kasai Model: An Asset/Liability Model for Japanese Insurance Company Using Multistage Stochastic Programming*, Interfaces 24(1), pp. 29-49, Jan.-Feb. 1994.

Stefania Baglioni, et al, *An Evolutionary Approach to Multiperiod Asset allocation*.

Adam J. Berger, et al, *The Home Account Advisor™, Asset and Liability Management for Individual Investors*, pp. 634-665.

Dimitris Bertsimas, et al, *Portfolio Construction Through Mixed-Integer Programming at Grantham, Mayo, Van Otterloo and Company*, Interfaces 29(1), pp. 49-66, Jan.-Feb. 1999.

John R. Birge, *Stochastic Programming Models in Asset-Liability Management*, Northwestern University, Power Point Presentation, pp. 1-15.

John R. Birge, *Using Stochastic Programming Problem Structure to Gain Computational Efficiency*, Northwestern University, Power Point Presentation, pp. 1-33, Jan. 23, 2003.

Zvi Bodie, *Thoughts on the Future: Life-Cycle Investing in Theory and Practice*, Financial Analysts Journal, pp. 24-29, Jan./Feb. 2003.

David R. Carino, et al, *Multiperiod Asset allocation*, Russell Research Commentary, pp. 1-23, Oct. 1997.

David Carino, *Refinements in Multi-Period Attribution*, The Journal of Performance Measurement, pp. 45-53, Fall 2002.

Dean Barr, *Preference Driven Optimization Under Non Mean-Variance Assumptions*, Deutsche Asset Management, Aug. 1, 2001.

Andrew Capon, *The Accidental Money Manager—II Magazine Platinum*, Institutional Investor Magazine, pp. 1-12, May 1, 2002.

M.A.H. Dempster, et al, *Global Asset Liability Management*, Presented to the Institute of Actuaries, Nov. 25, 2002, pp. 1-53.

M. Germano, et al, *Global Asset Liability Management*, Abstract of the Discussion, pp. 1-26.

S. Arbeleche, et al, *Portfolio Management for Pension Funds*, University of Cambridge, Center for Financial Research, Judge Institute of Management Research Papers in Management Studies, Working Paper May 2003, 10 pages.

M.A.H. Demster, et al, *Stochastic Modelling and Optimization using Stochastics™*, forthcoming in *Applications of Stochastic Programming*, S.W. Wallace & W.T. Ziemba, eds., MPS-SIAM Series in Optimization, 2002, pp. 1-31.

Jerome B. Detemple, et al, *A Monte Carlo Method for Optimal Portfolios*, pp. 1-62.

Sibrand J. Drijver, et al, *Asset Liability Management Modeling Using Multi-Stage Mixed-Integer Stochastic Programming*, pp. 1-17, Sep. 2000.

*ESPLannerPro™ Tutorial*, Economic Security Planning, Inc., pp. 1-72, Copyright 1999-2003.

Jaime Punishill, et al, *Grading Advisors' Planning Tools*, Forester Research, Inc., pp. 1-3, Sep. 26, 2002.

Jaime Punishill, et al, *How Financial Advisors Use Technology*, Forrester Research, Inc., pp. 2-20, Dec. 2002.

Milton Friedman, et al, *the Utility Analysis of Choices Involving Risk*, The Journal of Political Economy, vol. LVI, No. 4, pp. 279-304, Aug. 1948.

*Industry Can Rid Itself of the Loser's Game—Alan Brown Argues that the Usual Asset/Liability Study is a Myopic Process of Little Value and Proposes Alternative Dynamic Strategies*, FT Report—FT Fund Management: Portfolio, pp. 1-2, May 17, 2004.

Jacek Gondzio, et al, *High Performance Computing for Asset Liability Management*, pp. 1-23, May 21, 1999, revised Mar. 29, 2000.

Pieter Klaassen, *Solving Stochastic Programming Models for Asset/Liability Management using Iterative disaggregation*, pp. 1-36, Mar. 1997.

Peter J. Crosbie, et al, *Modelino Default Risk*, KMV, LLC, pp. 1-34, Release Date: Nov. 15, 1993, Revised: Jan. 14, 2002.

Stephen Kealhofer, et al, *Portfolio Management of Default Risk*, KMC, LLC, pp. 1-32, Release Date: Nov. 15, 1993, Revised: May 31, 2001.

Martin Leibowitz, et al, *Contingent Immunization—Part I: Risk Control Procedures*, Financial Analysts Journal, pp. 17-31, Nov.-Dec. 1982.

Martin Leibowitz, et al, *Contingent Immunization—Part II: Problem Areas*, Financial Analysts Journal, pp. 35-50, Jan.-Feb. 1983.

Harry Markowitz, *The Utility of Wealth*, Cowles Foundation Paper 57, Reprinted from The Journal of Political Economy, vol. LX, No. 2, pp. 151-158, Apr. 1952.

*Merrill Lynch Announces Investment Advisory Service for Individuals in Retirement Plans*, Merrill Lynch & Co., Inc. Press Release, Oct. 9, 2002.

Robert C. Merton, *Lifetime Portfolio Selection Under Uncertainty: The Continuous-Time Case*, The Review of Economics and Statistics, vol. LI, No. 3, pp. 247-257, Aug. 1969.

Robert C. Merton, *Thoughts on the Future: Theory and Practice in Investment Management*, Financial Analysts Journal, pp. 17-23, Jan.-Feb. 2003.

John M. Mulvey, *Multi-Stage Optimization for Long-Term Investors*, Department of Operations Research and Financial Engineering, Bendheim Center for Finance, Princeton University, pp. 1-20. Sep. 2000.

John M. Mulvey, *Multi-Stage Investment Models for Long-Term Investors*, Department of OR and Financial Engineering, Bendheim Center for Finance, Princeton University, 42 pages, May 2001.

John M. Mulvey, et al, *Rebalancing Strategies for Long-Term Investors*, Department of Operations Research and Financial Engineering, Bendheim Center for Finance, Princeton University, pp. 1-18, Mar. 20, 2001.

John M. Mulvey, et al, *The Towers Perrin Global Capital Market Scenario Generation System*, pp. 499-528.

Mehndi Pirbhai, *Asset-Liability Management (ALM) Using Stochastic Programming (SP)*, pp. 1-14.

ISR and Written Opinion, PCT/US2007/65252, Mar. 27, 2007.

\* cited by examiner

ASSET AND LIABILITY MODELING TOOL

STATEMENT UNDER 37 C.F.R. § 1.84(a)(2)

The patent or application file contains at least one drawing executed in color. Copies of this patent or patent application publication with color drawings will be provided by the Office upon request and payment of the necessary fee.

BACKGROUND

There is a present need in asset management to move towards "liability-led investing" at the individual and/or household level. Currently, there is an observable trend for governments and corporations to push the responsibility for pension and healthcare liability management and financing back to the individual because existing arrangements for their funding are either unaffordable or the financing risk is too high. Consequently, it has become increasingly important for individuals to accurately model their financial condition into the future in order to plan for multiple goals such as retirement, college education for children, etc.

Such modeling is a challenging task. Most individuals have multiple future goals, some flexibility in the timing and acceptable spend of those future goals (e.g., they can retire earlier or later; retire on a higher or lower retirement income) and dynamic goal priorities (e.g., will trade-off goals differently depending on the likely level of spend). Dependencies between these goals go forwards and backwards in time. For example, if an individual (or household) spends more on their children's education, he or she will have less to support retirement. On the other hand, if the individual retires later, he or she may be able to afford to spend more on their children's education today.

On top of this wide array of goals and related choices, individuals (and households) face uncertainty about their future income, future expenses, and even how long they are going to live. For example, there is uncertainty about an individual's future earned income, social security receipts, Medicare benefits and returns on their savings and investments. There is also uncertainty about an individual's future expenditures on healthcare, nursing care, residential care, etc. There is a risk the individual may die young. Under those circumstances, they want to be sure their family is provided for. There is also a risk the individual may live a long time. In that case, they want to be sure that they have enough assets to support them through a very long retirement, where healthcare costs may be high.

When considering assets, liabilities, goals, and the uncertainties of life, people care about every outcome. There are, however, too many variables for any individual, no matter how intelligent, to solve the problem in all of its complexities and find comprehensive answers. Most individuals solve the problem serially. For example, if they have enough money, they will send their children to a particular school without a thorough understanding of how that would affect their retirement age or spend, or how it would impact their family if they were to die unexpectedly.

There are existing tools for modeling an individual's financial situation, however, they do not fully address the problem. In general, existing tools focus on funding individual goals and ignore the interactions and time dependencies between cashflows and their priorities. They ignore unforeseen events such as health events or the need for long-term care. These existing tools assume that the only risk decision to be made by the individual is how much risk to take in the investment portfolio. They therefore focus the individual on expected portfolio returns, or the degree of investment risk needed to meet that single goal. They do not help the individual assess the nature of the risks to their meeting their set of goals, nor help them understand the nature and consequences of the choices they have, of which investment risk is but one.

BRIEF SUMMARY OF THE INVENTION

In one general aspect, the present invention is directed to a method for displaying the results of a financial model to allow visual assessment of a client's future financial condition in an interactive, timely content-rich manner. The financial model may be generated by a financial modeling tool that captures a comprehensive set of future financial variables for the individual (e.g., cashflows, liabilities etc.), and the uncertainty and range of possible outcomes for each. The financial model is displayed in a manner that provides a way of visualizing the possible outcomes that enable the individual to understand that range, and understand the consequences on the outcomes of different choices they have. In so doing, the model may focus individuals on risk management with respect to their future goals, not simply on investment returns. In addition, the financial model, in various embodiments, may make financial planning more attractive to individuals by allowing for the generation of an approximate model based on abbreviated input data, for example, a set of input data that may be entered on a single screen. The abbreviated input model enables the individual to provide accurate input data whilst engaged in reviewing the results, as opposed to providing comprehensive input data prior to reviewing the output. This may provide an incentive for individuals to engage in the often complex and time consuming process of creating a full financial model.

The financial model models the client's future financial condition over a given time period (e.g., a life, the life of a household, etc.) by generating a likely range of forecasted values over the time period for one or more financial variables describing the client. Exemplary financial variables include, net worth, liquid assets, investable assets, outflow, annual cashflow, available net worth (i.e., balance sheet and cashflow items), etc. In various embodiments, the financial model may include a number of computer simulations of the time period. Each computer simulation may generate a set of possible forecasted values for the financial variable or variables over the time period. The aggregate of the sets of values from all of the simulations forms the results of the financial model (e.g., a distribution of possible outcomes for the client).

The results of the financial model may be displayed as a graphical representation, which may display results for some or all of the modeled financial variables so that the client can gain a visual understanding of their prospective financial condition and gain insight as to the consequences of different available choices. The graphical representation may take the form of a topographical chart positioned on a plane defined by a time axis and a value axis, such that values of the financial variables over time may be plotted on the time and value axis. Each coordinate set on the axes may correspond to a point on the topographical chart. The height of the points on the topographical chart indicates the likelihood that the displayed financial variable will take the value and time indicated by the corresponding coordinate sets. For example, the height of the points may indicate the number of simulations that result in a value and time of the displayed financial variable or variables represented by the corresponding coordinate set. In various embodiments, the color of points on the topographical chart also indicates the likelihood that the displayed financial variable will take the value and time of the corresponding coordinate sets (e.g., how many of the simulations result in the corresponding coordinate sets). For example, more intense colors may indicate a larger portion of the simulations. In that way, the height, color, and intensity of points on the topographical chart may be indicative of the probability that the forecasted variables will have the value and time of the corresponding coordinate sets. The color of points on the topographical chart may also indicate whether the represented value of the financial variable is positive or negative. For example, negative values of the financial variable or variables (e.g., values indicating that the client will lack financial means) may be red while positive values may be green.

The graphical representation may also comprise representations of one or more goals of the client at a point or points in time. Each goal may represent an expenditure or other financial event that the client would like to achieve in the future. Each representation indicates a portion of the simulations where the goal is achieved. Also, selecting the representation of the goal may allow detailed information about the goal to be viewed and/or edited. Where the goal is a retirement goal, the time after retirement may be partitioned into a plurality of time blocks. The success of the retirement goal, (e.g., whether the client has enough assets and/or income to meet desired consumption levels) may be indicated for each time block. The user may be able to drag a goal on the topographical chart so as to adjust the time horizon for the goal. The simulations may be accordingly regenerated to determine the likelihood of achieving the goal given the revised horizon. The user may also be able to analyze the graphical representation. For example, placing a cursor over the representation at various points in time may display information over the various simulations (e.g., the distribution of possible outcomes at that point in time, states of the client, etc.) In various embodiments, the user may manipulate the viewing angle of the graphical representation using navigation buttons.

The user of the financial modeling tool may be the client itself (e.g., a business entity, individual, or household), or in various embodiments, may be a financial advisor or other representative working on behalf of the client.

BRIEF DESCRIPTION OF THE FIGURES

Embodiments of the present invention are described herein, by way of example, in conjunction with the following figures, wherein.

DETAILED DESCRIPTION OF THE INVENTION

Figure 32:
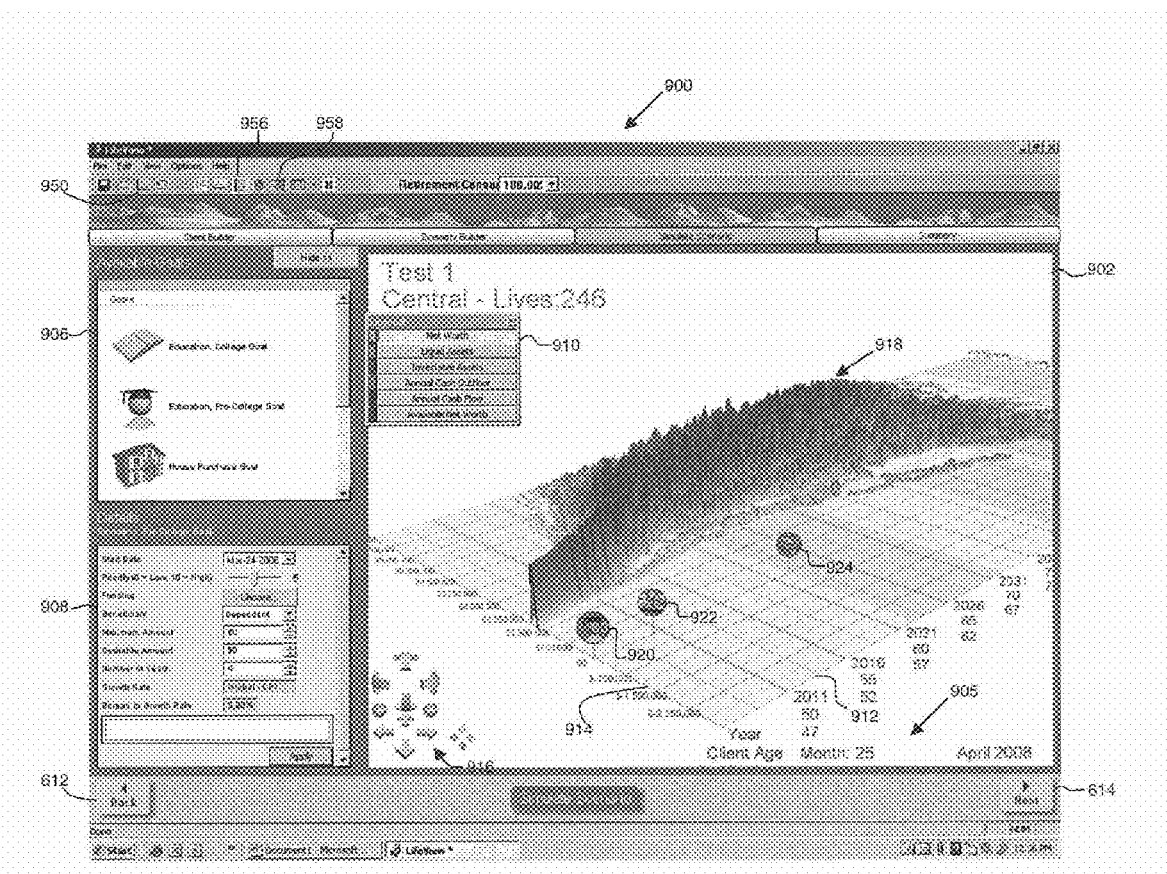

Embodiments of the present invention are directed in general to a financial modeling software tool that allows a user to generate a financial model of the possible future financial condition of an individual or household (e.g., a client) based on current data and assumptions about the future. The financial model models the clients' future financial condition by forecasting the values of one or more financial variables such as, for example, net worth, liquid assets, investable assets, outflow, annual cashflow, available net worth, etc. The model may be generated using any suitable modeling method or methods for simulating asset returns and stochastic liabilities (e.g., a Monte Carlo method) and may be based on input data and assumptions specific to the client. Results of the model may be presented to a user of the financial modeling tool and/or clients in a visual, interactive and content-rich manner. For example, the results may be displayed on a topographical chart, as shown in FIG. 32, where the height of each point on the chart indicates the probability that a displayed financial variable or variables will have the value and time indicated by coordinates of the point (e.g., the height at a point corresponding to a million dollars at a given time in the future may indicate the likelihood that the client's net worth will be one million dollars at the given time). Before detailing screen shots of an exemplary user interface allowing the user to input data and set future assumptions, and before detailing the visual, interactive output, a few words are needed about the environment and workflow in which the system may be used.

Figure 1:
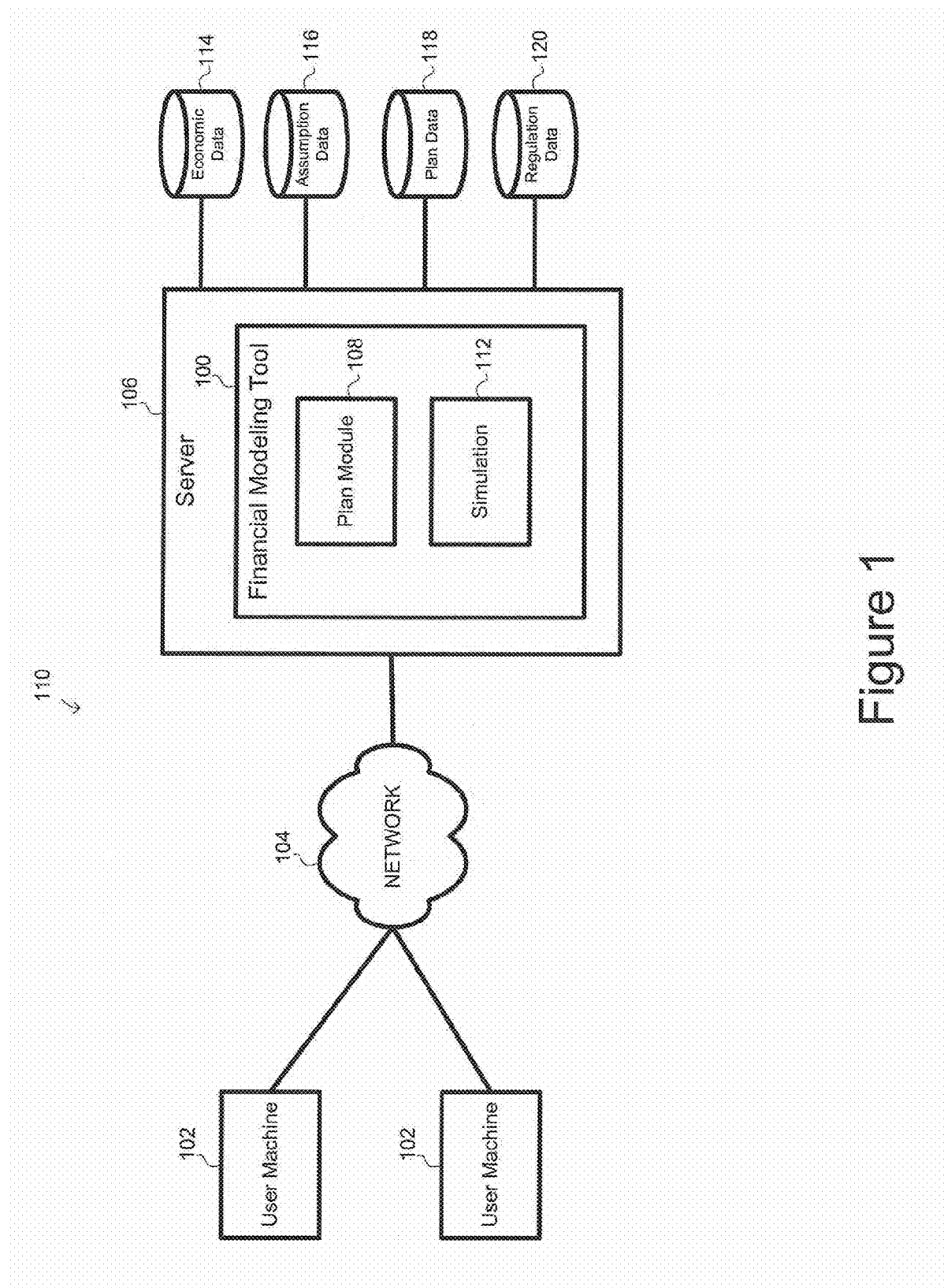
FIG. 1 shows a block diagram of a system for implementing a financial modeling tool.

FIG. 1 shows a diagram of a computer system 110 for implementing a financial modeling software tool 100 according to various embodiments of the present invention. The system 110 includes a server 106 in communication with one or more user machines 102 via a network 104, which may be any suitable wired or wireless communication network including, for example, a LAN or a WAN. The financial modeling tool 100, may be a software program executed by the server 106, and may include a plan module 108 and a simulation module 112. The plan module 108 may provide one or more user interfaces that allow a user of the tool 100 to enter input data that is used as input to develop the model. In various embodiments, the plan module 108 may provide the user interfaces to the user machines 102, prompting the user to enter the input information, for example, interfaces 600, 300, and 700 described below.

Various input data for developing the model may be stored in databases 114, 116, 118, 120. The input data may be received from a user, for example, via plan module 108, or may be received from an outside source, such as a subscription service, etc. Plan database 118 may store financial information about the client including, for example, income, asset, and liability information. The plan database 118 may also store goal information for the client, as described in more detail below. In various embodiments, the plan database 118 may include data about a client entered through the plan module 108 in a current or previous session, as well as generic or stock data that may be applied to multiple clients. Assumption database 116 may include data describing assumptions that may be used when developing the model. Exemplary assumption data includes, the loss tolerance of the client (e.g., the client's tolerance for one year losses on their investment portfolio), the tax status of the client, the transaction costs for buying and selling assets, etc. Other examples of assumption data may include actuary tables or other data for modeling states of the client (e.g., date of death, disability state, etc.). Assumption data may be entered through the plan module 108 or may be default data that may be applied to multiple clients, such as, for example, default transaction costs, default retirement consumption adjustments, etc.

An economic database 114 may include data describing historical economic performance that may be considered in generating the model. For example, the database 114 may include data describing the historic trends of the stock market, interest rates and the related expected asset returns, volatilities and covariances, etc. Regulation database 120 may include information describing various laws and regulations that may affect the model including, for example, tax codes, securities laws and regulations, etc. Data stored at the economic and regulation databases 114, 120 may be received from one or more data subscription services.

The simulation module 112 may model the possible range of the client's forecasted financial condition over the chosen time period considering the input data stored in databases 114, 116, 118, 120. The time period may be, for example, the client's expected life. In various embodiments, the simulation module 112 may model the range of the client's forecasted financial condition according to a Monte Carlo technique, for example, by simulating both asset returns and stochastic liabilities, in the context of desired future cashflows (e.g., the amounts required for the client to meet future goals and expenses). For each simulation, the simulation module 112 may generate output values for the financial variables over one instance of the time period, considering the input data, assumptions and other constraints.

In various embodiments, each simulation may generate values of the financial variables based on assumptions regarding states of the client, and/or the economy at large. For example, each simulation may generate a date of the client's death; whether and, if so, when the client experiences a disability; whether and, if so, when the client requires long term care; etc. Each simulation may also assume future economic trends regarding, for example, the stock market, interest rates, etc. The states assumed by any particular simulation may be randomly generated, but based on the likelihood of the states occurring, for example, as shown by actuary tables, assumptions, or other input data/constraints. For example, if the statistical data indicates that there is a 5% chance that the client will experience a disability at age 40 and a 10% chance that the client will experience a disability at age 50, then approximately 5% of the total number of simulations may assume a disability at age 40 and approximately 10% will assume a disability at age 50.

It will be appreciated that, in various embodiments, the values for the financial variables generated during each simulation may reflect the dependency and/or covariance of the financial variables on each other. For example, the values for asset returns, interest rates and inflation rates generated by any given simulation may allow for the historic co-variance of those variables. Also, the simulations may generate values of future earned income that covary with the financial variables representing economic state and inflation rates. In addition, each simulation may model actuarial co-variances (e.g., a different likelihood of needing long-term care if disabled; different life expectancy depending on health status).

The aggregate of the sets of values from all of the simulations may be displayed to the user and/or the client as a topographical chart or other graphical representation, for example, shown by user interfaces 900 and 1000 of FIGS. 32-46 and described in more detail below. The topographical chart may show results for one financial variable at a time, or may show results for numerous financial variables simultaneously.

It will be appreciated that in various embodiments, some or all of the software program of the financial modeling tool 100 may be executed by components of the network 110 other than the server 106. For example, user machines 102 may contain some or all of the software of the financial modeling tool 100. In such embodiments, the user machines 102 may access the databases 114, 116, 118, 120 via server 106, or may, in various embodiments, each include local copies of the databases 114, 116, 118, 120. It will also be appreciated that the databases 114, 116, 118, 120 may be implemented using any number of physical or logical storage devices.

Figure 1A:
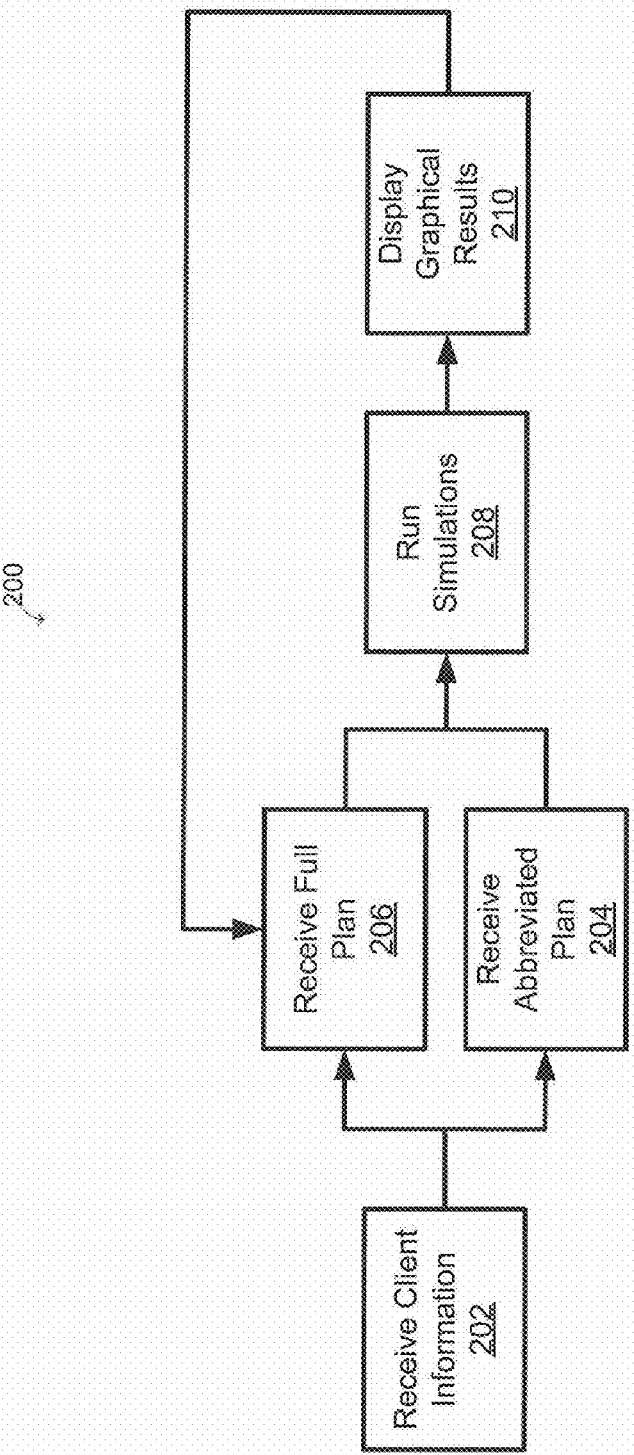
FIG. 1A shows an exemplary workflow for use with a financial modeling tool.

FIG. 1A shows an exemplary workflow 200 of the financial modeling tool 100 according to various embodiments. At box 202, the tool 100 may receive information about the client that will be the subject of the model. The information may include information about an individual client, or information about the client's household including, for example, a spouse or other co-client and children. An exemplary user interface 600 for receiving the client information is shown in FIGS. 2-5 as described below.

From step 202, the client, and/or the user of the financial modeling tool 100, may choose to enter an abbreviated plan at box 204 or a full plan at box 206. Entering a full plan at box 206 may include entering detailed plan and assumption information about the client including the client's income, assets, liabilities, goals, etc., for example, at user interface 700 shown at FIGS. 7-31. It will be appreciated that entering a full plan may be complex and time consuming. Accordingly, the client and/or user may alternatively enter an abbreviated plan at box 204 that may include less information or less detailed information about the client than is entered in a full plan. An exemplary user interface 300 for receiving an abbreviated plan is shown below in FIG. 5. When an abbreviated plan is received, data for generating the outcomes may be collected from the client in a single screen, rather than requiring the user to enter information at multiple screens. The plan module 108 and/or the simulation module 112 may supplement the abbreviated plan by estimating additional information needed to run the simulations.

At step 208, the simulation module 112 may run one or a series of simulations of the client's life based on the information received at steps 202, 204 and/or 206. Results of the simulations may be displayed at box 210, for example, as one or more of the graphical representations shown at interface 900 in FIGS. 32-46. It will be appreciated that simulations run based on full plans may generate more accurate results than those run based on abbreviated plans. It will also be appreciated that even some full plans can be made to result in more accurate simulations by entering additional and/or more accurate information. For example, if the client and/or user enters a full plan at box 206, but does not enter a particular set of assets, then the accuracy of the resulting simulations will suffer. Accordingly, when the results of the simulations are shown at box 210, the user and/or client may have the option of creating or supplementing a full plan at box 206. The new full plan may then be used by the simulation module 112 to generate more accurate simulations.

Clients are sometimes reluctant to enter or provide a user (e.g., a financial analyst) with enough financial and/or personal information for the simulation module 112 to generate its most accurate simulations. For one thing, gathering and entering the sheer volume of desirable information may take a long time. For another, the client may be hesitant to provide detailed information to a financial analyst with whom they may not have an established relationship, or who may not manage all of their assets. Accordingly, the financial modeling tool 100 may be used to motivate the client to disclose and/or enter as much information as possible. For example, the client may enter and/or disclose to a user only the information necessary for an abbreviated plan. Based on the outcomes of the simulations from the abbreviated plan, however, the client may become quickly engaged by the resulting graphical representation of the output and may be more motivated to provide additional and/or more accurate information as required to further understand the impacts on the output. It will be appreciated that subsequent outputs and graphical representations based on the additional and/or more accurate information may themselves be more accurate. The client and/or the user may then begin to create or supplement a full plan by entering the additional data and re-running the financial model. In this way, the financial modeling tool 100 may move away from the linear logic of requiring a client to provide and/or enter all input information before the client can become engaged in the model's output.

FIGS. 2-31 show embodiments of user interfaces 600, 300, 700 that may be provided to the user, for example, by the plan module 108 according to various embodiments to allow the user, at user machine 102, to enter input data about the client's assets and liabilities as well as future goals and other assumptions and constraints regarding the future. The input data entered through the user interfaces may then be considered by the simulation module 112 to generate models of the client's future financial condition, as discussed herein. Each of the interfaces 600, 300, 700 includes a navigation toolbar 602 and navigation buttons 612, 614 that may allow the user to navigate between the various screens. Toolbar 602 includes buttons or tabs that may allow the user to jump between various screens of the interfaces 600, 300, and 700. It will be appreciated that various interfaces 600, 300, 700 or screens therein may not function until prerequisite information has been entered at another screen and/or prerequisite calculations have been performed. For example, it may not be possible to enter a qualified employee contribution income type, as shown at FIG. 15, until a qualified asset has been added to receive the contribution, as shown at FIG. 9.

Figure 2:
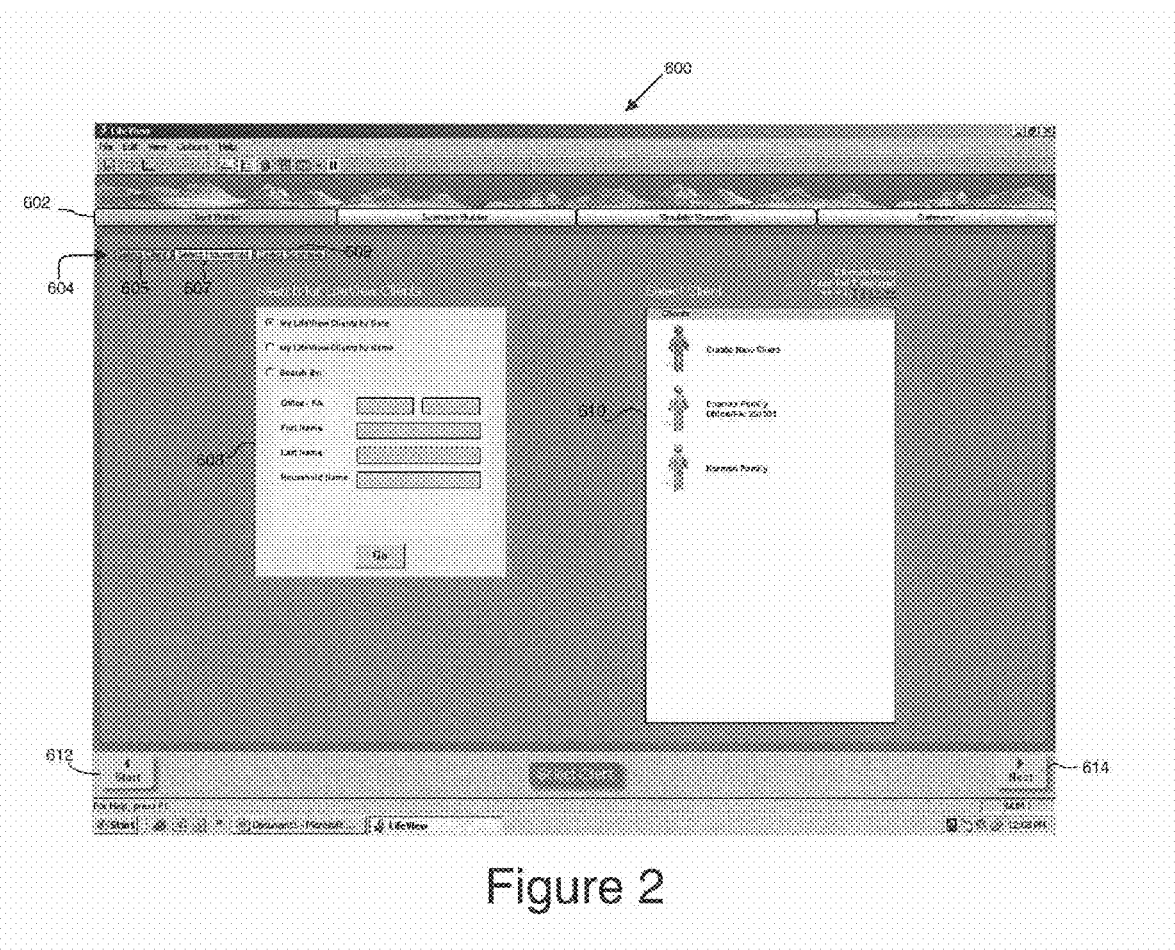
FIGS. 2-46 depict screen shots of user interfaces provided by a financial modeling tool according to various embodiments of the present invention.
Figure 3:
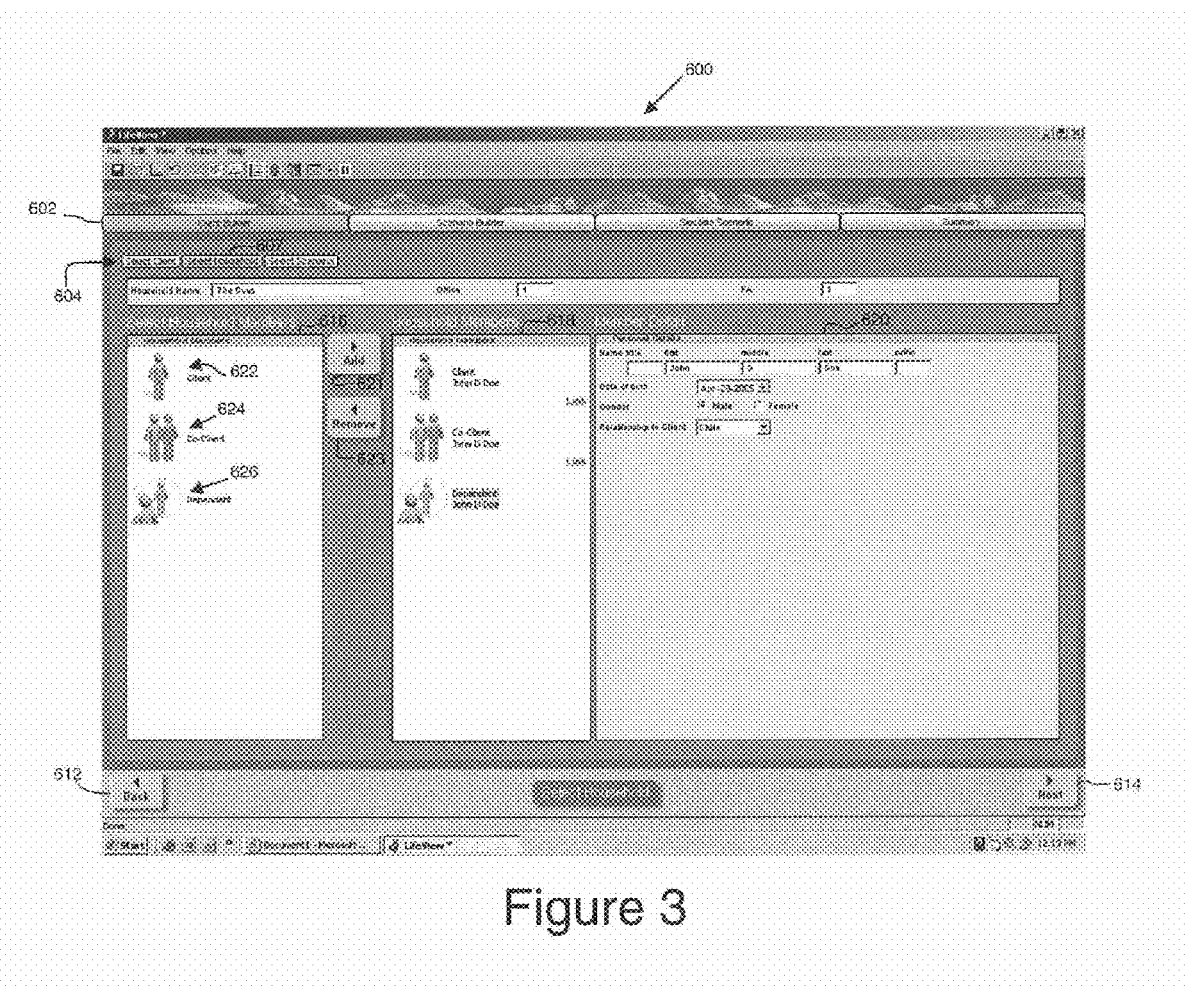
Figure 4:
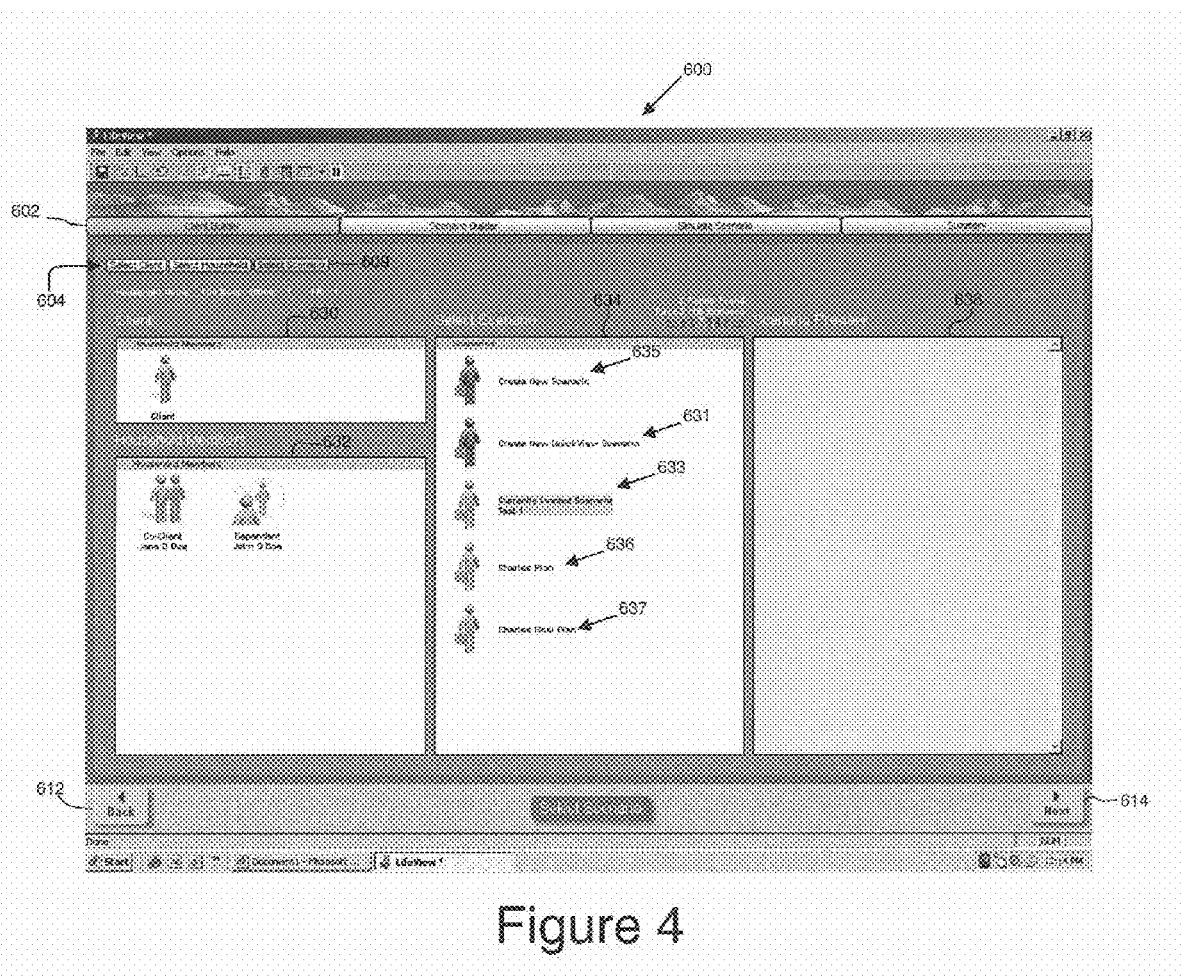

FIGS. 2-4 show embodiments of the user interface 600, according to various embodiments that may be provided to the user, for example, to prompt the user to enter and/or edit information about the client who will be the subject of the financial modeling tool 100. Again, as mentioned above, the user may be the client itself, or may be a financial advisor or some other representative of the client. The interface 600 includes an additional toolbar 604 having buttons or tabs 605, 607, 609 corresponding to different screens within the user interface 600. Selecting one of the buttons or tabs 605, 607, 609 causes the corresponding screen to appear. In FIG. 2, the Select Client button 605 has been selected, allowing the user to select an existing client, or create a new client. Field 608 allows the user to search existing clients by various criteria including, for example, recently accessed clients, office and financial analyst identifiers, names, household names, etc. The results of the search performed at field 608 may be shown at field 610. The user may select an existing client from field 610, or in various embodiments, may select an entry allowing the user to create a new client. Data about existing clients may be stored, for example, in plan database 118.

FIG. 3 shows the interface 600, according to various embodiments, with the Select Household button 607 selected. The financial modeling tool 100 may receive information regarding all members of the client's household. Household members presently associated with the selected client's household may be listed at field 618. For example, in the non-limiting embodiment shown in FIG. 3, the selected client's household includes the client, the client's spouse, and one dependent child. Selecting a particular household member from field 618 may enable detailed information corresponding to the selected household member to be entered and/or viewed at field 620. Additional household members may be added, or existing household members deleted, using field 616 and add/remove buttons 621, 623. Field 616 includes representations of various kinds of household members including, for example, a client 622, a co-client 624 (e.g., a spouse) and a dependent 626. Selecting one of the representations 622, 624, 626 and then selecting the add button 621 may add an instance of the selected type of household member to field 618. Likewise, selecting a household member from field 618 and then selecting the remove button 623 may remove that member from the selected client's household. Household members may also be added or removed from the client's household by selecting the appropriate icon and dragging it to or from field 618.

FIG. 4 shows the interface 600, according to various embodiments, with the Select Scenario button 609 selected. The client may be listed at field 630, and other members of the client's household may be listed at field 632. The user may select a plan for the client from field 634. The field 634 may include representations of various pre-existing plans 636, 637, which may be stored in database 118. The pre-existing plans may be plans generated for the client in an earlier session, or may be stock or example plans. Pre-existing plans may be stored, for example, at plan database 118. The user may select a currently loaded plan (e.g., if a plan is currently loaded) by choosing icon 633. Selecting a pre-existing plan 636, 637 or currently loaded plan 633 from field 634 may cause additional details of the plan to appear at plan preview field 638. The additional details may include the client's name, the other members of the client's household, the client's assets/liabilities, the client's goals, etc.

New plans may be generated by selecting one of the icons 631 and 635. The user may have the option to create and/or use a full plan by selecting icon 635 or an abbreviated plan by selecting icon 631. As described above, a full plan allows the user to enter detailed plan and assumption information about the client including the client's income, assets, liabilities, goals, etc. This information is then considered by the simulation module 112 in generating a model of the client's future financial condition. An abbreviated plan allows the user to enter less detailed financial information about the client, which may require substantially less time and effort. In various embodiments, data for the abbreviated plan may be entered in a single user interface screen such as, for example, user interface 300 shown in FIG. 5. The plan module 108 and/or the simulation module 112 then considers this less detailed information and may estimate additional information needed to generate the output. It will be appreciated that simulations run according to full plans may generate more accurate results than those run according to abbreviated plans. Seeing an output generated according to an abbreviated plan, however, may encourage the client to complete a full detailed plan by showing the client the impact of more precise data on the distribution of outputs.

Figure 5:
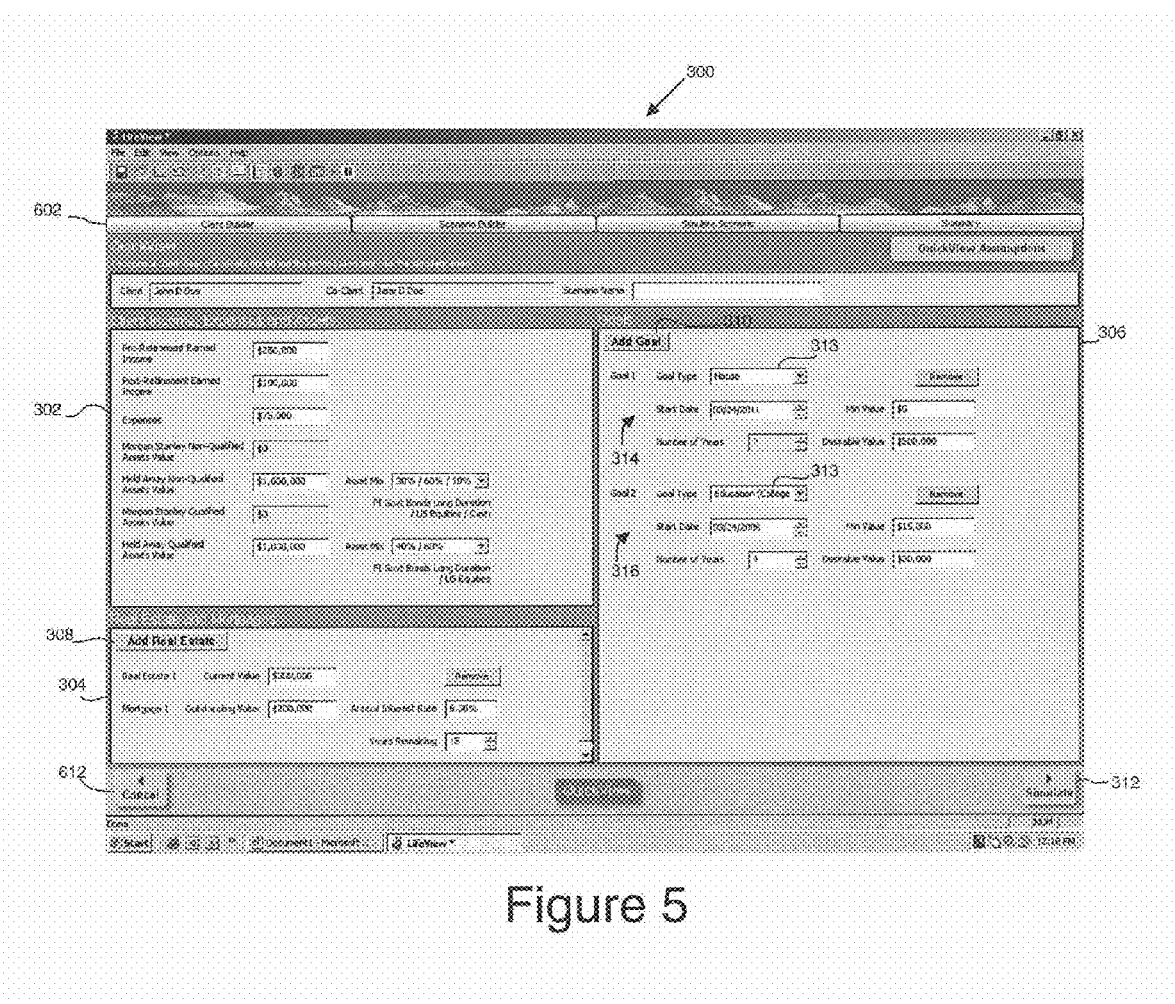

FIG. 5 shows an embodiment of a user interface 300, according to various embodiments, that may be provided to the user by the plan module 108 for receiving an abbreviated plan. The interface 300 includes a field 302 that allows the user to view and/or edit information relating to the client's income, expenses, and assets. Income items entered may include pre-retirement earned income and post-retirement earned income. Also, various asset types and values may be viewed and/or edited at field 302, such as, for example, qualified and non-qualified assets. The interface 300 also includes a real estate and mortgage field 304. The field 304 may allow the user to view and/or edit information about the client's real estate and any mortgage or mortgages on the real estate. Additional instances of real estate may be added by selecting box 308. The client's financial goals may be viewed and/or edited at field 306. Field 306 shows two goals, 314 and 316. Each goal may include a goal type, a start date, a duration, a minimum value, and a desirable value. The goals' type may be modified using drop-down window 313. Exemplary goal types include home purchase, college education, pre-college education, wedding, major purchase, etc. Additional goals may be added by selecting button 310. When appropriate information is entered at fields 302, 304 and 306, the user may select the Simulate button 312, causing the simulation module 112 to generate a model based at least in part on the information entered at interface 300.

FIGS. 6-30 show embodiments of a user interface 700, according to various embodiments, that may be provided to the user according to the plan module 108 for receiving a full plan. Like the interface 600, the interface 700 may include navigation toolbar 602 and navigation buttons 612, 614 for allowing the user to navigate between various screens of the user interfaces. The interface 700 may also include navigation toolbar 704 having buttons 705, 707, 709, 711, 713, 715, 717, 719, 721, with each button corresponding to one or more screens included in the user interface 700.

Figure 6:
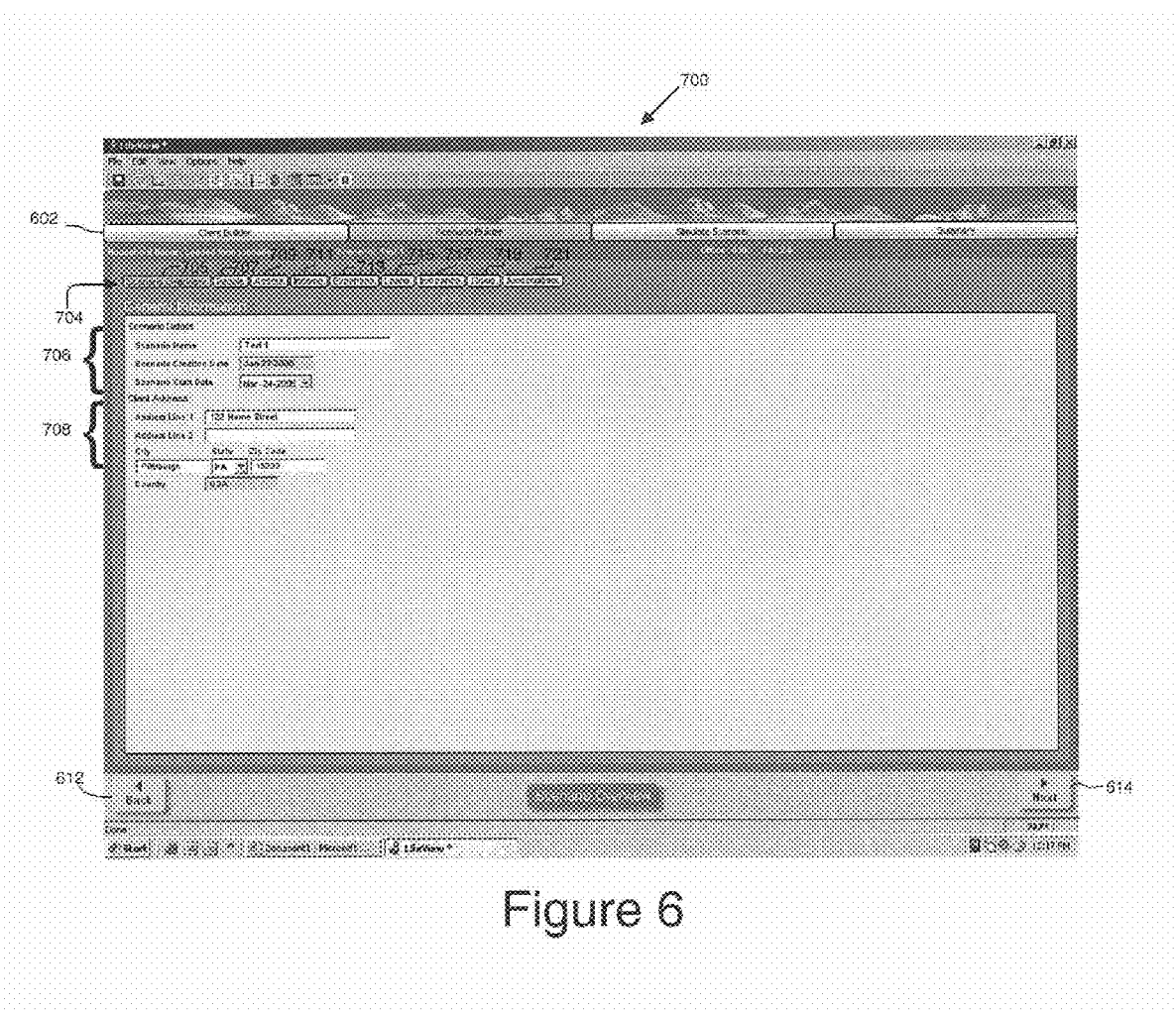
Figure 6A:
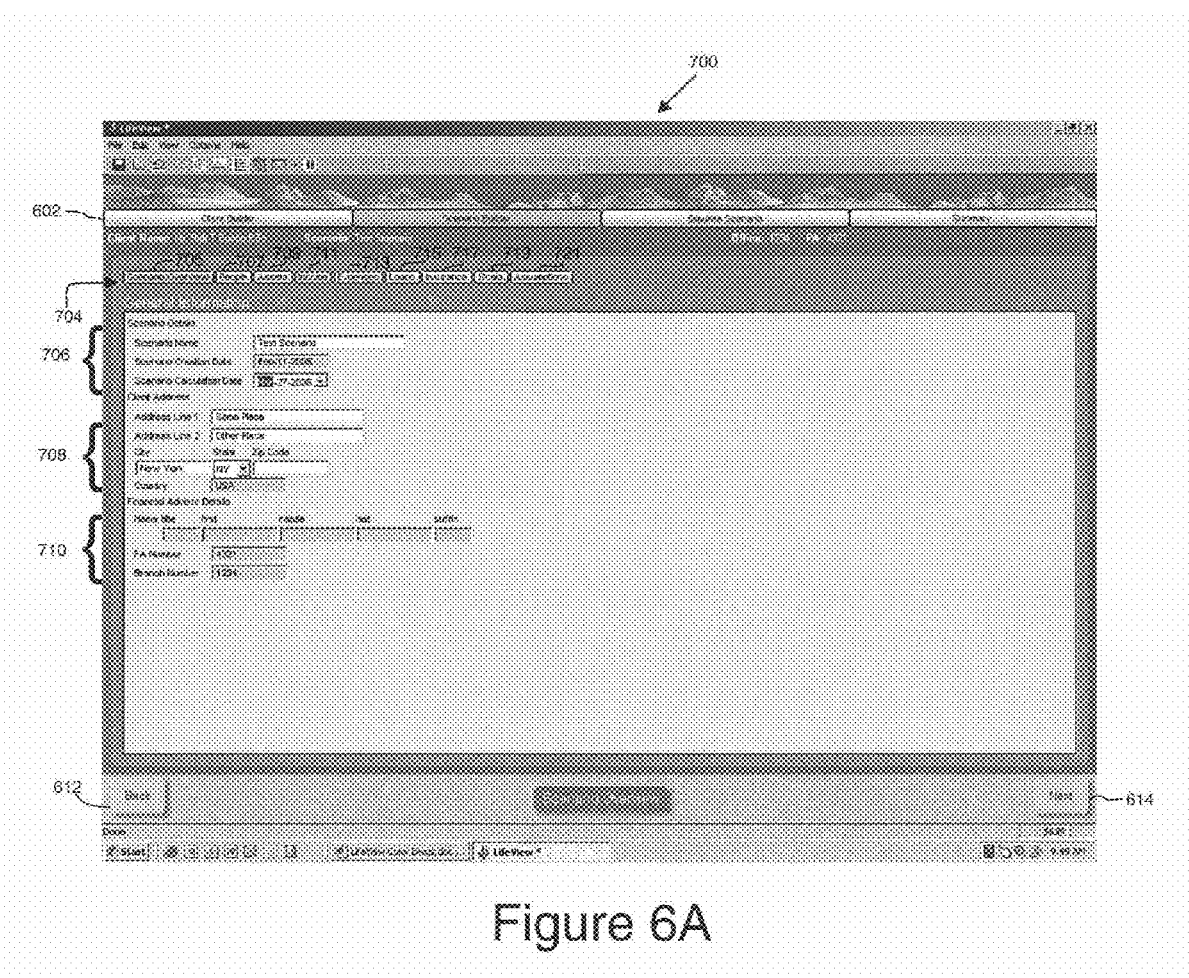

FIG. 6 shows the interface 700, according to various embodiments, with the Scenario Overview button 705 selected. Field 706 may allow the user to view and/or edit plan (e.g., scenario) details including, a plan name, plan creation date, plan calculation date, etc. In various embodiments, the user may also be able to edit other information at field 706 including, for example, the loss tolerance of the client (e.g., the tolerance of the client for one year losses in their investment portfolio). Field 708 may also allow the user to view and/or edit the client's address. In embodiments where the user is acting on behalf of the client, a field 710 (shown in FIG. 6A) may list information about the user including, for example, their name and other identifying information (e.g., a financial analyst number, a branch number, etc.).

Figure 7:
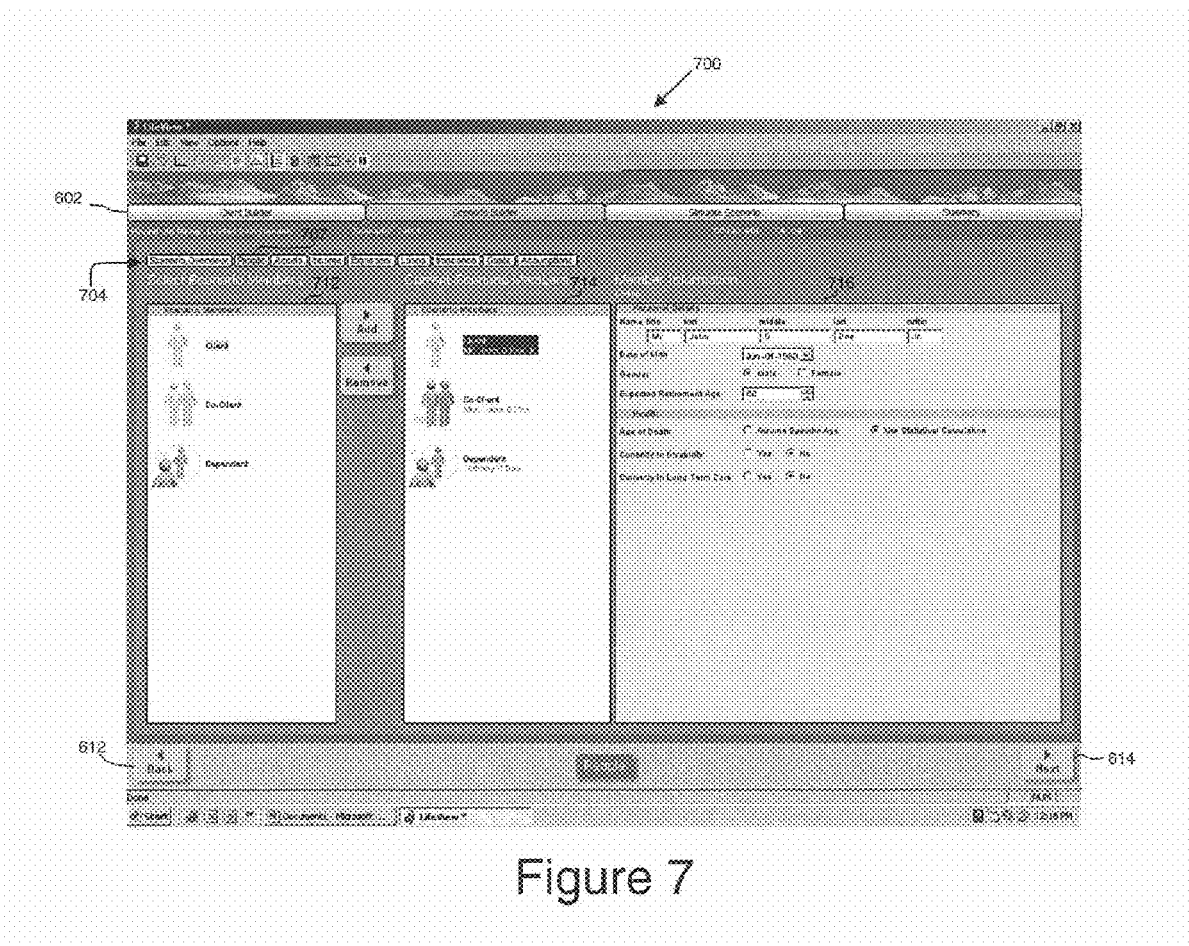

FIG. 7 shows the interface 700, according to various embodiments, with the People button 707 selected. This screen may allow the user to view and/or edit the members of the client's plan. The members of the client's plan may, or may not, be identical to the members of the client's household selected above with reference to interface 600. Referring back to FIG. 7, the current members of the client's plan may be listed in field 714, with detailed information about the selected plan member listed in field 716. Additional members may be added to the plan by selecting a member type from field 712 and using add/remove buttons 718 or by selecting the icon or representation of the member type and dragging it to field 714. Also, a plan member may be removed by selecting the icon for the plan member in field 714 and using add/remove buttons 718 or dragging the icon from field 714.

FIGS. 8-12 shows the interface 700, according to various embodiments, with the Assets button 709 selected. Icons representative of the various types of asset classes that may be held by the client are shown in field 720. Field 720 shows exemplary classes including, non-qualified, qualified, real estate, and physical assets. It will be appreciated, though, that in other embodiments, different asset classes may be used. Each asset class may have an associated tab 724, 726, 728, 730 in field 722. The user may access the tab by selecting it, or by selecting the representation of the associated asset class from field 720. Selecting the applicable tab 724, 726, 278, 730 allows data about the corresponding asset to be entered, as shown below.

Figure 8:
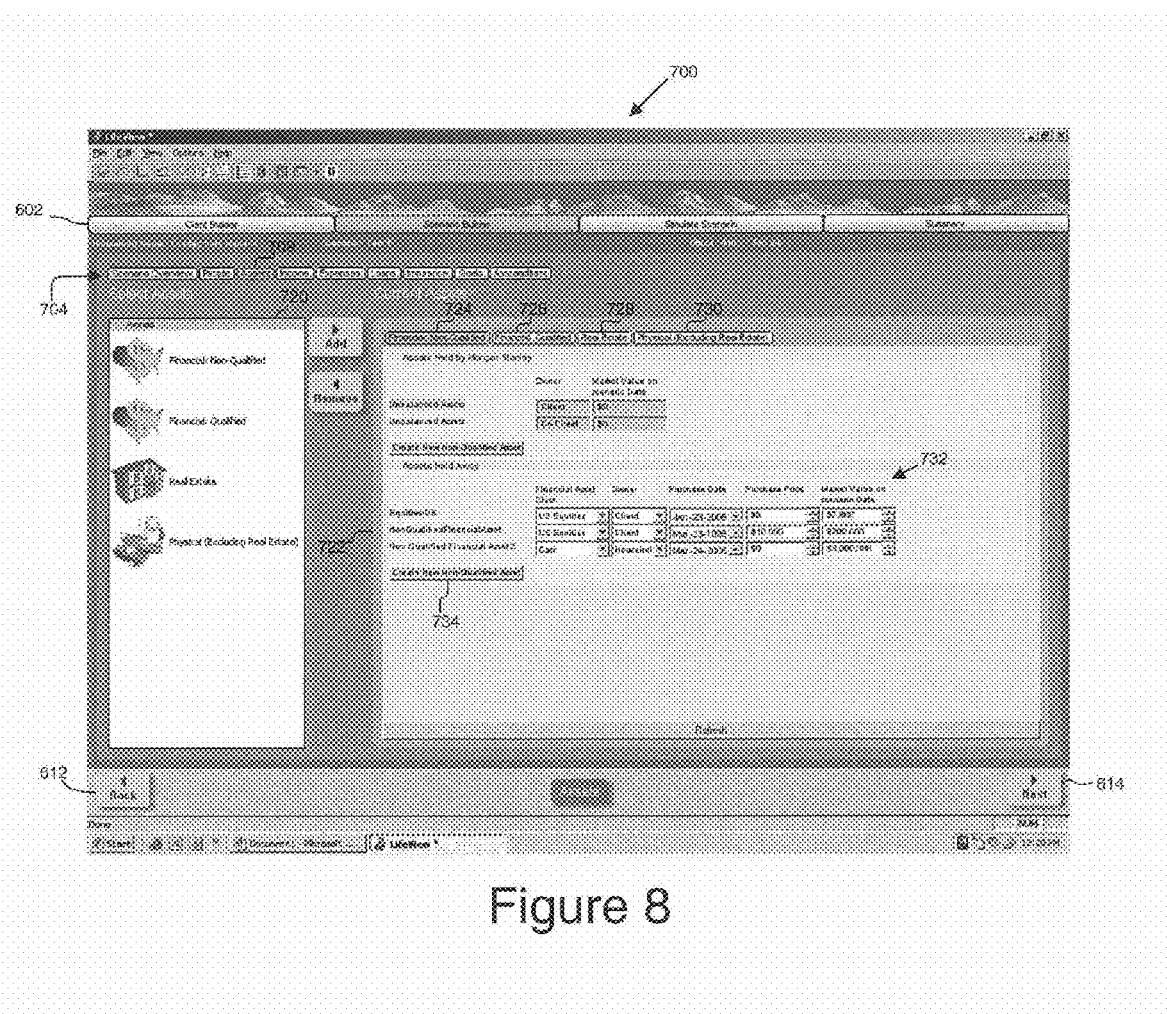
Figure 9:
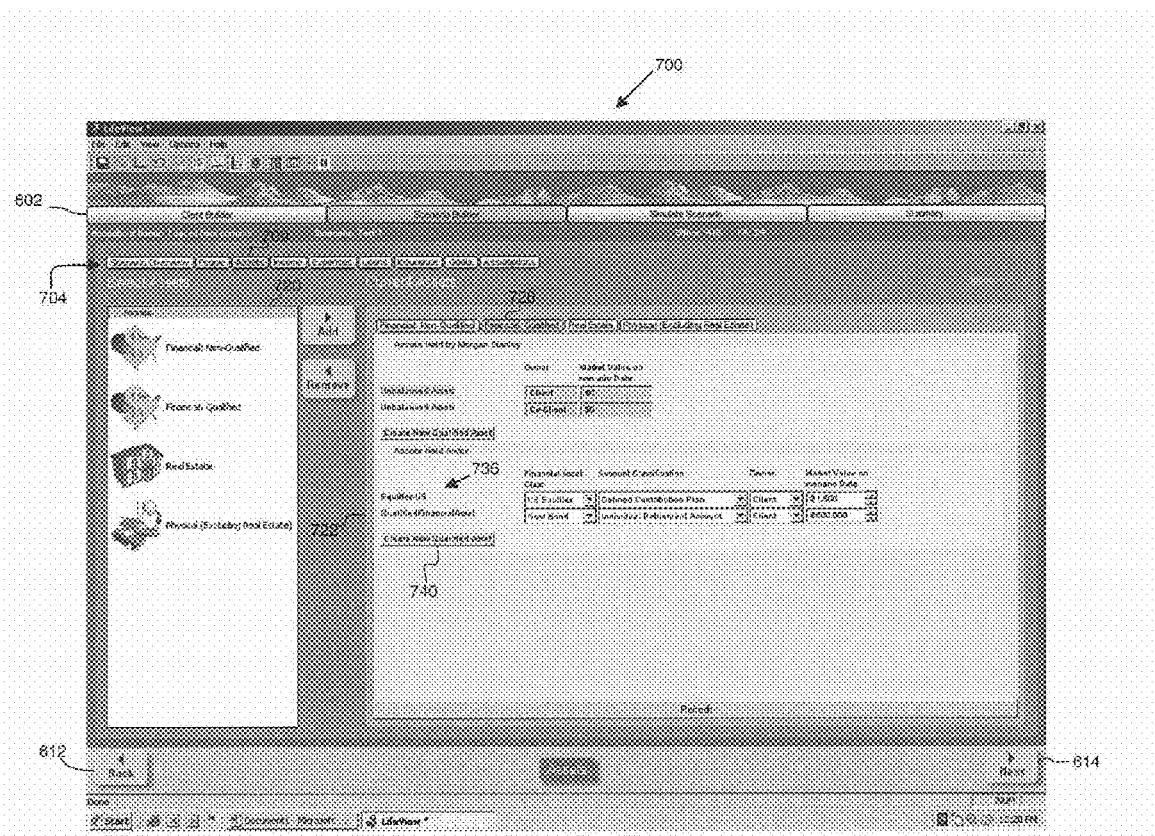

In FIG. 8, field 722 is shown displaying tab 724, corresponding to financial non-qualified assets. Financial non-qualified assets may include assets held in accounts that do not meet treasury code requirements and therefore do not receive favorable tax treatment. The tax treatment status of the assets may be used by the simulation module 112 when generating the model. The user may view and/or enter information about specific non-qualified assets held by the client at field 732. For example, the asset type, asset owner, purchase date, purchase price, market value, etc., may be shown. The user may add an additional non-qualified asset by selecting the button 734 and entering the relevant information in field 732. In various non-limiting embodiments, the user may also add an additional non-qualified asset by selecting the non-qualified asset representation or icon from field 720.

FIG. 9 shows the field 722, according to various embodiments, with the Financial Qualified Assets tab 726 selected. Financial qualified assets are the opposite of non-qualified assets and may include assets held in accounts that do meet treasury code requirements to receive favorable tax treatment, such as, for example, section 401k accounts, Individual Retirement Accounts (IRA's), etc. In some jurisdictions, there may be restrictions on the liquidity of qualified assets prior to retirement without significant financial penalty. The user may enter and/or view various information regarding financial qualified assets held by the client at field 736. For example, the asset class, account classification, owner, and market value of each asset may be listed. New financial qualified assets may be added by selecting the button 740 and/or by selecting the icon of the financial qualified asset at field 720.

Figure 10:
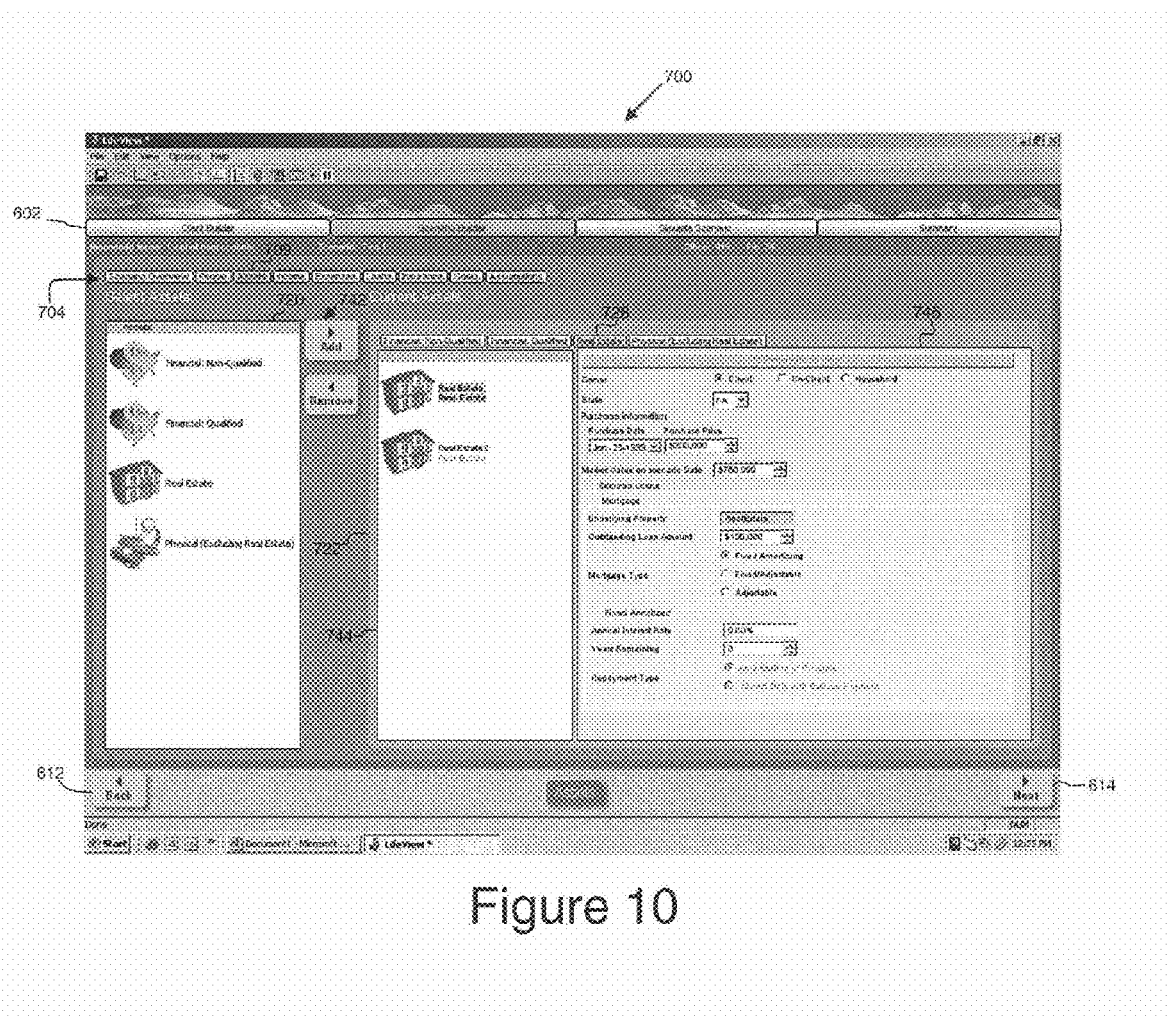
Figure 11:
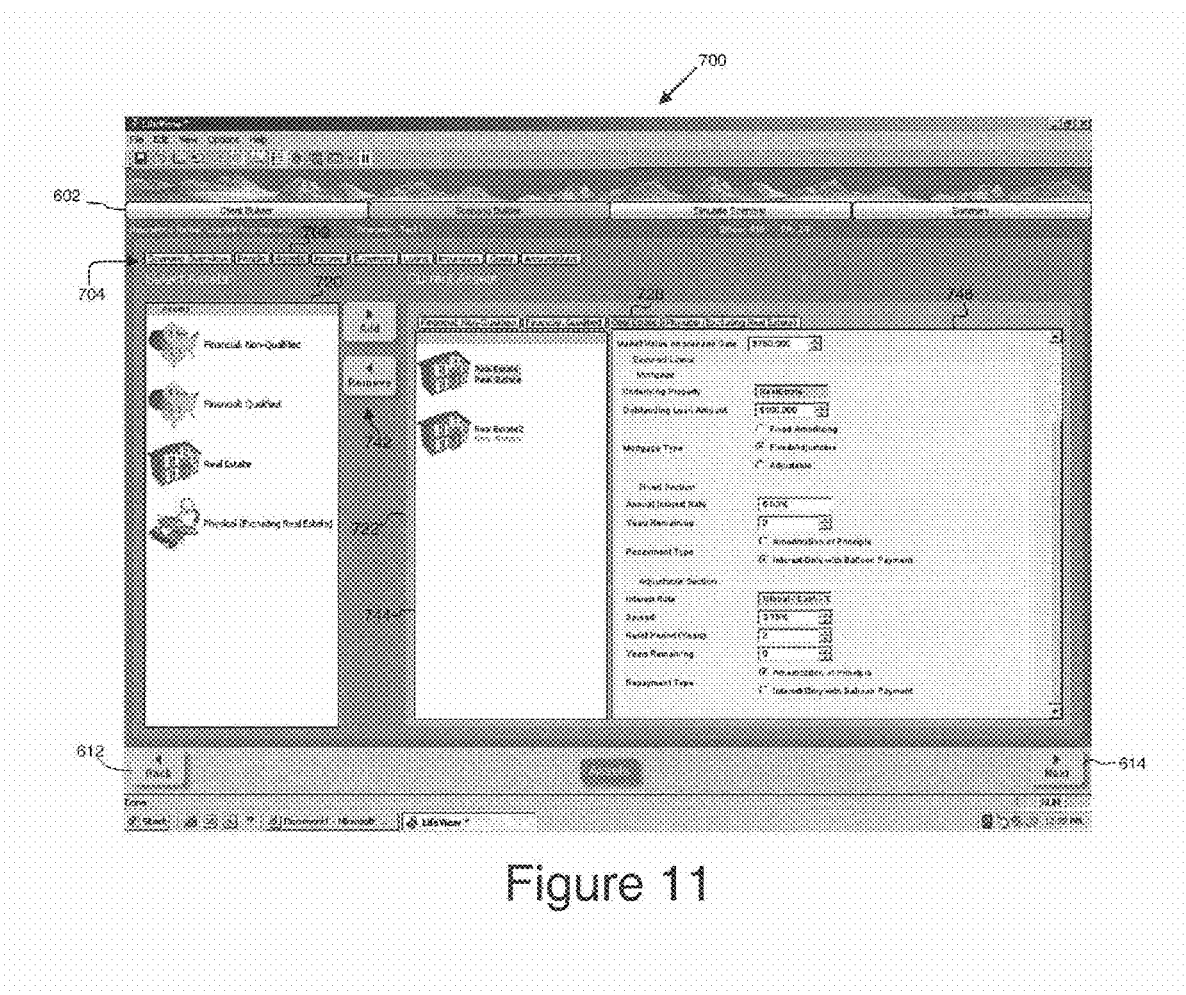

FIG. 10 shows the field 722, according to various embodiments, with the Real Estate tab 728 selected. The user may enter and/or view various information regarding real estate assets held by the client at fields 744 and 746. Field 744 may include a representation of each real estate asset held by the client. Selecting the representation of a real estate asset shown at field 744 may allow detailed information about the selected asset to be shown and/or edited at field 746. The detailed information may include a description of the asset, the owner of the asset, the state where the asset is located, purchase information regarding the asset, market value of the asset, and information regarding any mortgages on the asset as shown in FIG. 10 and in more detail in FIG. 11. Additional real estate assets may be added to or removed from field 744 by selecting the representation of a real estate asset in field 720 and selecting the appropriate button from field 742. Again, this information, such as the mortgage amount, term and interest rate may be used by the simulation module 112 when it generates the model of the client's future financial condition.

Figure 12:
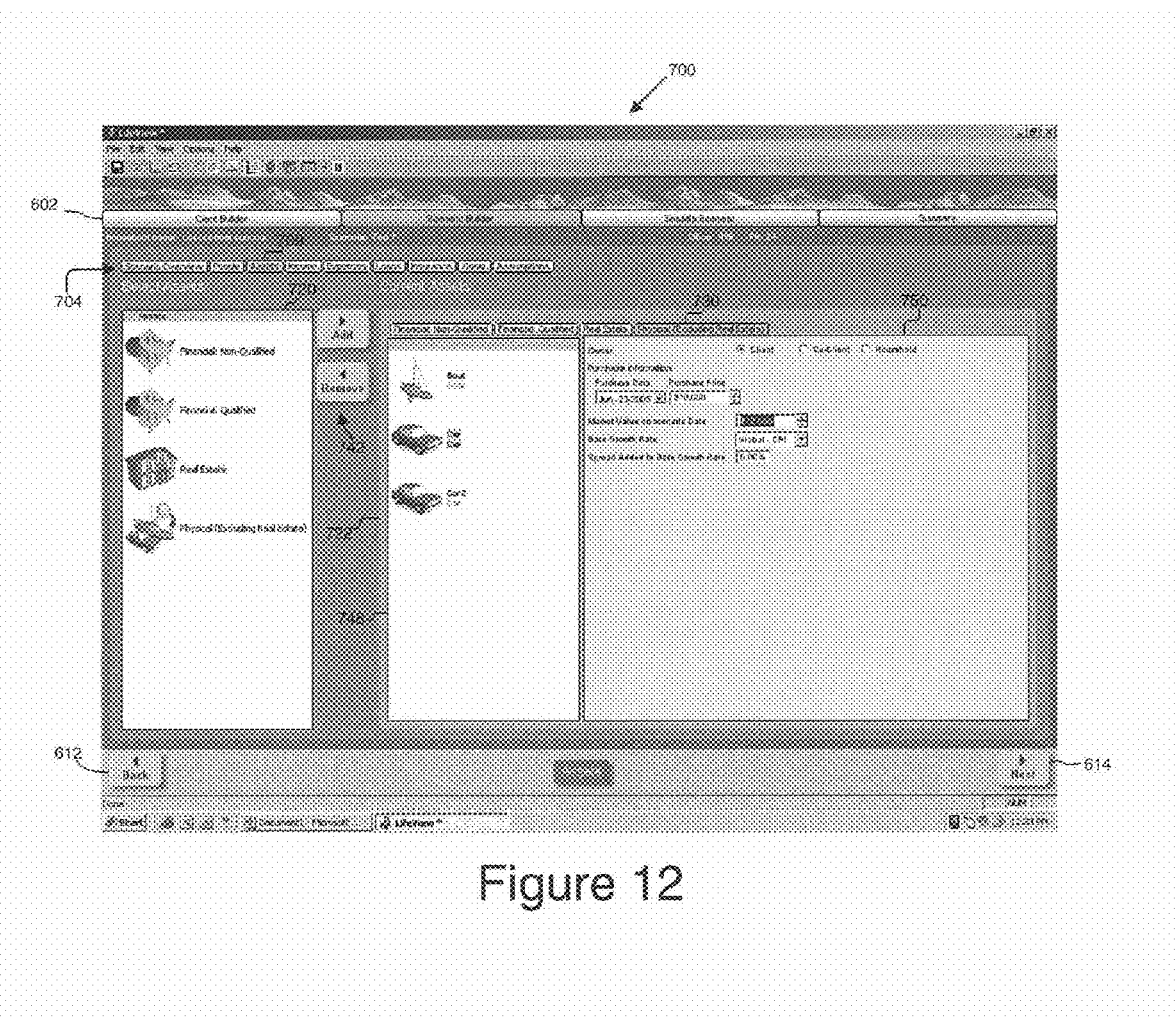
Figure 12A:
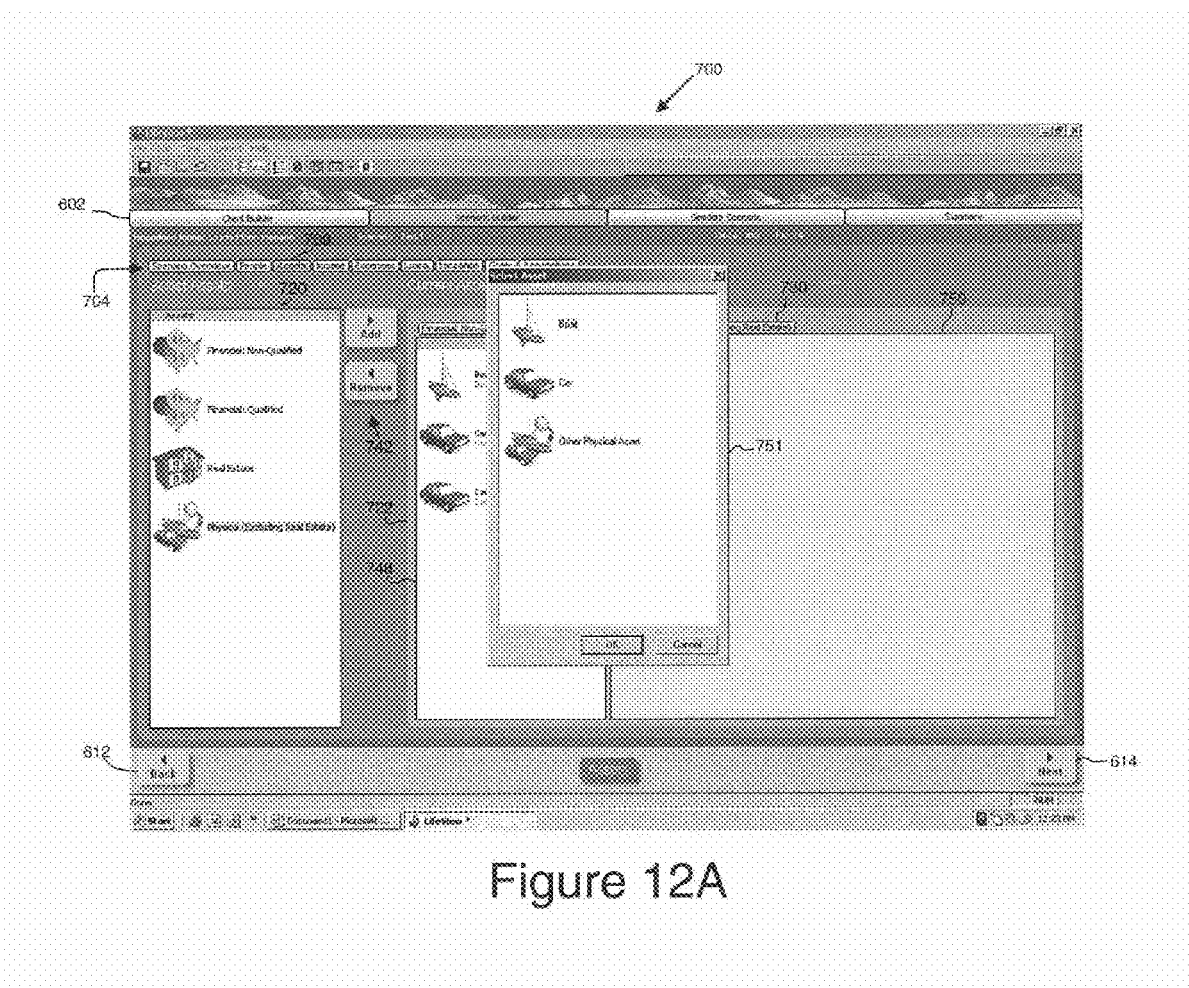

FIG. 12 shows the field 722, according to various embodiments, with the Physical Asset tab 730 selected. The user may enter and/or view various information about physical assets held by the client at fields 748 and 750. The assets listed under tab 730 may be non-real estate physical assets including, for example, cars, boats, jewelry, electronic equipment, etc. Representations of the physical assets owned by the client may be listed at field 748. The user may add an asset to field 748 by selecting the physical asset icon from field 720 and either using add/remove buttons 742, or dragging the icon to field 748. Doing so may cause field 751 to appear, as shown in FIG. 12A, allowing the user to choose the appropriate class of a physical asset. Also, selecting a physical asset representation from field 748 may allow detailed information regarding the asset to be reviewed and/or edited at field 750. Again, physical assets may be removed from field 748 using add/remove button pair 742, or by selecting the icon of the appropriate asset from 748 and dragging it away.

Figure 13:
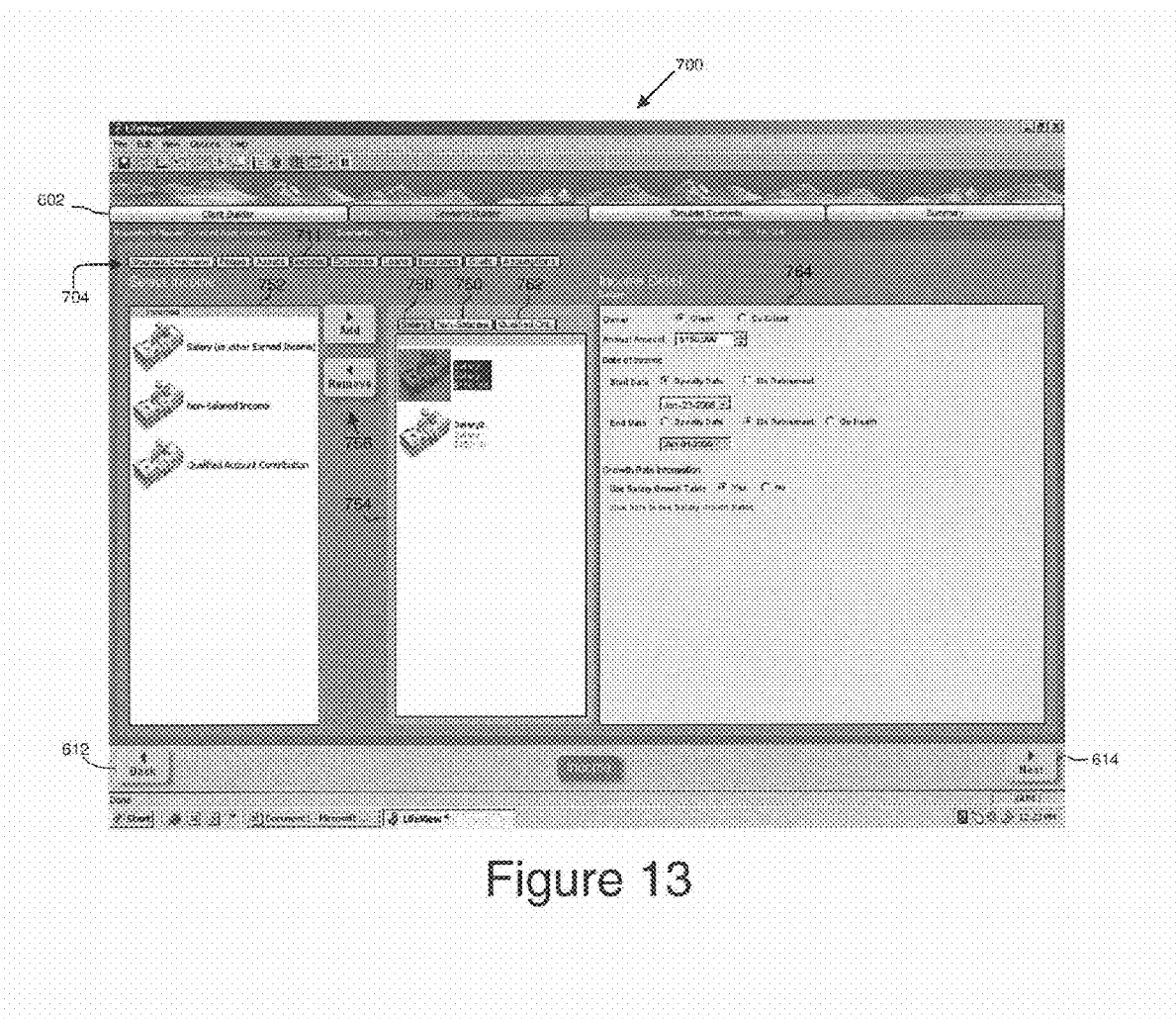
Figure 14:
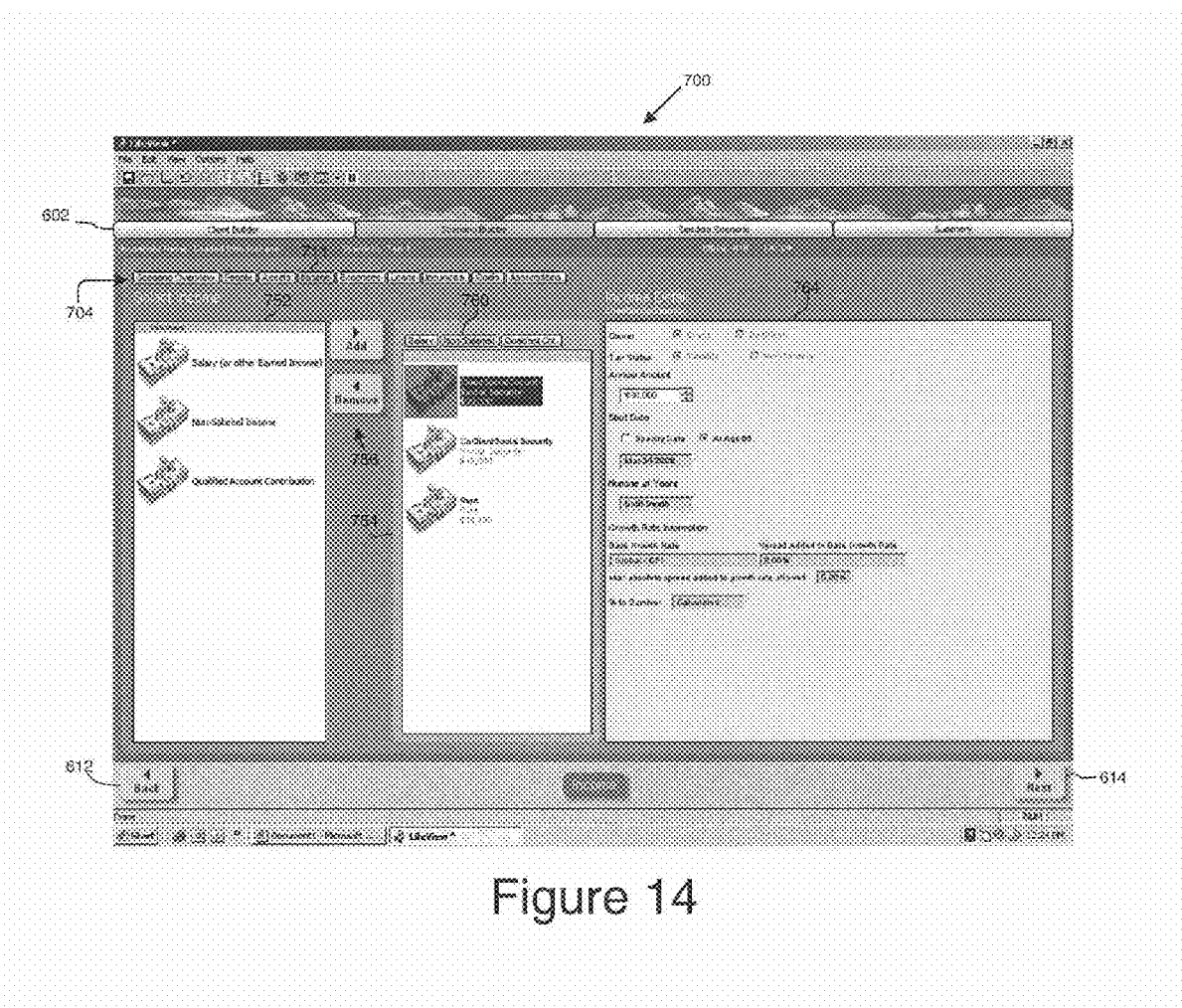
Figure 15:
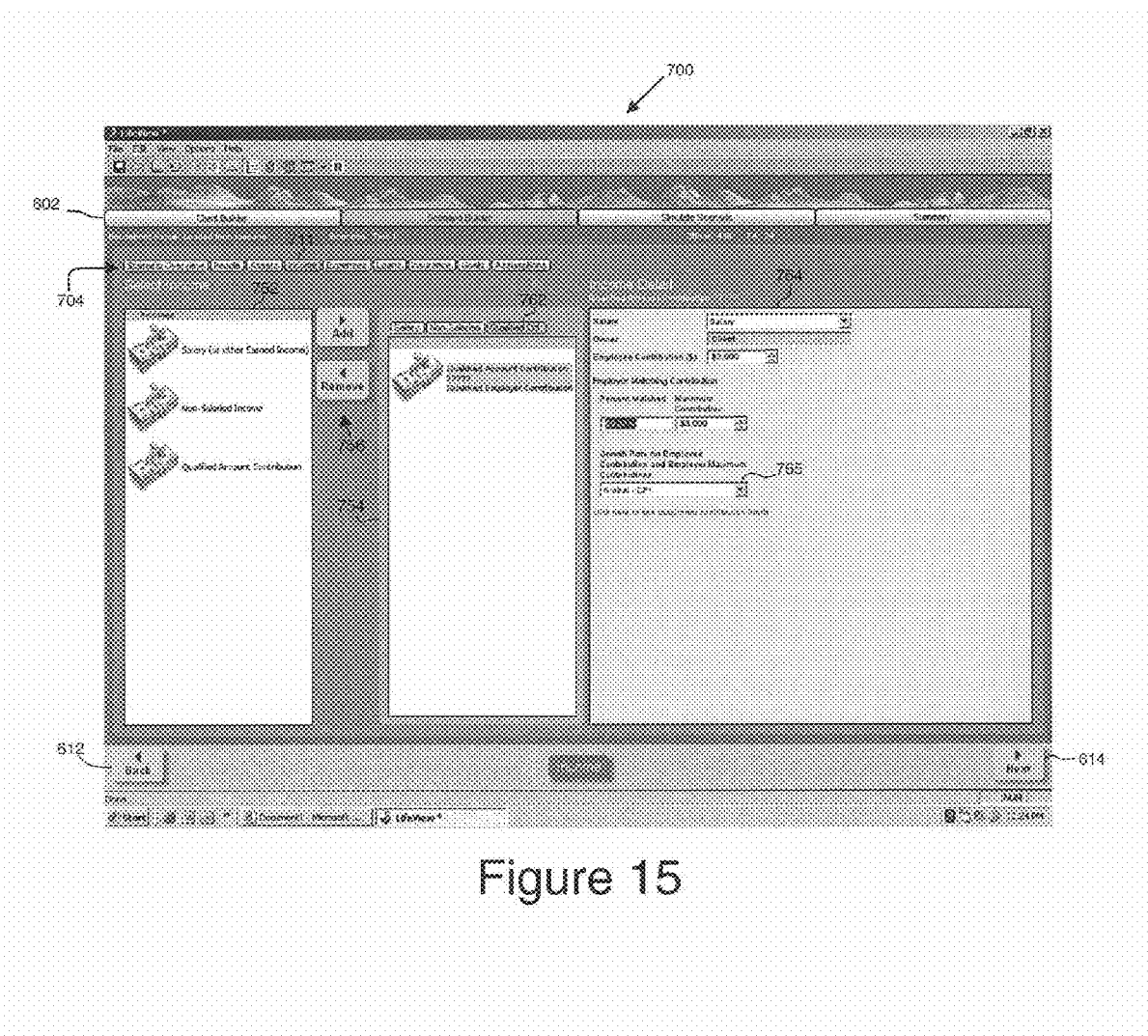

FIGS. 13-15 show the interface 700, according to various embodiments, with the Income button 711 selected. Representations of the types of income that may be received by the client are shown in field 752. Non-limiting examples of income types include salary or earned income, non-salaried income, and qualified employer contributions. Fields 754 and 764 may allow the user to view or edit additional information about examples of each class of income. For example, each class of income may have an associated tab at field 754. Selecting the tab associated with an income class, or selecting the representation of the income class from field 752 may cause field 754 to list the currently entered incomes of the client.

In FIG. 13, fields 754 and 764 are shown, according to various embodiments, with the Salary Income tab 758 selected. Representations or icons of the items of salary income directed to the client or other members of the client's household are shown at field 754. Selecting a representation may allow detailed information about the income to be displayed and/or edited at field 764. For example, owner, amount, start date, end date, and growth rate options are shown at field 764. Additional items of salary income may be added to or removed from field 754 by using the add/remove buttons 756 or by using the select and drag method discussed above. For example, the user may select the representation for salary from field 352 and drag it to field 754 or use add remove buttons 756.

FIG. 14 shows the fields 754 and 764, according to various embodiments, with the non-salaried income tab 760 selected. Representations of instances of Non-Salaried Income directed to the client or other members of the client's household are shown in field 754. Examples of non-salaried income may include social security, alimony, rent income, fixed annuities, child support, defined benefit pensions, etc. Selecting the representation of an instance of non-salaried income from field 754 may allow detailed information about the instance to be viewed and/or edited at field 764. Instances of non-salaried income may be added or removed to field 754 using add/remove buttons 756.

FIG. 15 shows the fields 754 and 764, according to various embodiments, with the Qualified Employer Contributions tab 762 selected. Representations of qualified employer contributions directed to the client or members of the client's household are listed at field 754. Selecting the representation of a particular instance may allow detailed information about the qualified employer contribution to be listed at field 764. Exemplary detailed information may include the owner of the income, the employee contribution required, the employer matching percentage and maximum contribution as well as whether and how much the employee contribution and employer maximum contribution will grow. For example, the growth information may be entered at drop down field 765. The user may select various growth rates including, for example, the Global CPI rate, or no growth at all. Instances of qualified employer contributions may be added or removed using add/remove buttons 756, or by the selecting and dragging method described above. It will be appreciated that the user may not be able to enter or edit any instances of qualified employer contributions unless the client owns qualified assets, for example, as described, at tab 726 of FIG. 9. Also, for example, the qualified employer contribution data inputs may be constrained by applicable regulatory provisions which may be stored, for example, at regulation database 120.

Figure 16:
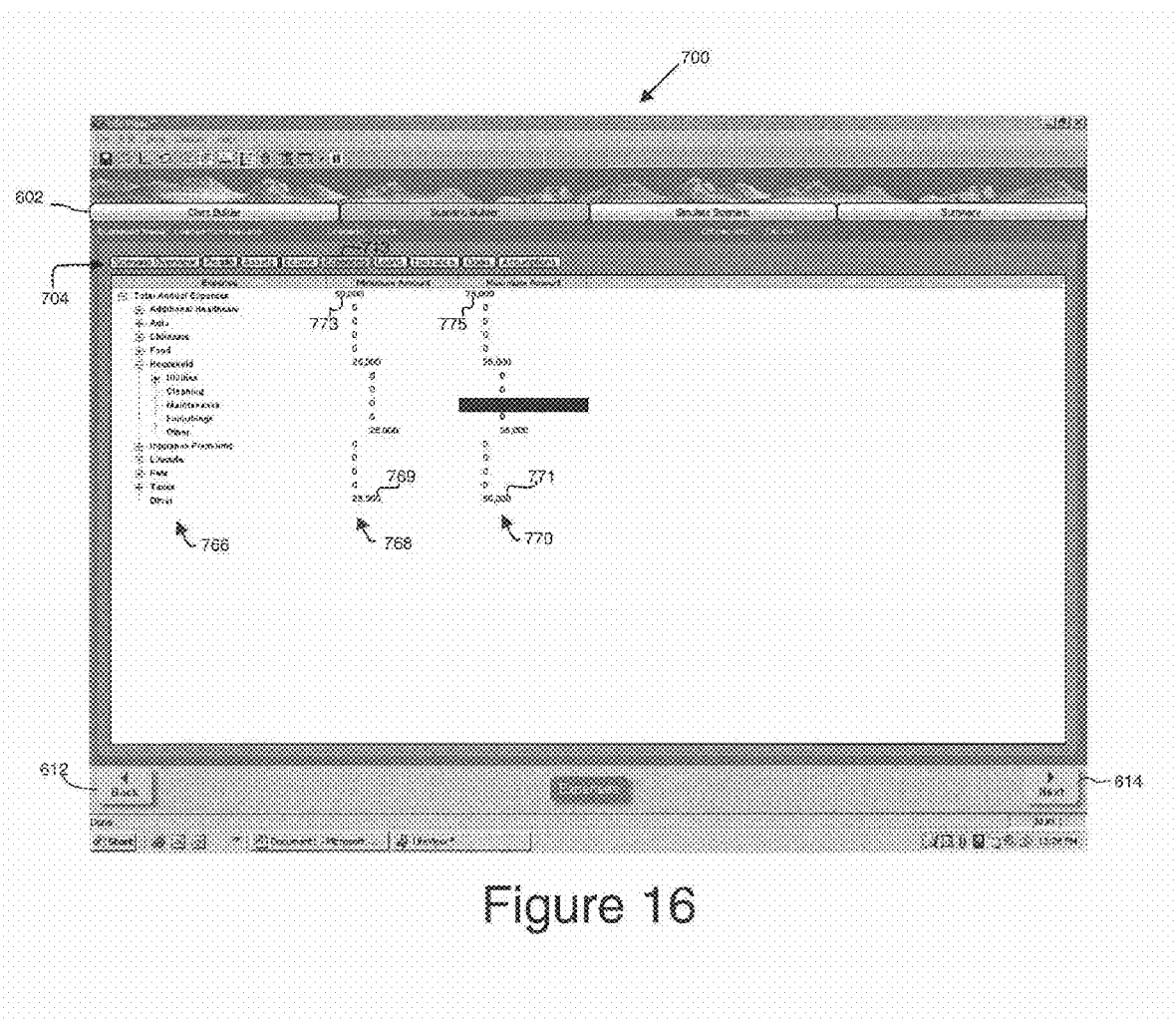

FIG. 16 shows the interface 700, according to various embodiments, with the Expenses button 713 selected. In the non-limiting embodiment shown in FIG. 16, the interface 700 is organized into a series of columns and rows. An expense column 766 lists expense categories in a nested format. For example, clicking on the [+] icon next to a category may cause sub-categories under the selected category to appear. Accordingly, the client's expenses may be considered at a broad level, a detailed sub-category level, or a combination of both. Exemplary categories include, for example, Taxes, Pets, Lifestyle, Insurance Premiums, Household Food, Childcare, Auto, Additional Healthcare, etc.

For each category and sub-category listed in expense column 766 corresponding entries may exist in the minimum amount column 768 and the maximum amount column 770. The user may list the minimum and maximum amounts that the client expects to spend on a particular category in its corresponding entries in columns 768 and 770, respectively. In that way, the client's expenses can be bracketed between expected minimum and maximum amounts. It will be appreciated that, in various embodiments, the user may forgo entering values for all sub-categories and may instead enter minimum and maximum amounts only for total annual expenses 773, 775 and/or a portion of the categories.

Each of the columns 768 and 770 may include a respective Other item 769, 771. The Other items 769, 771 may allow a user to categorize some, but not all, of the client's expenses under one or more of the nested categories discussed above. For example, the Other items 769, 771 may display the difference between the total annual expenses 773, 775 of the client and the sum of the amounts classified in the respective categories. For example, referring to Other item 769, if the minimum amount of total household expenses is $25,000 and no other expenses are categorized, then, the amount of the Other item 769 would be $25,000 so that the total minimum annual expenses value 773 would remain at $50,000. As the sum of the categorized expenses increases (e.g., as more expenses are categorized), the value of the Other item 769 decreases until the sum of the categorized expenses equals the total minimum annual expenses 773. At that point, if the sum of the categorized expenses were to increase further, the Other item 769 would remain at zero and the total expenses 773 would increase. It will be appreciated that the categorized expenses, Other item 771 and total maximum annual expenses 775 of Maximum Amount column 770 may behave in a similar manner.

Figure 17:
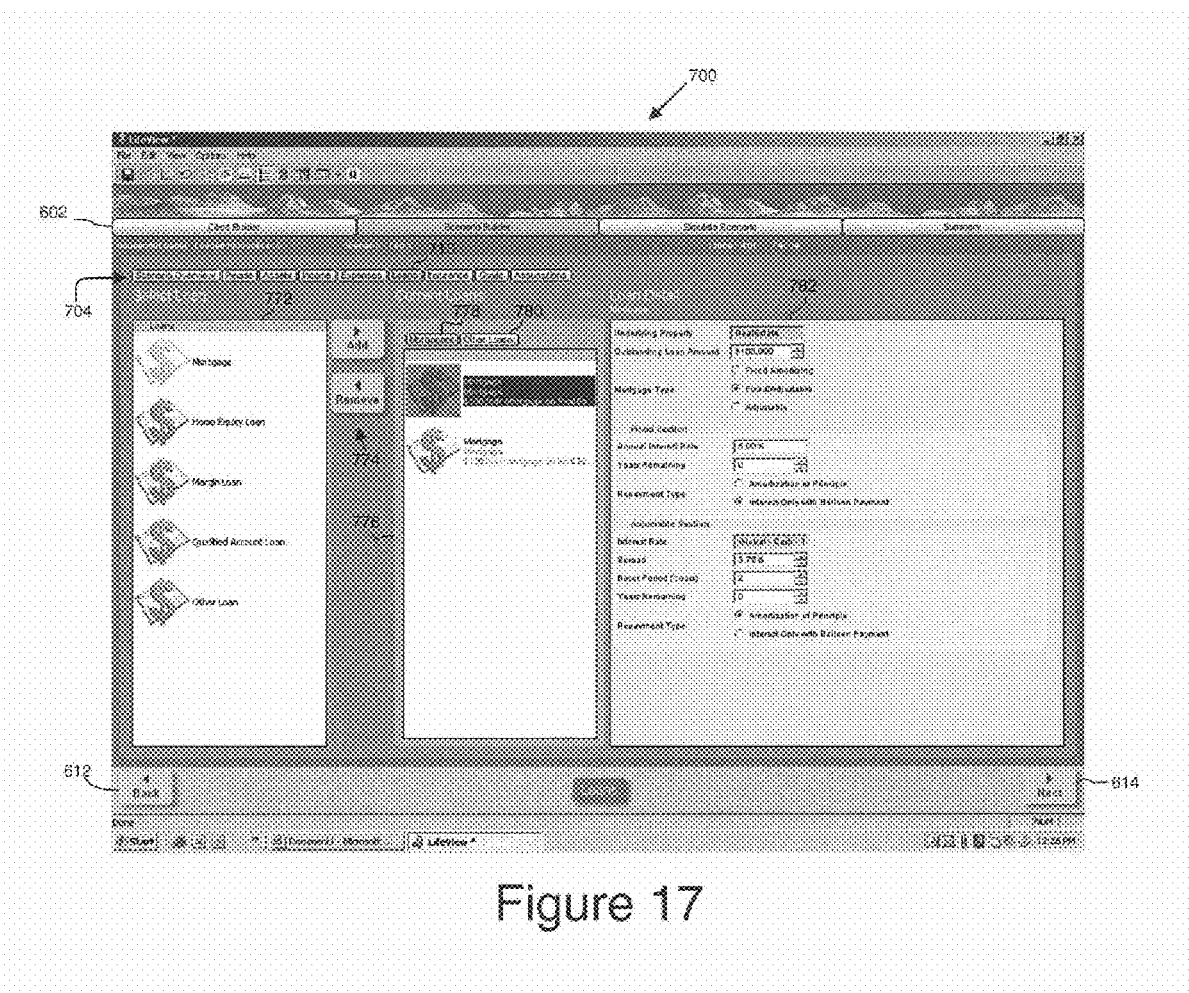
Figure 18:
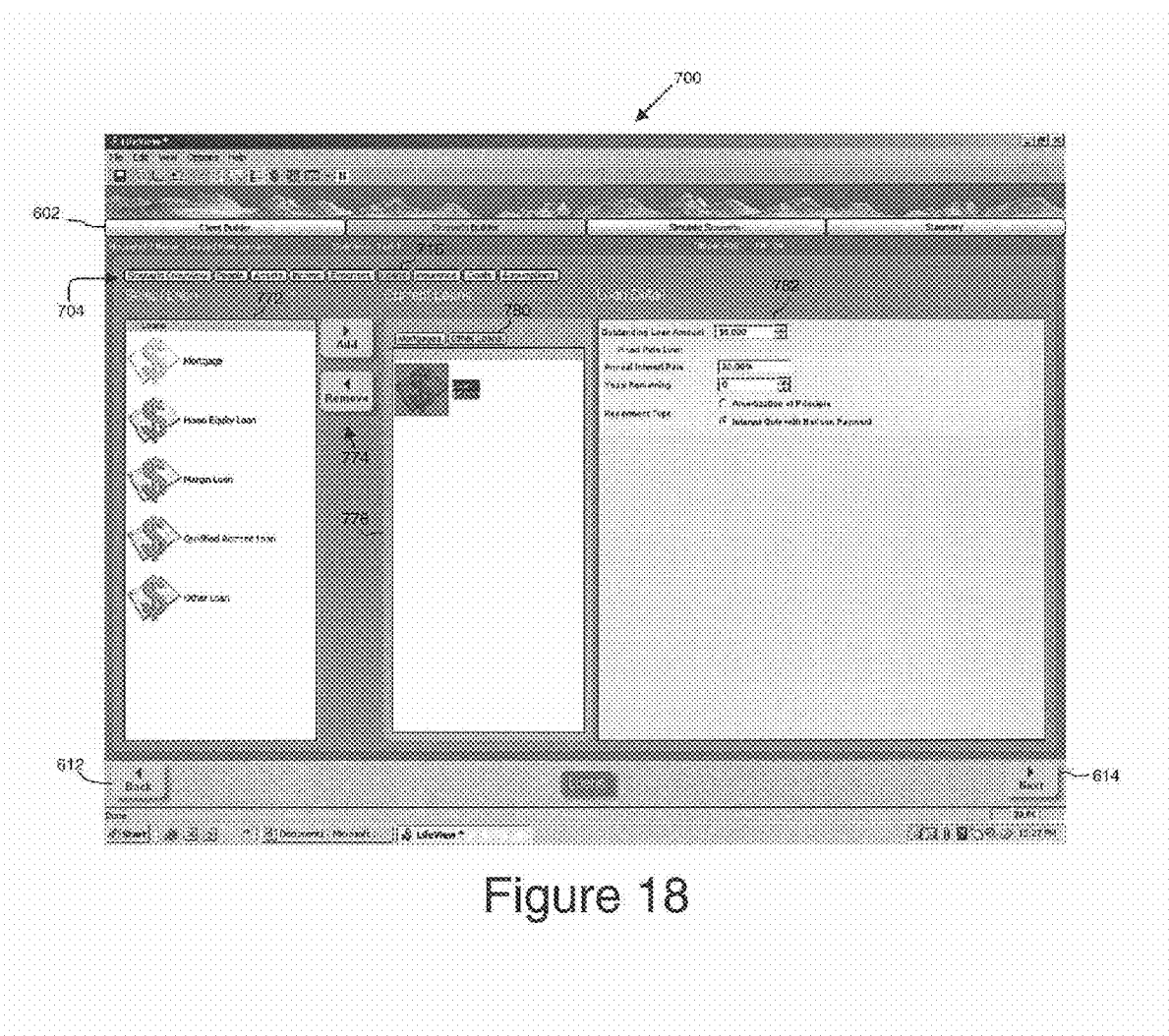

FIGS. 17-18 show the interface 700, according to various embodiments, with the Loans button 715 selected. Representations of different classes of loans are listed in field 772. Example loan classes include mortgage, home equity, margin loans, qualified account loans, etc. Fields 776 and 782 may show information about loans of different classes held by the client. Field 776 may include tabs 778, 780, with each tab corresponding to one or more classes of loans. The user may access the tabs 778, 780 by selecting them, by selecting a representation of a corresponding loan class listed under the tab from field 772, or by selecting the representation of the corresponding loan class from field 772 and dragging it to field 776. As mentioned above, the amount, term, and rates of the client's various loans may be considered by the simulation module 112 in forecasting the client's future financial condition.

FIG. 17 shows fields 776 and 782, according to various embodiments, with the Mortgages tab 778 selected. The field 776 includes representations of mortgage-type loans held by the client. Selecting one of the representations of the mortgage-type loans in field 776 allows detailed information about the selected mortgage-type loan to be edited and/or viewed at field 782. For a mortgage-type loan, the detailed information may include the underlying property, the outstanding loan amount, the mortgage type, the annual interest rate, the term, etc. One or more additional mortgages may be added to the field 776 by selecting the mortgage representation from field 772 and using the add/remove buttons 774, or selecting and dragging the representation to field 776. A mortgage may similarly be removed from field 772 by selecting the representation or icon of the mortgage to be removed and using the add/remove buttons 774. In various embodiments, the field 776 may be pre-populated to include mortgages relating to real property described, for example, at tab 728 shown in FIG. 10.

FIG. 18 shows the fields 776 and 782, according to various embodiments, with the Other Loans tab 780 selected. The field 776 includes representations of other, non-mortgage loans held by the client. For example, in FIG. 18, field 776 includes a home equity loan. Detailed information about a loan may be viewed and/or edited at field 782 by selecting the representation of the loan from field 776. Loans may be added or removed from field 776, for example, in the manner described above with respect to tab 778. Some or all of the information relating to the home equity loan may be pre-populated based on mortgages already existing on the client's real property.

Figure 19:
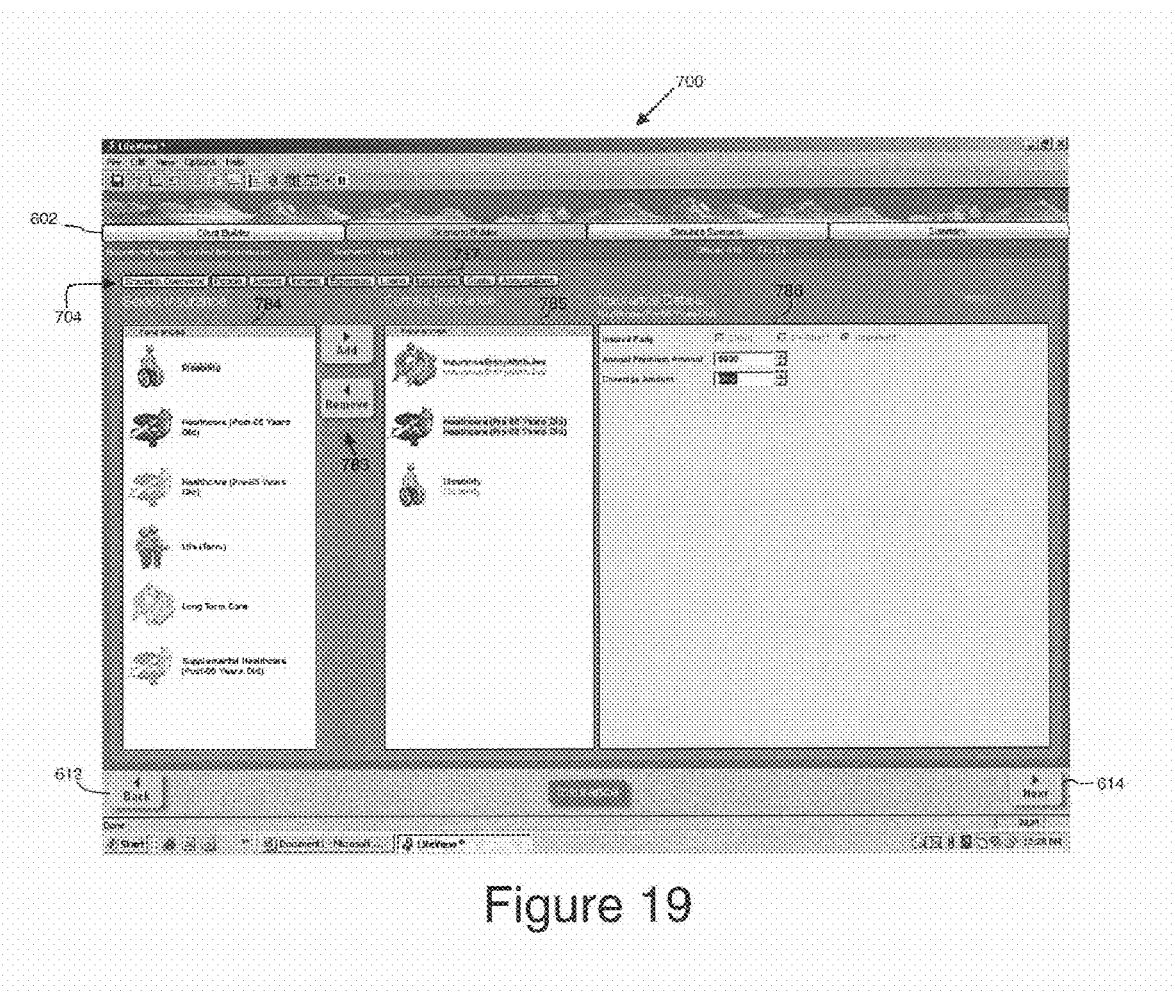

FIG. 19 shows the interface 700, according to various embodiments, with the Insurance button 717 selected. Field 784 includes representations of exemplary classes of insurance. Indicators of insurance policies actually held by the client are shown in field 785. Selecting one of the indicators in field 785 may allow detailed information regarding the selected policy to be viewed and/or edited at field 786. The type of detailed information may be dependent on the type of insurance policy. For example, detailed information for a health insurance policy may include an insured party, and annual premium amount, a coverage amount, etc. Detailed information for a disability policy may include the insured party, an annual premium amount, a premium growth rate, an annual disability payout, a payout growth rate, etc. It will be appreciated that policies may be added to or removed from field 785 using add/remove buttons 783, or the select and drag methods described above. The premiums and potential payouts from insurance policies may be considered in forecasting the client's future financial condition.

Figure 20:
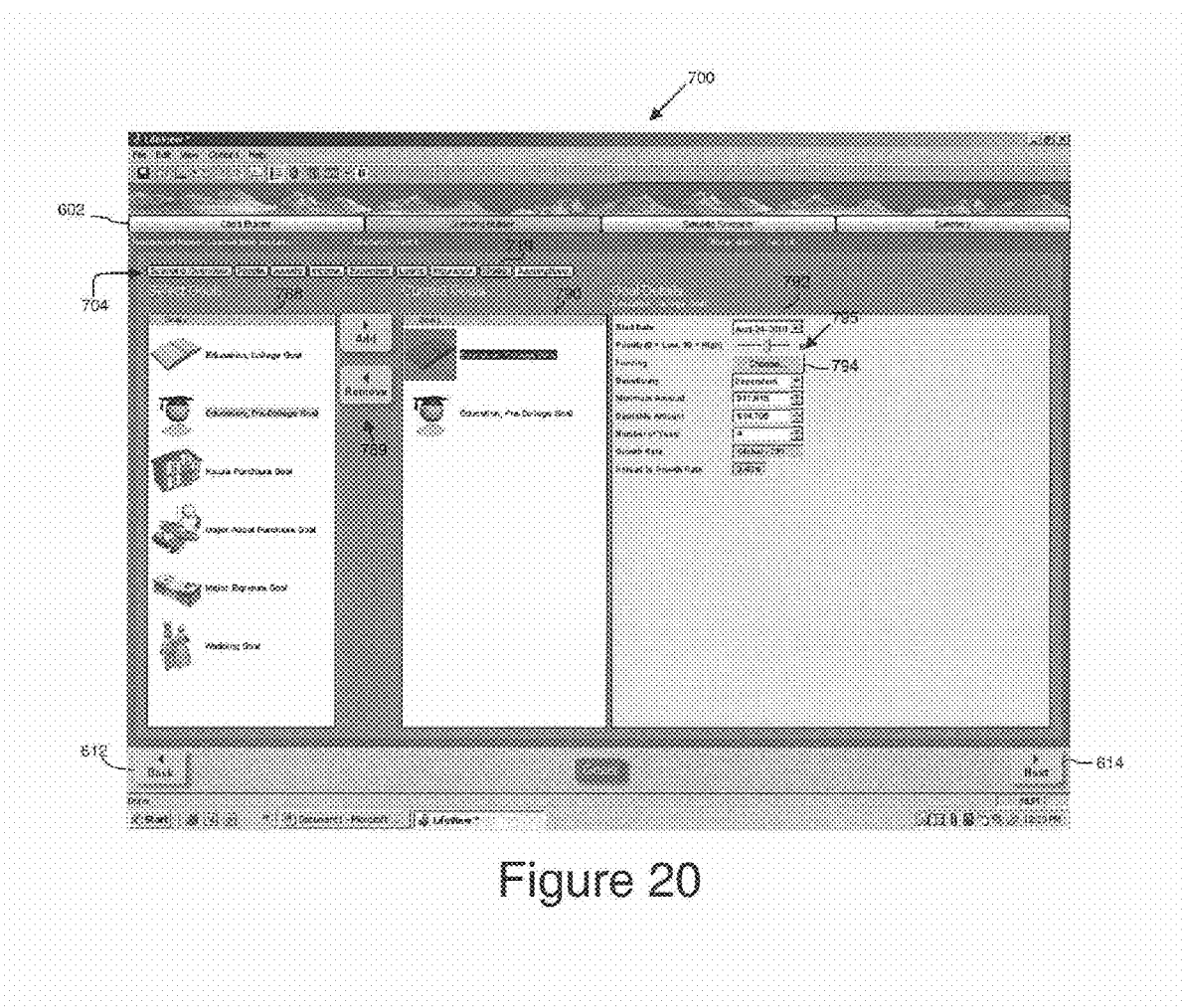
Figure 21:
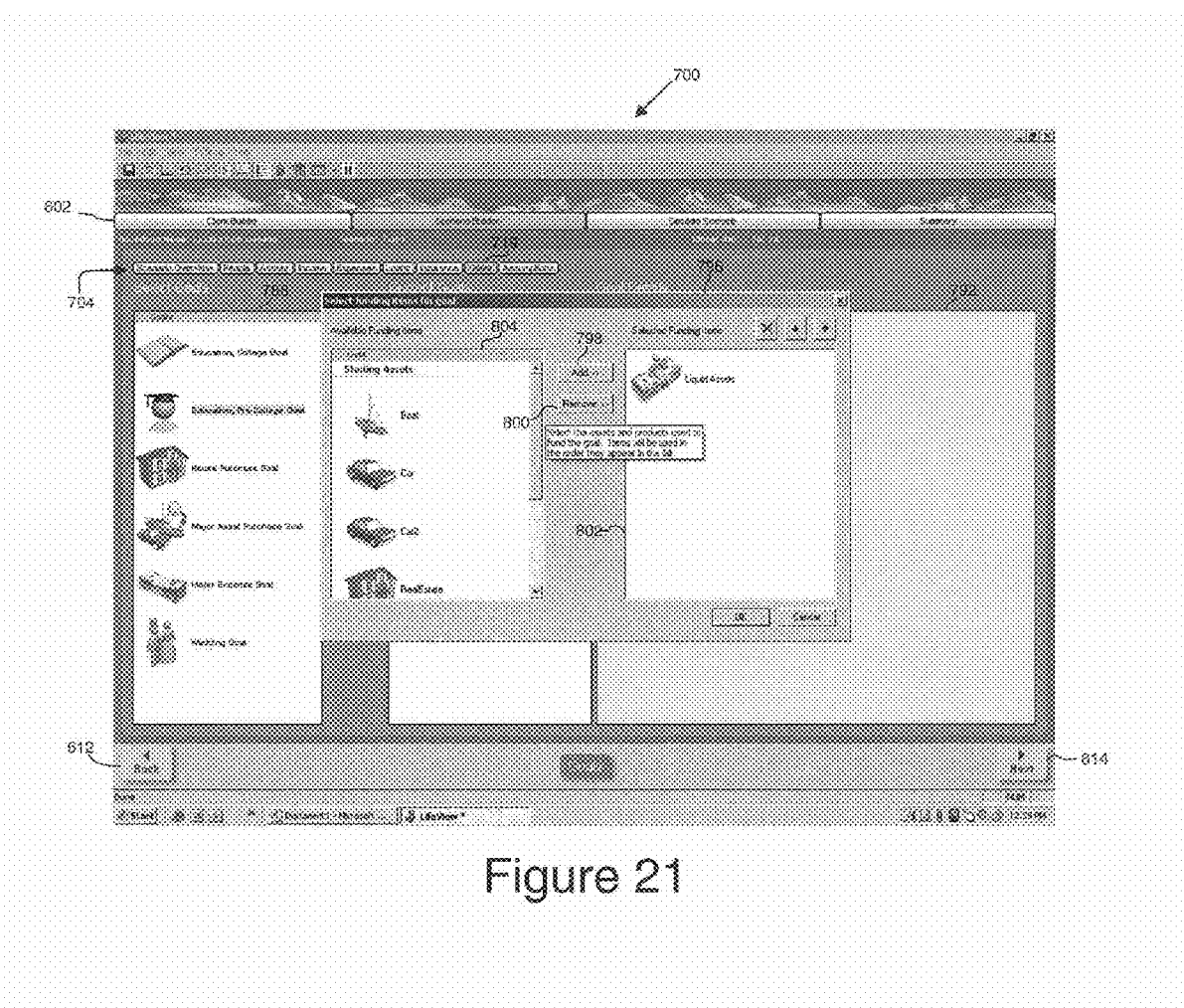
Figure 22:
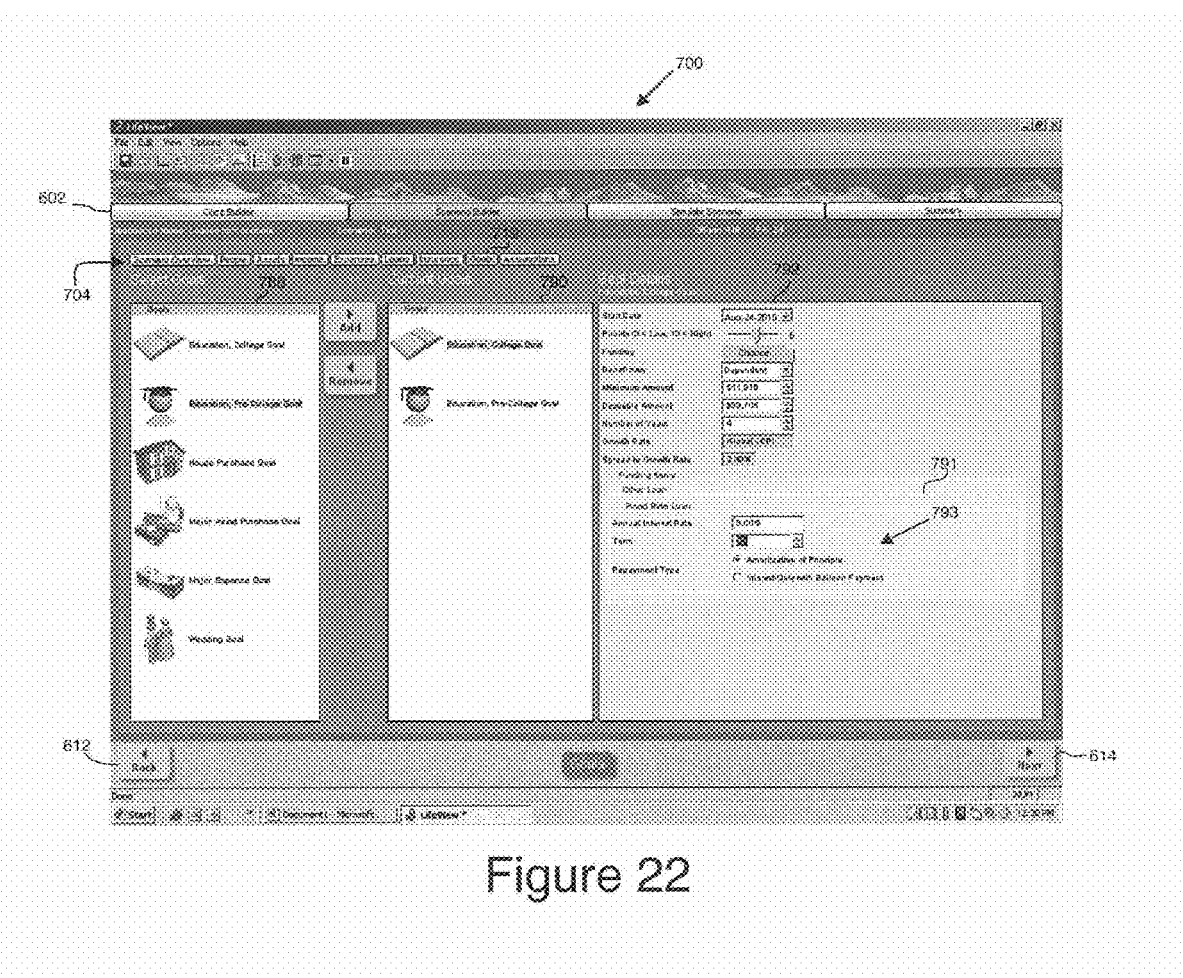

FIGS. 20-22 show the interface 700, according to various embodiments, with the Goals button 719 selected. The user may use the screens shown in FIGS. 20-22 to view and/or edit financial goals of the client. Each goal may represent an expenditure or other financial event that the client would like to achieve in the future. Field 788 includes representations of potential goal types. For example, as shown in FIG. 21, field 788 includes representations for college education goals, pre-college education goals, home purchase goals, major expense goals, major purchase goals, and wedding goals. Field 790 shows representations of presently selected goals for the client. A goal may be added to field 790 by selecting the representation of the desired goal type from field 788 and using add/remove buttons 789, or by using the select and drag method described above.

Detailed information about current goals listed in field 790 may be viewed and/or edited at field 792 by selecting the representation of the goal from field 790. For example, the start date and the minimum and maximum costs of the goal may be entered and/or viewed. In various embodiments, the goal may be assigned a priority. For example, using slide-bar 795. The priority of the goal may be considered by the simulation module 112 as described herein. The funding source for the goal may also be viewed and/or edited, for example, by selecting button 794. The priority and funding source or sources for a goal may be considered by the simulation module 112 when simulations are conducted. Selecting button 794 may cause field 796 to appear, as shown in FIG. 21. Field 796 may include a field 804 including representations of assets available to the client to fund the goal, including loans. Selecting the representation of an asset or loan and actuating the add button 798 causes a representation of the asset to appear in field 802. This indicates that the asset will be used to fund the selected goal.

Figure 22A:
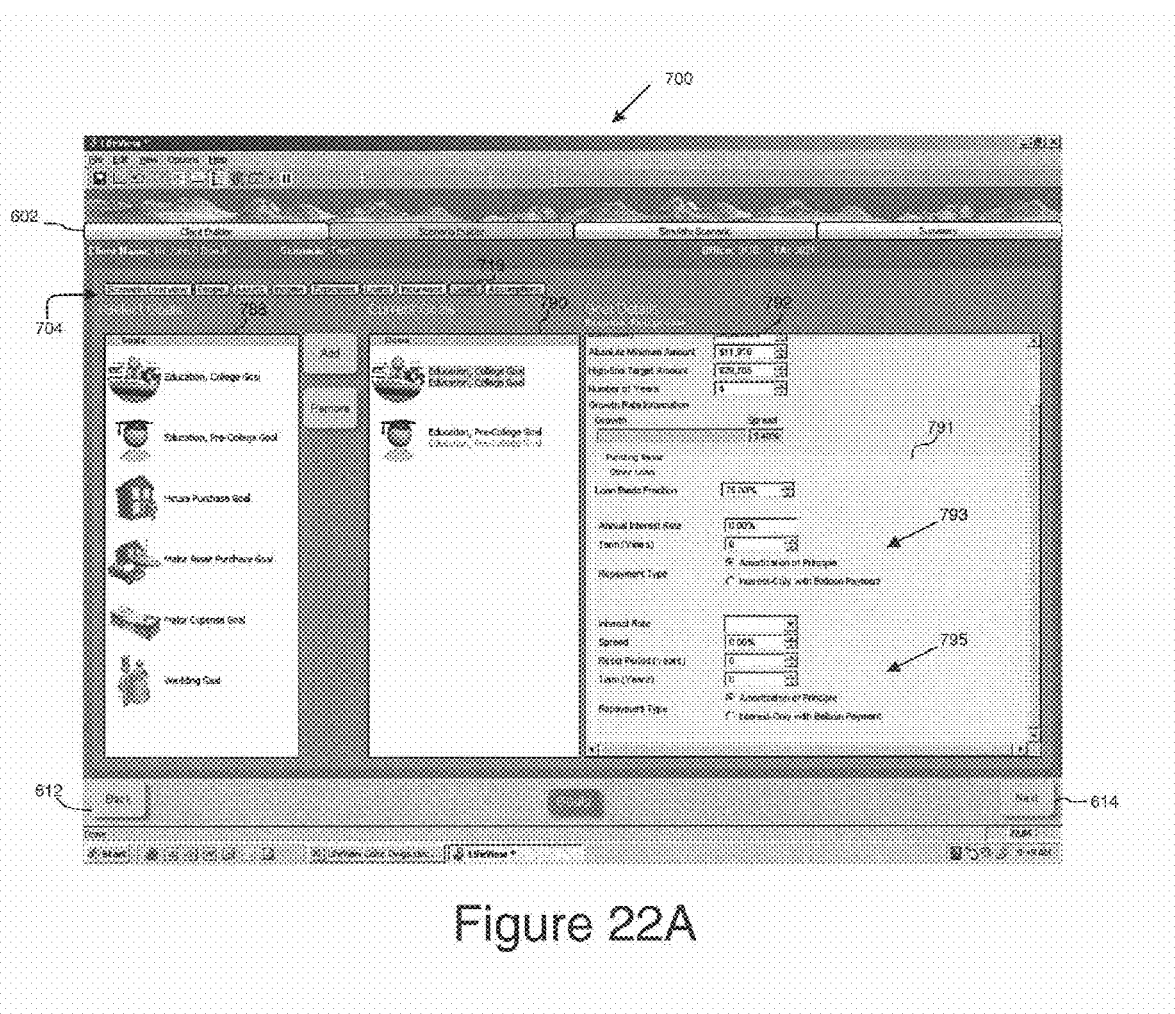

If a loan is selected as an asset for funding a goal, the field 791 may allow viewing and/or editing of detailed information about the loan, for example, as shown in FIG. 22. Field 793 may include information about fixed rate portions of the loan or loans, if any, including, for example, the annual interest rate, term, and repayment type. In various embodiments, field 795 (shown in FIG. 22A) may include information about variable rate portions of the loan or loans, if any, including, for example, the interest rate, spread, reset period, term, and repayment type.

In addition to, or instead of, the funding sources designated at field 796, it will be appreciated that the various simulations may implement an automatic funding hierarchy. For example, if there is not enough cash-on-hand to fund a year's expenditures (e.g., consumption, goals, etc.), the simulation may apply a set of funding rules. The funding rules may set forth a sequence for selling different types of assets and borrowing to finance expenditures. The funding rules may also specify a point at which further expenditure is disallowed (e.g., when credit is exhausted, or a predetermined amount of assets have been sold).

Figure 23:
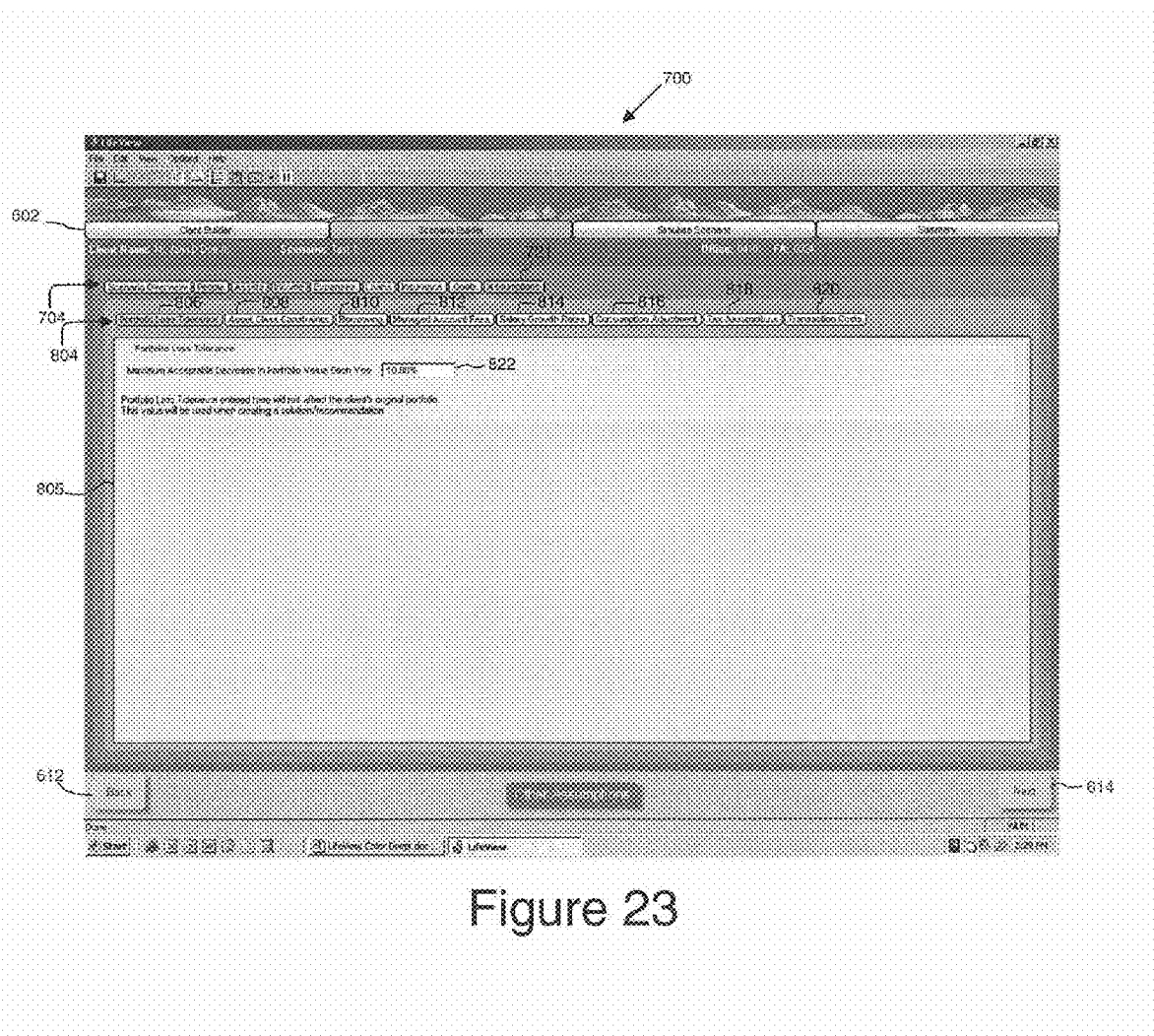

FIGS. 23-30 show the interface 700, according to various embodiments, with the Assumptions button 721 selected. The assumptions that may be edited or displayed may be parameters to be considered by the simulation module 112 to simulate the client's financial condition as described below. Data received through the interface 700 with the assumptions button 721 selected may be stored, for example, at assumptions database 116. As shown in FIG. 23, the interface includes a field 805 for viewing and/or editing various other assumptions. The field 805 may allow viewing and/or editing of various categories of assumptions. A category of assumptions may be selected from tab bar 804. It will be appreciated that various embodiments may omit some of the displayed assumptions, or add additional assumptions. In that case, tab bar 804 may list more, fewer, or different kinds of tabs, for example, as shown in FIGS. 25-30.

FIG. 23 shows the field 805, according to various embodiments, with the Portfolio Loss Tolerance tab 806 selected, allowing the user to view and/or edit the client's portfolio loss tolerance. The portfolio loss tolerance may be an indication of how much risk the client is willing to tolerate on their investment portfolio (e.g., a one year loss tolerance), and may be dynamic over the client's life. For example, a young individual client may be willing to take more risk than an older individual client who is nearing retirement. In various embodiments, the simulation module 112 may choose the assets that the client is assumed to buy and sell during the one or more simulated lives or business cycles based on the client's portfolio risk tolerance. For example, the simulation module 112 may choose a portfolio with a high concentration of equities for a highly risk tolerant client, or a bond-heavy portfolio for risk averse clients. In other various embodiments, the simulation module 112 may maintain a "fixed mix" asset allocation within a given percent (e.g., 5%) over the course of the client's life.

Figure 24:
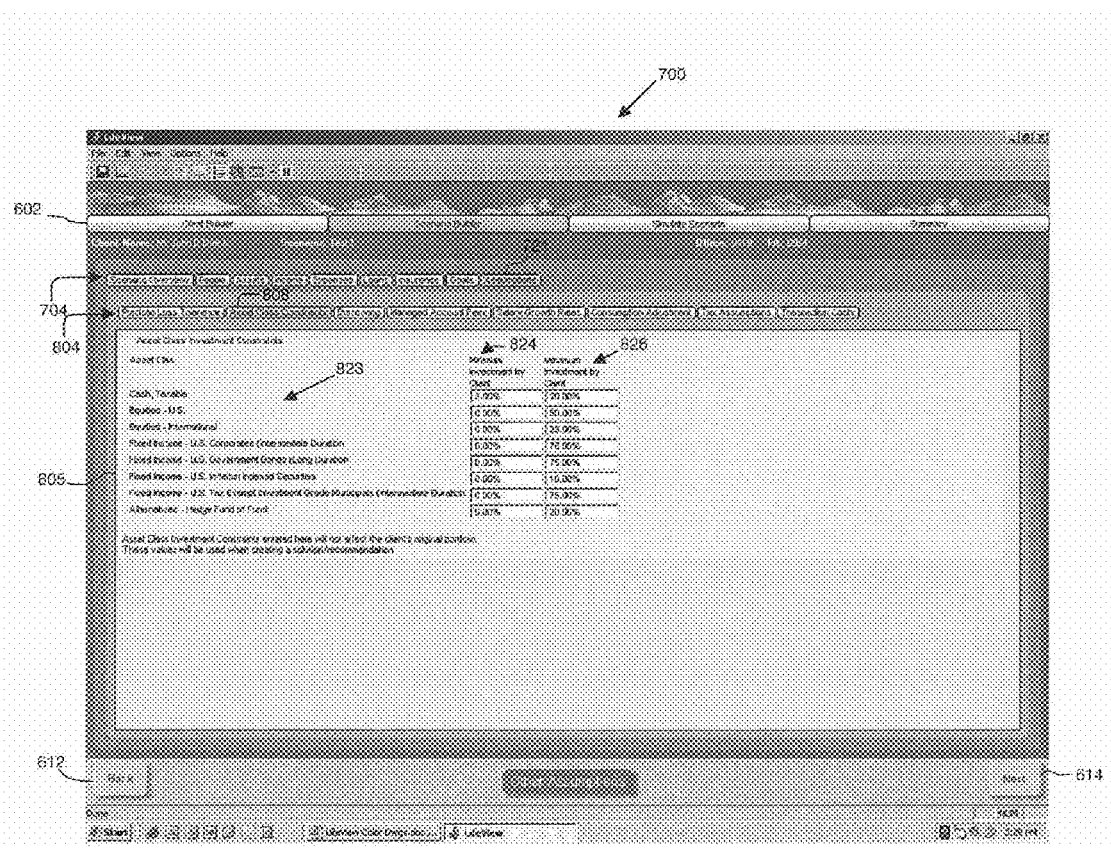

FIG. 24 shows the field 805, according to various embodiments, with the Asset Class Constraints tab 808 selected. The simulation module 112 may select the assets that the client is assumed to sell during the simulations in order to pay for certain expenses (e.g., goals, long-term care, etc.) based on the class constraints. In this way, the simulation module 112 can account for the asset allocation preferences of the client. Field 805 may show a series of corresponding columns 823, 824, 826. The column 823 lists asset classes that may be held by the client. The column 824 may include a row corresponding to each asset class listed in column 823. Each row lists the minimum amount of the corresponding asset class that the client wishes to hold as a percentage of the client's total portfolio. The column 826 may also include a row corresponding to each asset class listed in column 823. Each row in column 824 lists a maximum amount of the corresponding asset class that the client wishes to hold as a percentage of the client's total portfolio.

Figure 25:
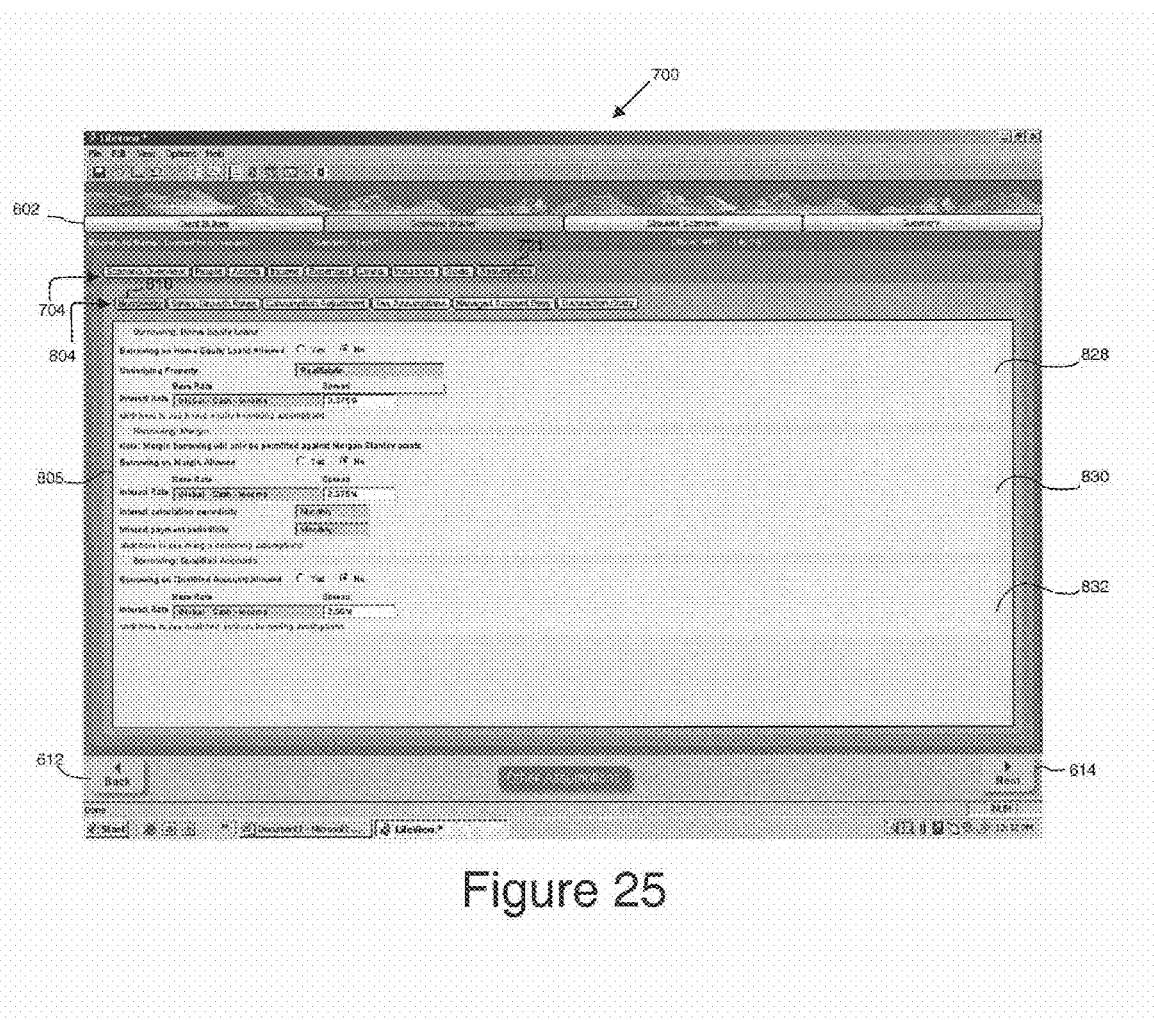

FIG. 25 shows the field 805, according to various embodiments, with the Borrowing tab 810 selected. The simulation module 112 may make assumptions as to whether and how much the client will borrow during the simulations based on the information entered at borrowing tab 810. The field 805 may include various other fields 828, 830, 832 for receiving and/or editing various information relating to whether the client will utilize loans, and, if so, what kinds of loans will be used. Field 828 allows the user to view and/or edit information regarding home equity loans. For example, the user may indicate whether home equity loans will be allowed, which property will be the underlying property for home equity loans, if allowed, and what interest rate will be assumed. For example, the interest rate may be entered as a base rate and spread. Field 830 allows the user to view and/or edit information regarding borrowing using margin loans. The user may indicate whether borrowing on margin is allowed in the generated financial models, and what interest rate will be assumed, as well as the periods over which interest will be calculated and paid. Field 832 allows the user to view and/or edit information regarding borrowing with qualified accounts. For example, the user may indicate whether borrowing with qualified accounts is allowed, and give an indication of what interest rate will be assumed.

Figure 26:
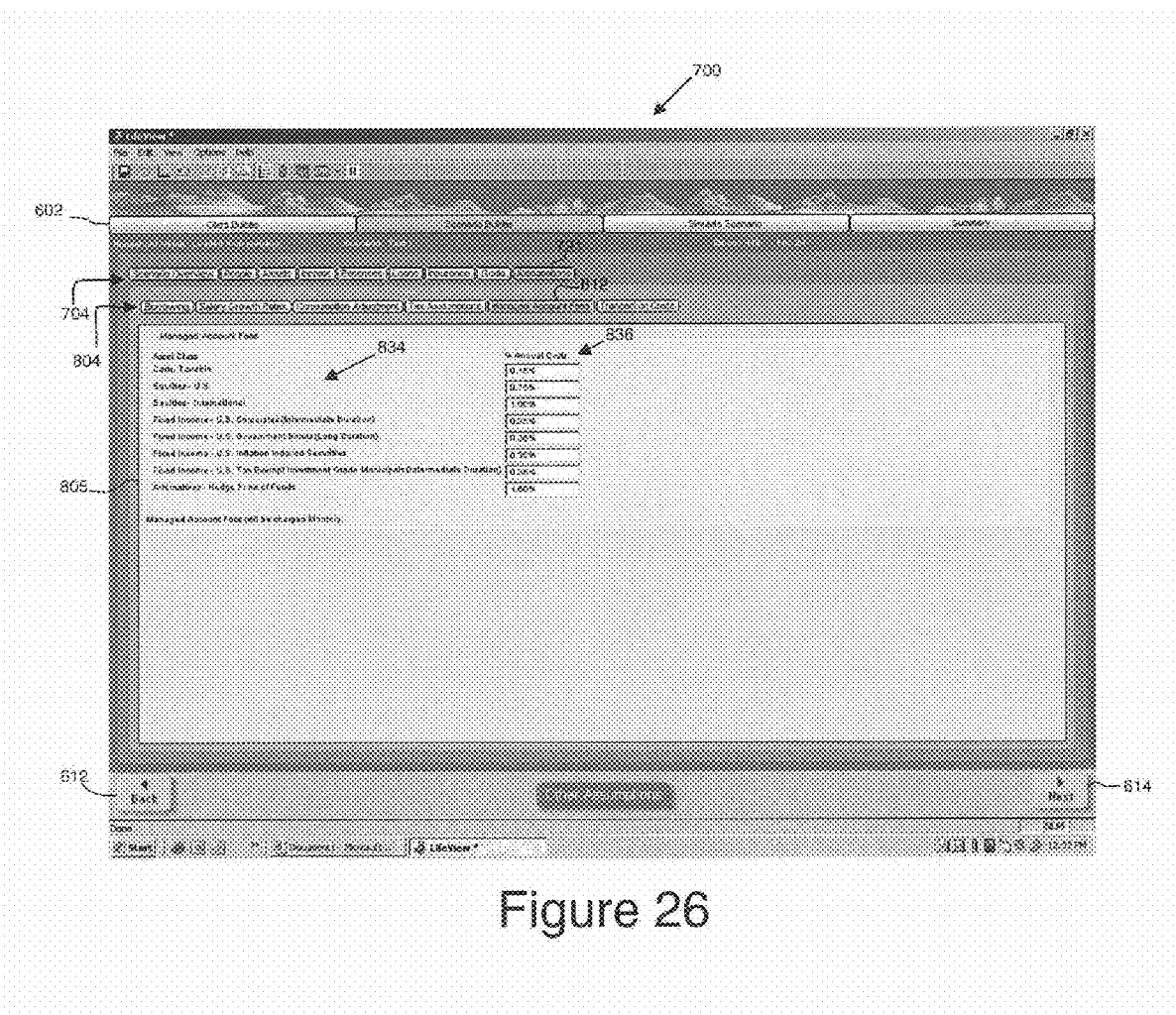

FIG. 26 shows the field 805, according to various embodiments, with the Managed Account Fees tab 812 selected. The simulation module 112 may make assumptions regarding whether the client will own managed account shares during the simulations, and how much will be expended in doing so based on the information entered at managed account fees tab 812. The tab 812 allows the user to view and/or edit expected fees that will be charged to the client for managed accounts under the generated financial model. Default expenses may be stored, for example, at the assumption database 116. Column 834 lists asset classes. Column 836 may have a row corresponding to each of the asset classes listed in column 834. Each entry into column 836 may represent the fees associated with managed accounts including the corresponding asset class. As shown, the fees are listed as a percentage annual cost; however, it will be appreciated that any suitable measure may be used.

Figure 27:
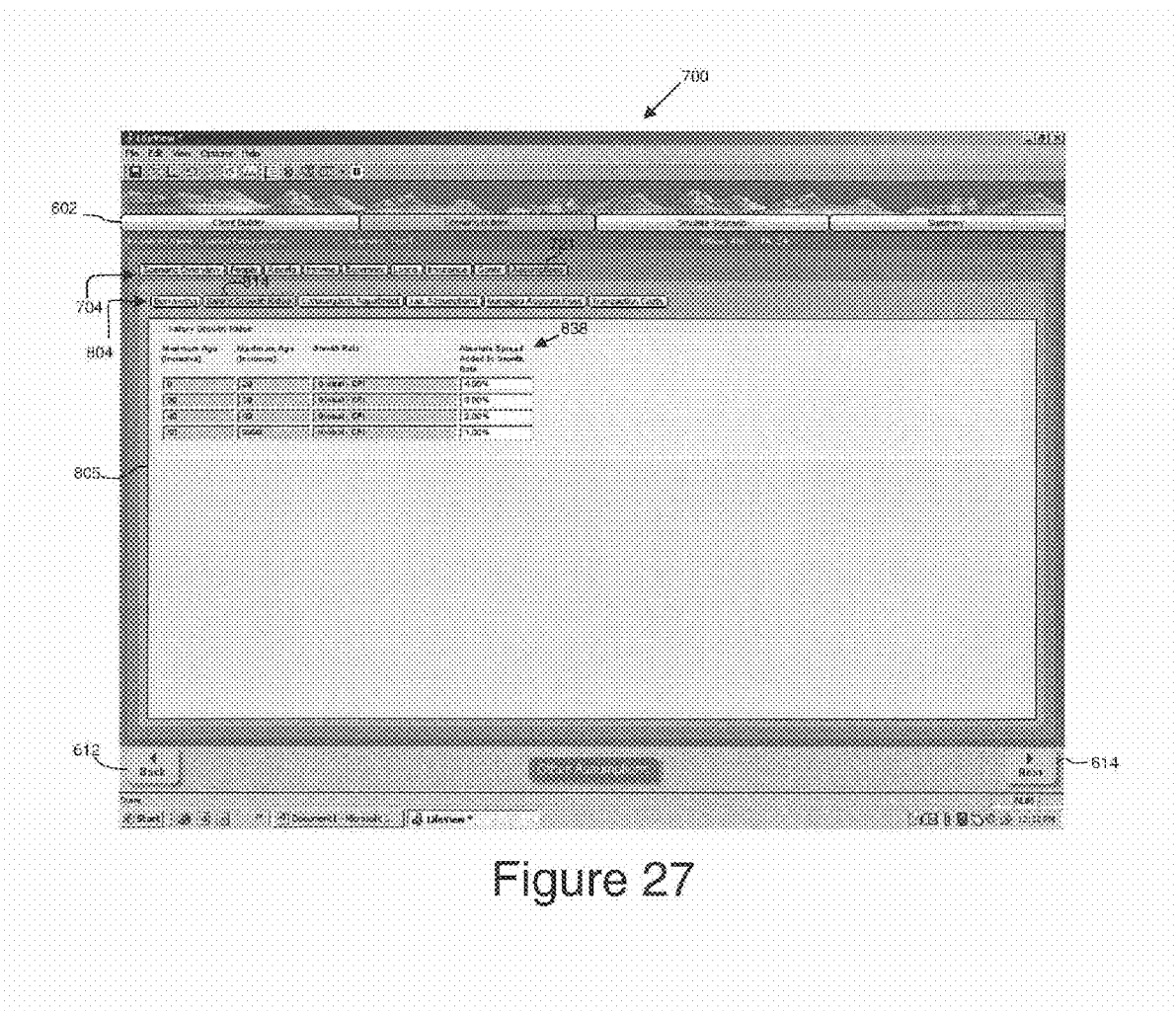

FIG. 27 shows the field 805, according to various embodiments, with the Salary Growth Rates tab 814 selected. The simulation module 112 may alter (e.g., raise or decrease) the value of the client's salaries, for example, as entered in tab 758 shown in FIG. 13, based on the assumptions entered at Salary Growth rate Tab 814. Default assumptions regarding salary growth rates may be stored in database 116. Referring to the tab 814, the field 805 includes a chart 838 allowing salary growth rates over various age ranges, for example, of the client to be viewed and/or edited. For individual clients, the tool 100 may assume, for example, that salary growth rates will be larger early in life than they are later.

Figure 28:
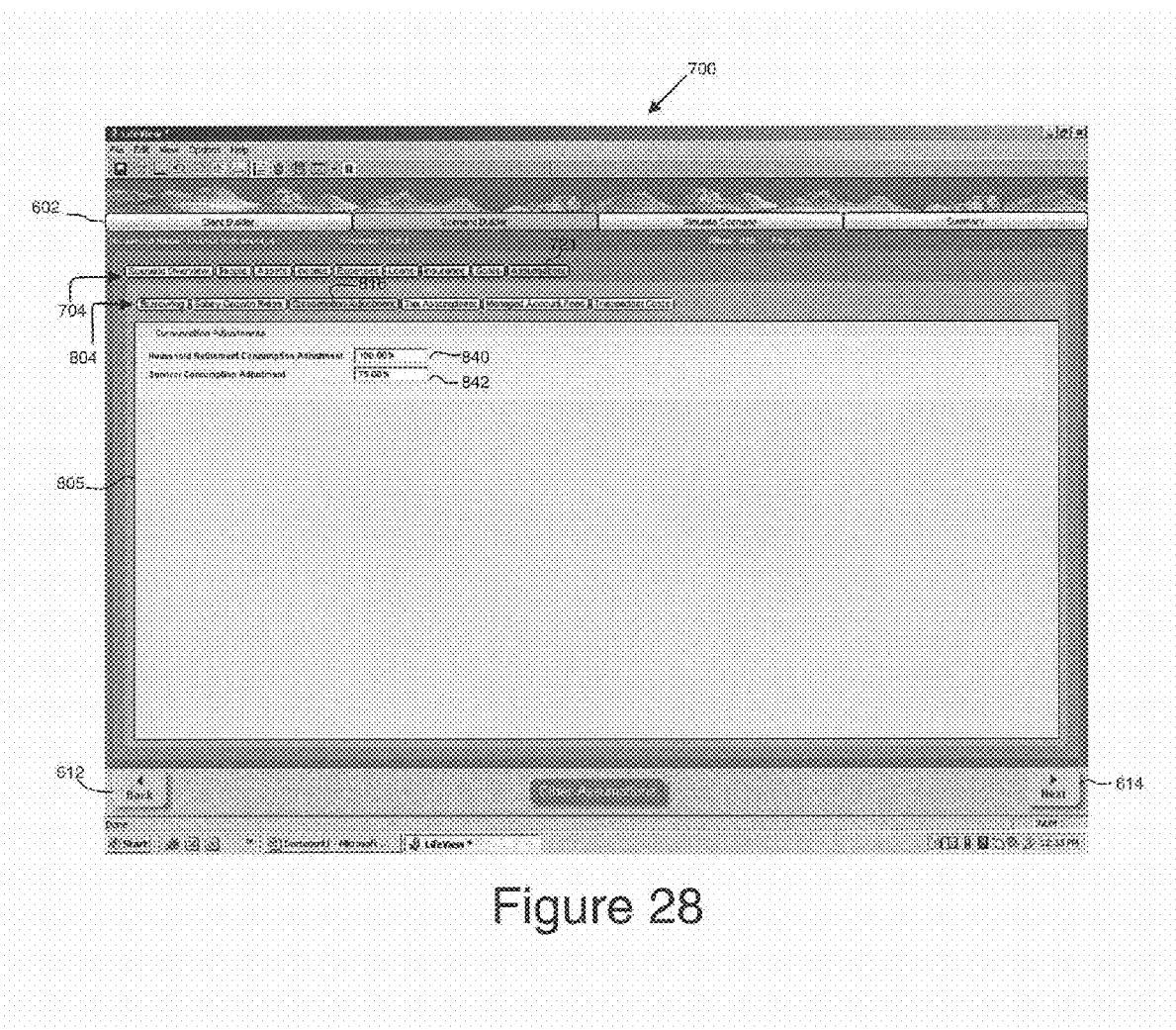

FIG. 28 shows the field 805, according to various embodiments, with the Consumption Adjustment Tab 816 selected. The simulation module 112 may make adjustments to the client's household consumption during the simulations based on the information entered at the Consumption Adjustment tab 816. Default consumption adjustments may be stored, for example, at assumptions database 116. Fields 840 and 842 may allow the user to view and/or edit the default adjustments that the generated model will make to consumption in the event of contingencies. For example, field 840 lists the client's consumption during retirement as a percentage of previous consumption. Field 842 lists the consumption of the client's survivors, if the client were to pass away, as a percentage of previous consumption.

Figure 29:
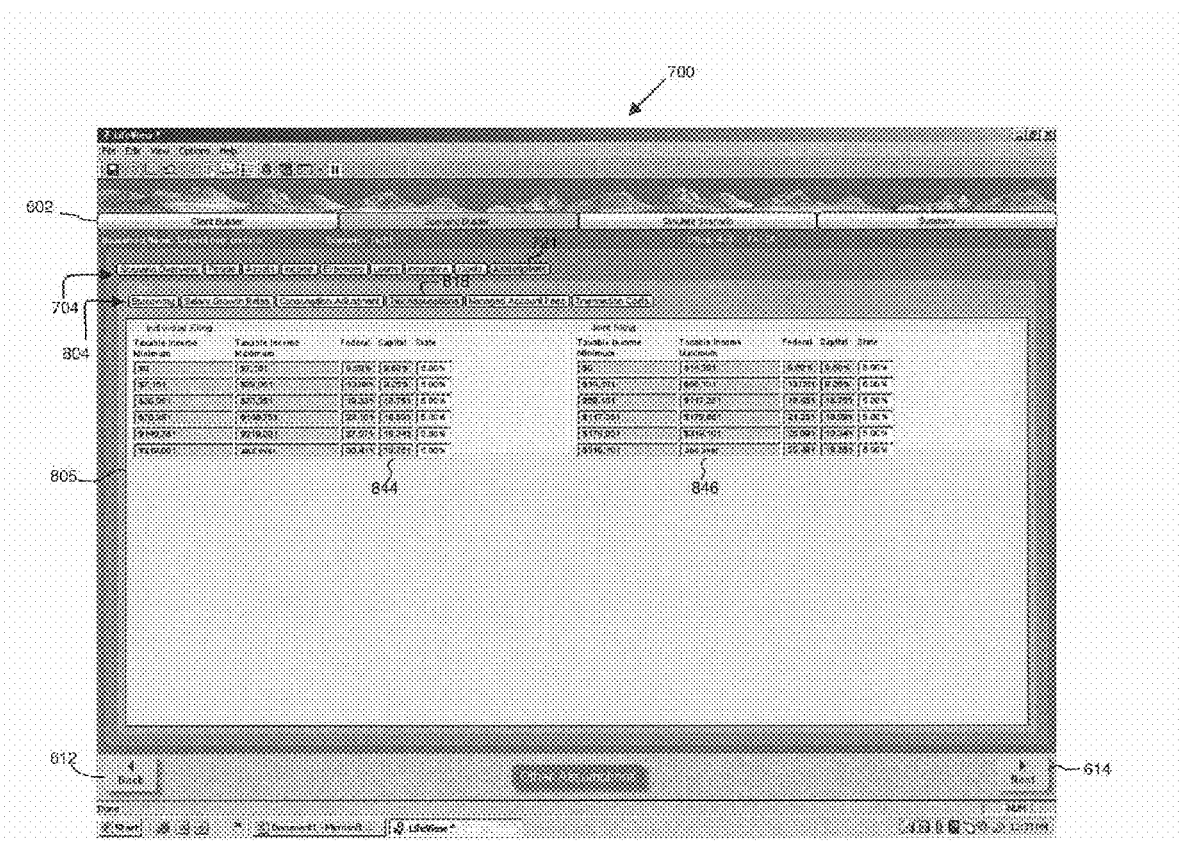

FIG. 29 shows the field 805, according to various embodiments, with the Tax Assumptions tab 818 selected according to various embodiments. The simulation module 112 may model the client's tax liability for each year included within a simulated time period (e.g., a life) based on the information entered at tab 818. Default assumptions regarding tax rates may be stored, for example, at assumptions database 116. With the tab 818 selected, the field 805 may allow the user to alter the default assumptions regarding taxation frameworks that the client will be subject to over the simulations. For example, table 844 shows income tax brackets and rates should the client file individually. Likewise, table 846 shows income tax brackets and tax rates should the client file jointly. In various embodiments, assumptions about capital gains tax rates and structure (not shown) may also be included. It will be appreciated that different tax information may be required in jurisdictions having other types of taxation in addition to, or instead of income taxation. Also, it will be appreciated when the client is a business unit, different tax information such as, for example, corporate rates, will be included.

Figure 30:
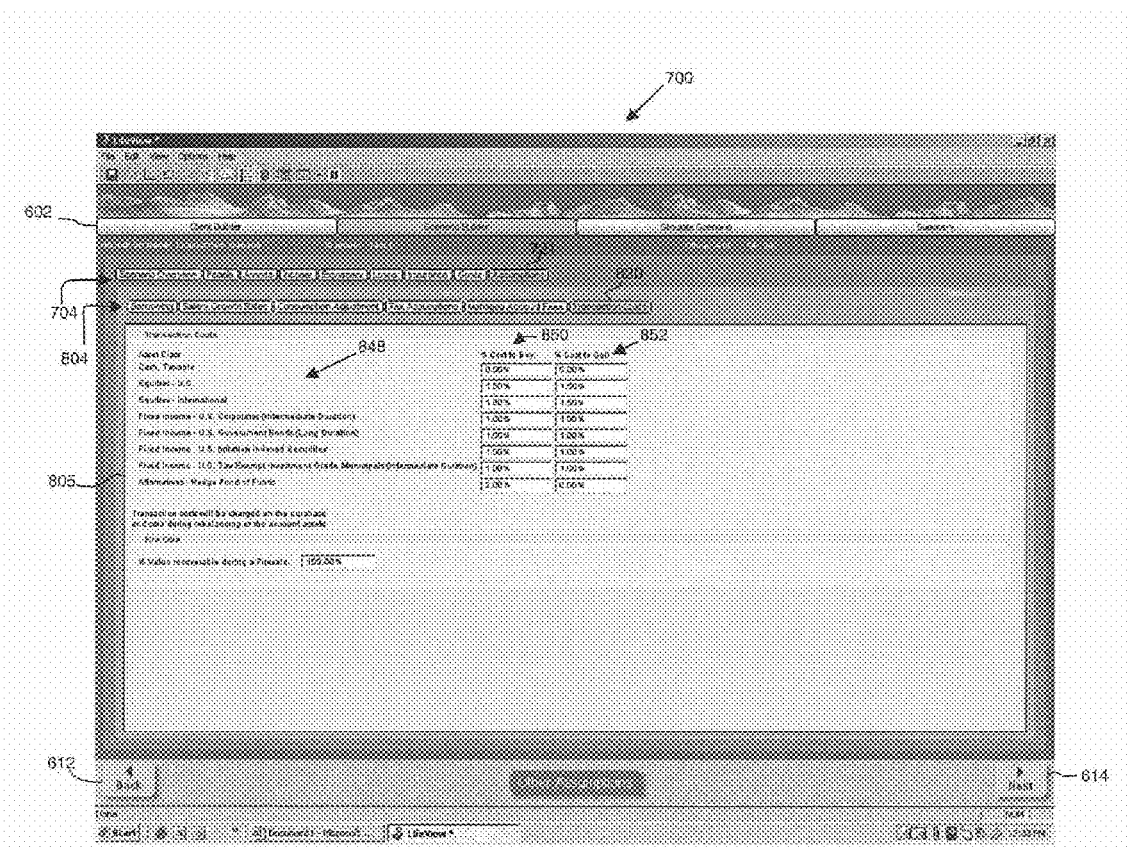

FIG. 30 shows the field 805, according to various embodiments, with the Transaction Cost tab 820 selected. Default transaction costs for buying and selling securities may be stored, for example, at assumptions database 116. When the tab 820 is selected, the field 805 may allow the user to view and/or edit the default transactions costs that will be considered by the simulation module 112 in generating the model. Column 848 lists classes of assets that may be held by the client. Column 850 includes an entry corresponding to each of the asset classes listed in column 848 that sets forth the cost of buying the asset. For example, the cost may be listed as a percentage of the purchase or a flat fee. Column 852 also includes an entry corresponding to each of the asset classes listed in column 848. The entries in column 848 may indicate the cost of selling assets of the corresponding class. Again, the cost may be listed as a percentage of the purchase, or as a flat fee.

Figure 31:
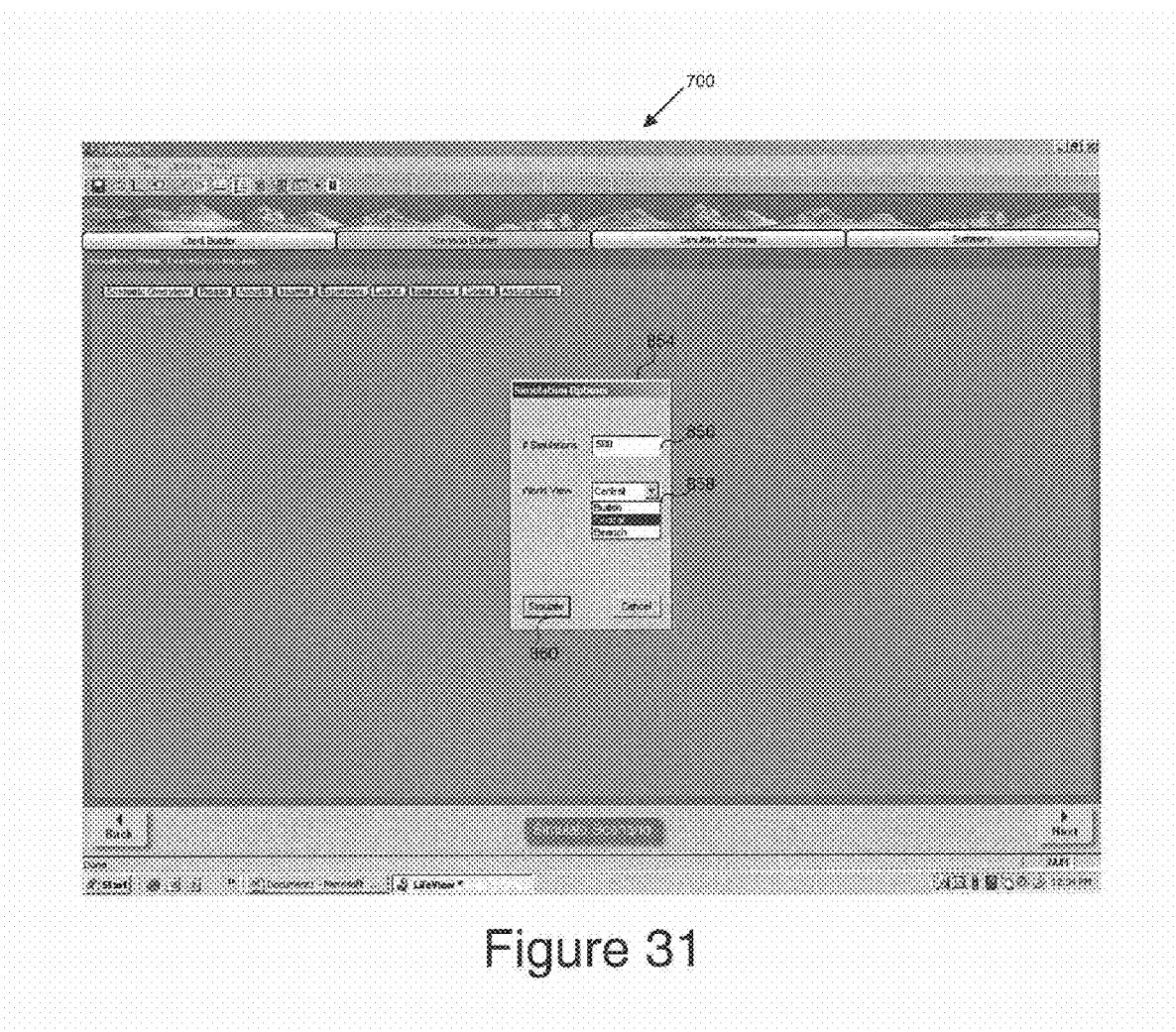

FIG. 31 shows the interface 700, according to various embodiments, including a Simulation Option field 854. The simulation option field 854 may allow the user to define parameters used by the financial modeling tool 100 to model the client's future financial conditions. For example, the number of simulations to be generated may be entered at field 856. In various embodiments, the default number of simulations may be 500. It will be appreciated that a minimum number of simulations, such as 500, may be required to generate a statistically robust result. Also, the economic world view over the forecasted time period may be entered at box 858. The world view may represent the user and/or client's assumptions about the general direction that the economy and markets will take in the future. This may affect the values of financial variables generated by the simulation module 112. Exemplary world views include bullish, bearish, and central. In other embodiments, different view settings and/or a different number of simulations may be used. Selecting the button 860 may activate the simulation module 112, causing the tool 100 to perform the simulations for the client.

FIGS. 32-46 show embodiments of the interface 900, according to various embodiments, configured to display graphical results of the simulations. The interface 900 may include a display field 902, a goal field 906 and a details field 908. The display field 902 shows a graphical representation, and in particular, the topographical chart described herein, representing the results of the model generated by the simulation module 112. The display field 902 may be updated in real time while simulations are being run, or may appear only after all simulations have been completed. Also, the display field 902 may display results for one financial output variable at a time, or the aggregate of multiple financial variables, and may be positioned on a pair of axes 912 and 914 defining a plane. Axis 912 represents time, and axis 914 represents the value of a financial variable or variables (e.g., net worth).

The values of the financial variables versus time generated over the various simulations may be aggregated and plotted on axes 912, 914, resulting in topographical chart 918. Each coordinate set on the axes 912, 914 corresponds to a point on the topographical chart 918. The height (or depth) of any particular point on the topographical chart indicates the number, or percentage, of simulations where the displayed financial variable (e.g., net worth) took the value and time (e.g., $1.5 million in 2021) of the corresponding coordinate set on axes 912, 914. Thus, in one embodiment, peaks on the topographical chart 918 represent outcomes with relatively high probability and topographical points below the peaks (including valleys) represent outcomes with relatively lower probabilities.

The chart 918 may also be color coded, with the color of a plotted point representing the frequency of the occurrence of its corresponding coordinate set. For example, the intensity of a color may indicate the frequency of occurrence (e.g., the probability) of its corresponding coordinate set. Points having colors that are more intense may have occurred in more simulations, while points having colors that are less intense may have occurred in relatively fewer simulations. In various embodiments, the color of points on the topographical chart 918 may also indicate the desirability (from the point of view of the client) of the corresponding coordinate sets. For example, points on the topographical chart 918 corresponding to undesirable coordinate sets (e.g., those indicating that the client lacks sufficient assets and/or income to maintain desired consumption levels, etc.) may be assigned one color, such as red, while points corresponding to desirable coordinate sets may be assigned another color, such as green or brown. It will be appreciated that this color coding may focus the client and/or user on the downside risks they face, and the choices they have to mitigate those risks. It will be appreciated that various shades of color or even additional colors may be used to illustrate gradations between degrees of desirability.

Figure 33:
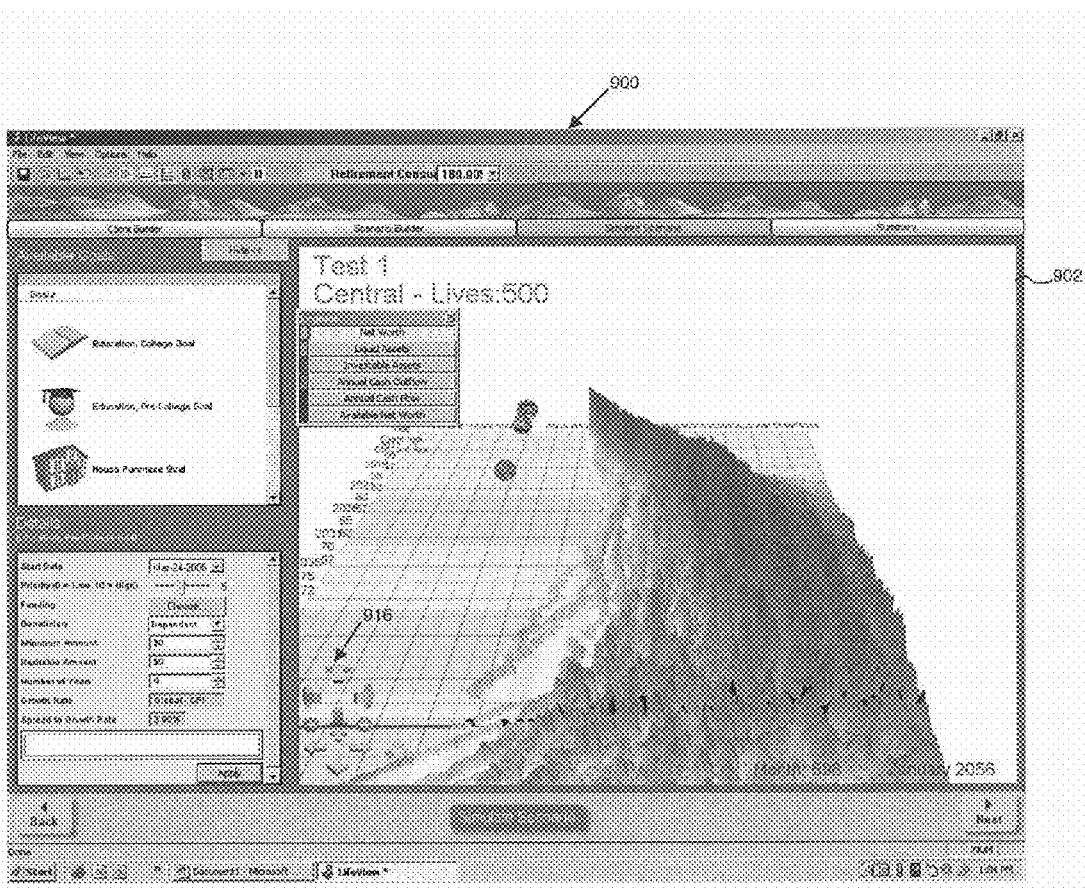
Figure 34:
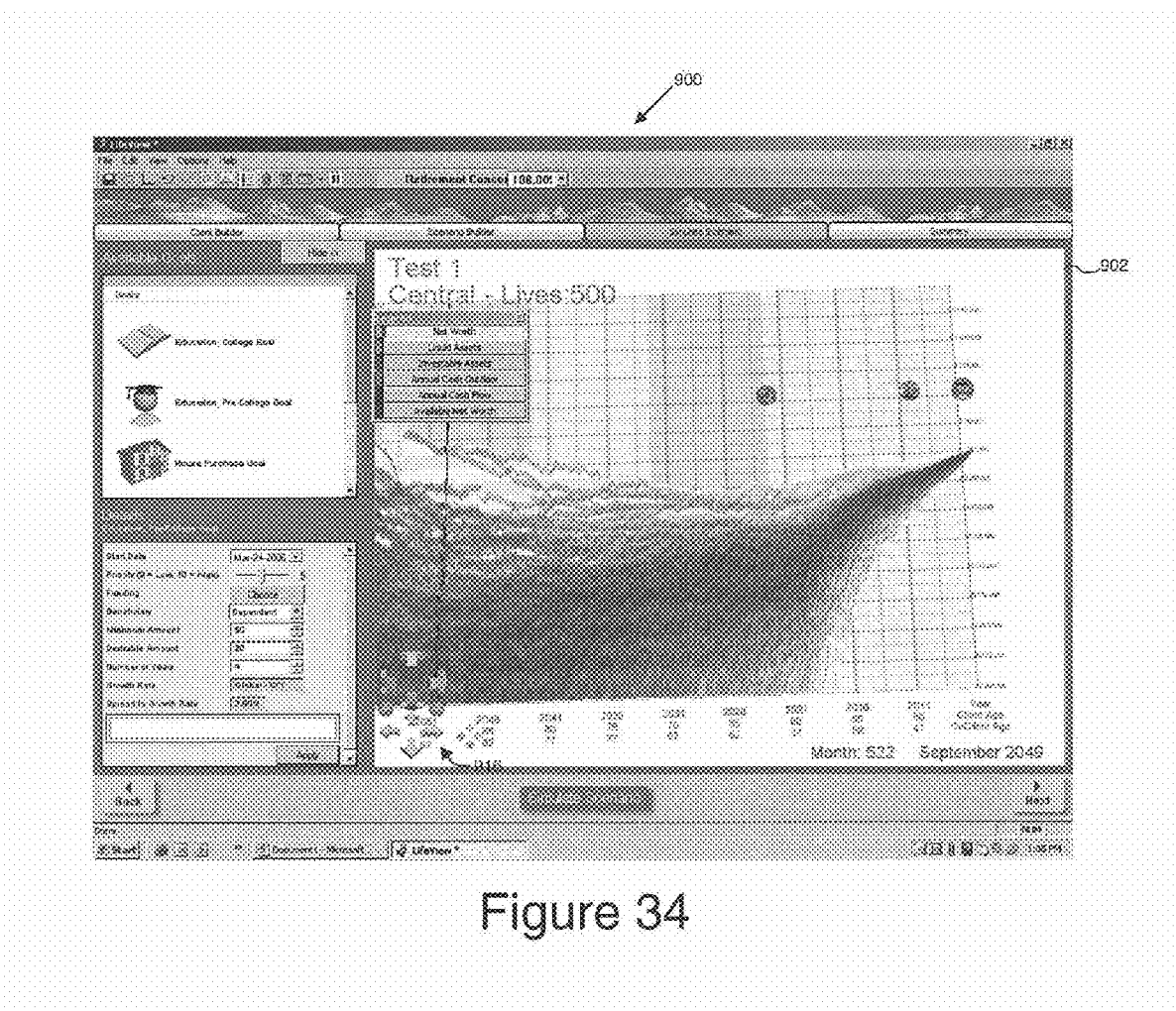
Figure 35:
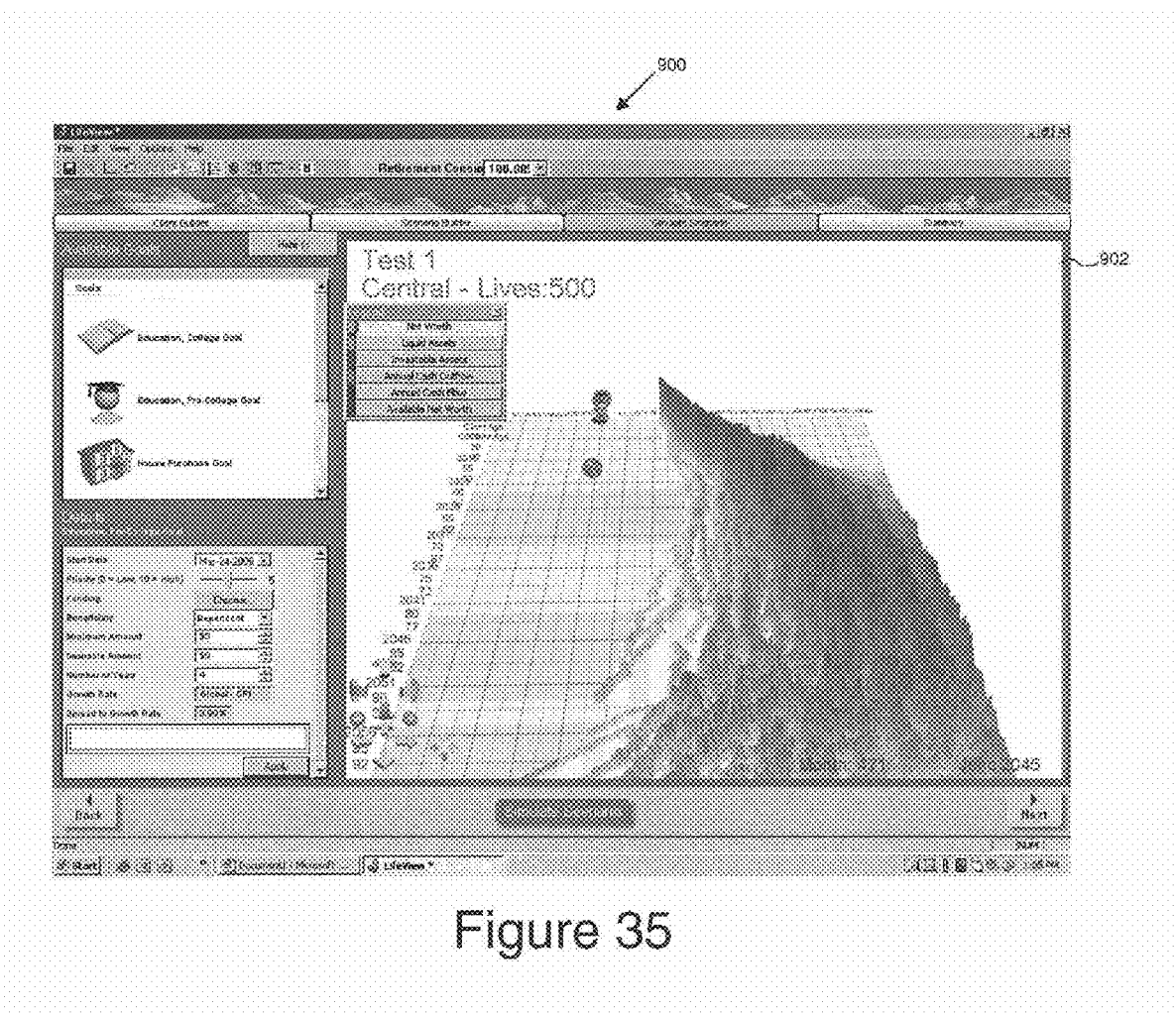

The legend 910 may allow the user to select which financial variable or variables are displayed in topographical chart 918. For example, the user may select a financial variable by actuating its corresponding button in legend 910. It will be appreciated that more than one financial variable at a time may be selected from legend 910 and viewed in field 902. In various embodiments, the legend 910 may be toggled on and off using Legend button 956. Also, the user may navigate the topographical chart 918, for example, using navigation buttons 916. By making the appropriate selection from buttons 916, the user may manipulate the axes 912, 914 of topographical chart 918 to thereby acquire different views of the chart 918, for example, as shown in FIGS. 33-35. Possible manipulations including, for example, linear translations, zoom in/out, rotation about multiple axes, and combinations thereof.

Figure 36:
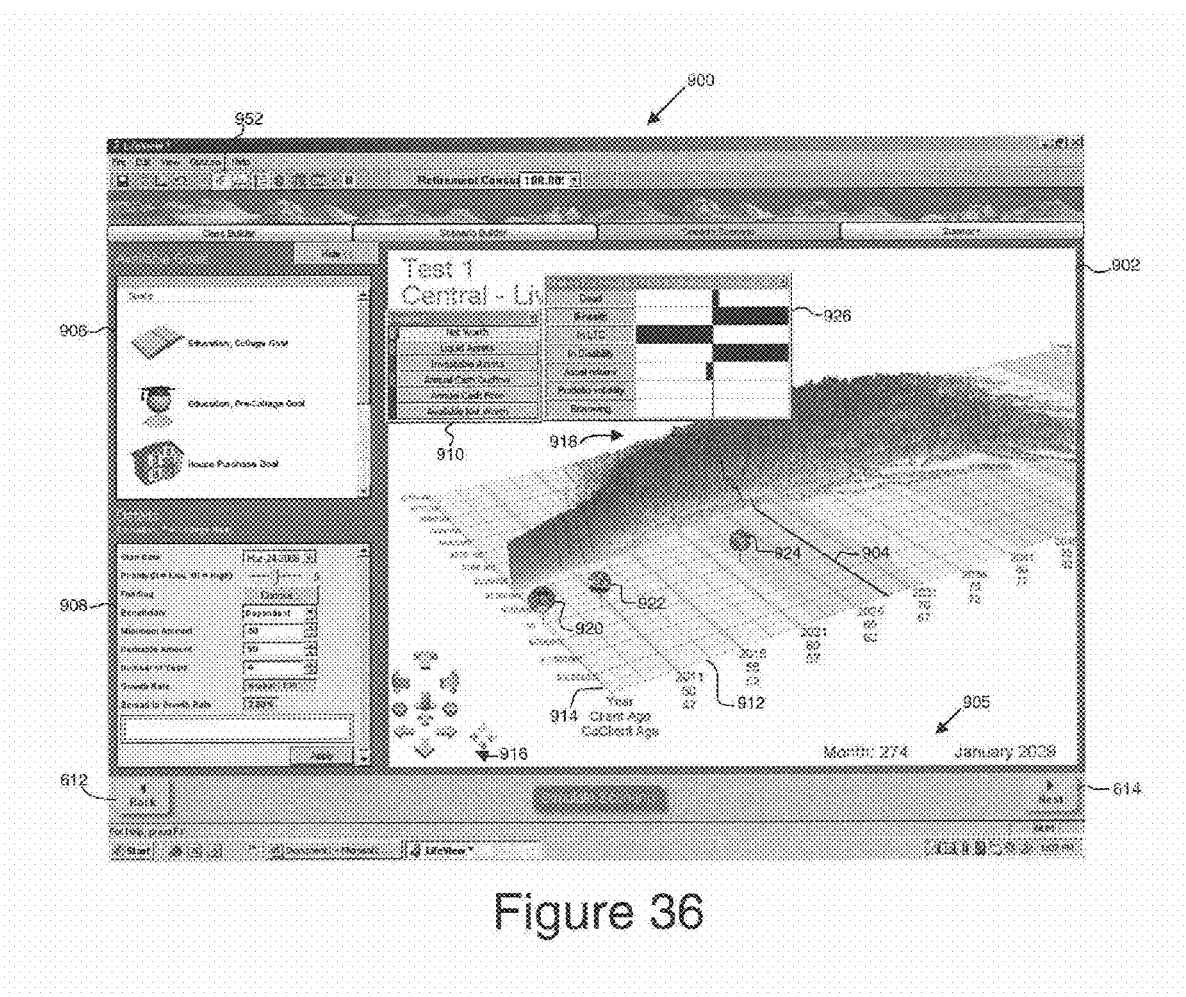
Figure 37:
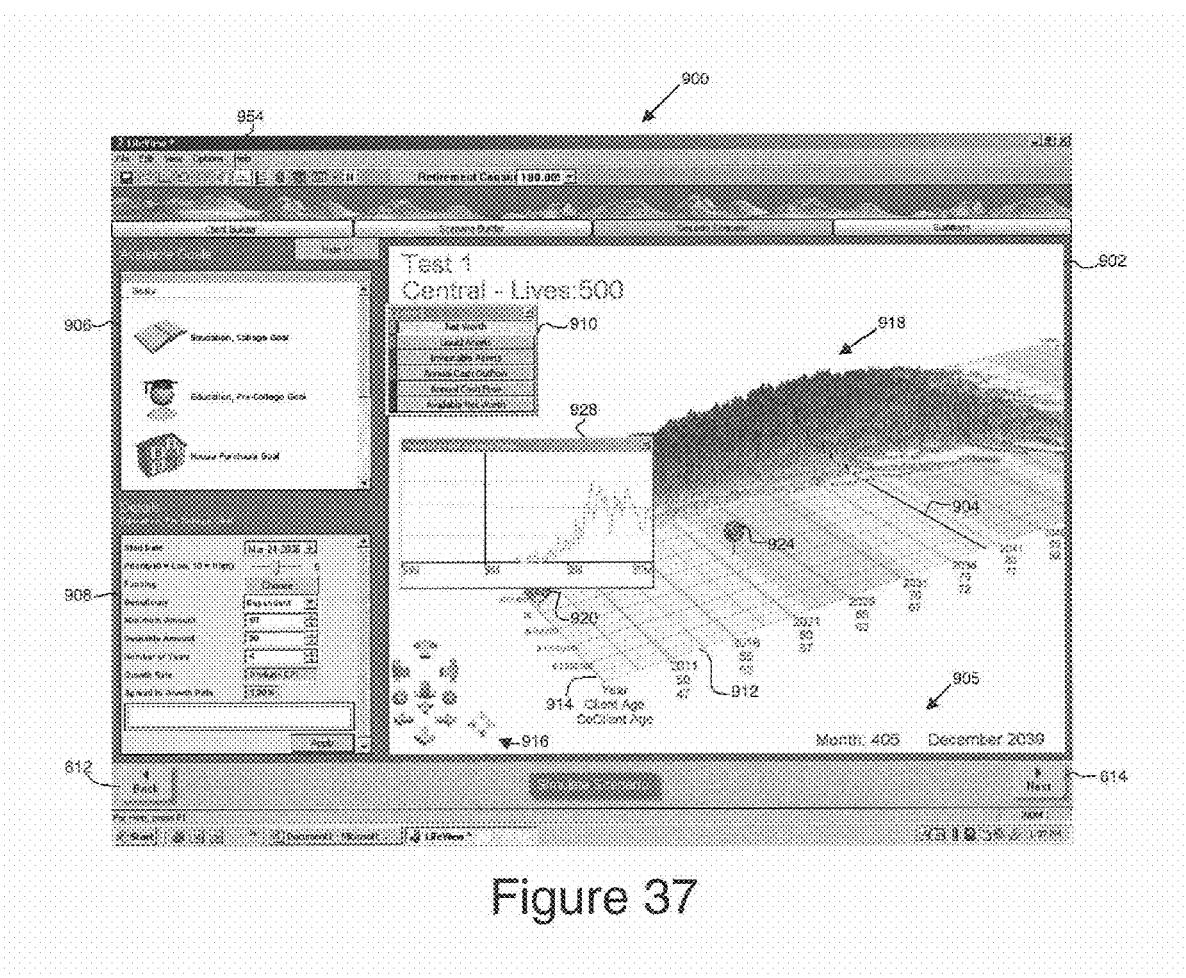

The interface 900 may also include various tools for examining the topographical chart 918. For example, a cursor 904 in FIG. 36 may be placed at any point on the topographical chart 918. In this embodiment, the cursor 904 corresponds to a line intercepting a point on the time axis 912 or a band encompassing multiple points and therefore, a period of time. FIG. 36 shows a state distribution window 926. In various embodiments, the state distribution field may be displayed when the user selects button 952. The state distribution window 926 displays a summary of the state of the client based on the calculated simulation outcomes at the time or period of time represented by the position of the cursor 904. This summary may help explain the events (e.g., in terms of simulations outcomes or otherwise) that are causing the displayed topographical outcome (e.g., the distribution of outcomes with respect to a particular variable or variables) at that time or period of time. For example, the state distribution field 926 may show the number and/or percentage of local simulations where the client is dead, in ill-health, in long term care, in disability, and/or borrowing money at the cursor location. Again, the state of the client in any particular simulation may be determined based on input data stored, for example, in the assumptions database 116 and may be considered in generating values for the financial variables in a given simulation. The state distribution field 926 may also show the volatility of the client's portfolio over the simulations. In various embodiments, the interface 900 also includes a monthly histogram field 928, shown in FIG. 37. The monthly histogram field 928 may be displayed when the user selects button 954, and may show a distribution of a selected financial variable over all simulations at a given cursor location (e.g., time). In other words, the histogram field 928 may display a time cross-section of the topographical chart 918. Viewing the distribution of financial variable values in this way may help the user and/or client to understand the client's likely financial condition and plan accordingly. For example, if the selected financial variable is asset return for some or all of the client's assets, knowing the likely distribution of asset returns may help the client develop an appropriate hedging strategy. Also, if the selected financial variable is client borrowing, then insight can be provided regarding how much leverage risk the client is taking on. The location of the cursor 904, designated by a month and year, is displayed at field 905.

The simulation module 112 may also compute a likelihood of the client achieving desirable and acceptable levels of goal spend (e.g., the amount available to spend on a goal considering other goals and expenses) and the expected distribution of goal spend outcomes. The success or failure of each goal may be indicated at display field 902. For example, a representation or icon for each goal may be positioned along the time axis 912. The exemplary chart in FIG. 32 includes three goal representations 920, 922 and 924. The representations may be placed at positions corresponding to the start date for the goals. In various embodiments, each of the representations 920, 922, 924 may also include a number indicating the number and/or percentage of simulations in which the client achieves the respective goals. The representations 920, 922, 924 may also, or alternatively, be colored to indicate the number and/or percentage of simulations in which the client achieves the respective goals.

Figure 38:
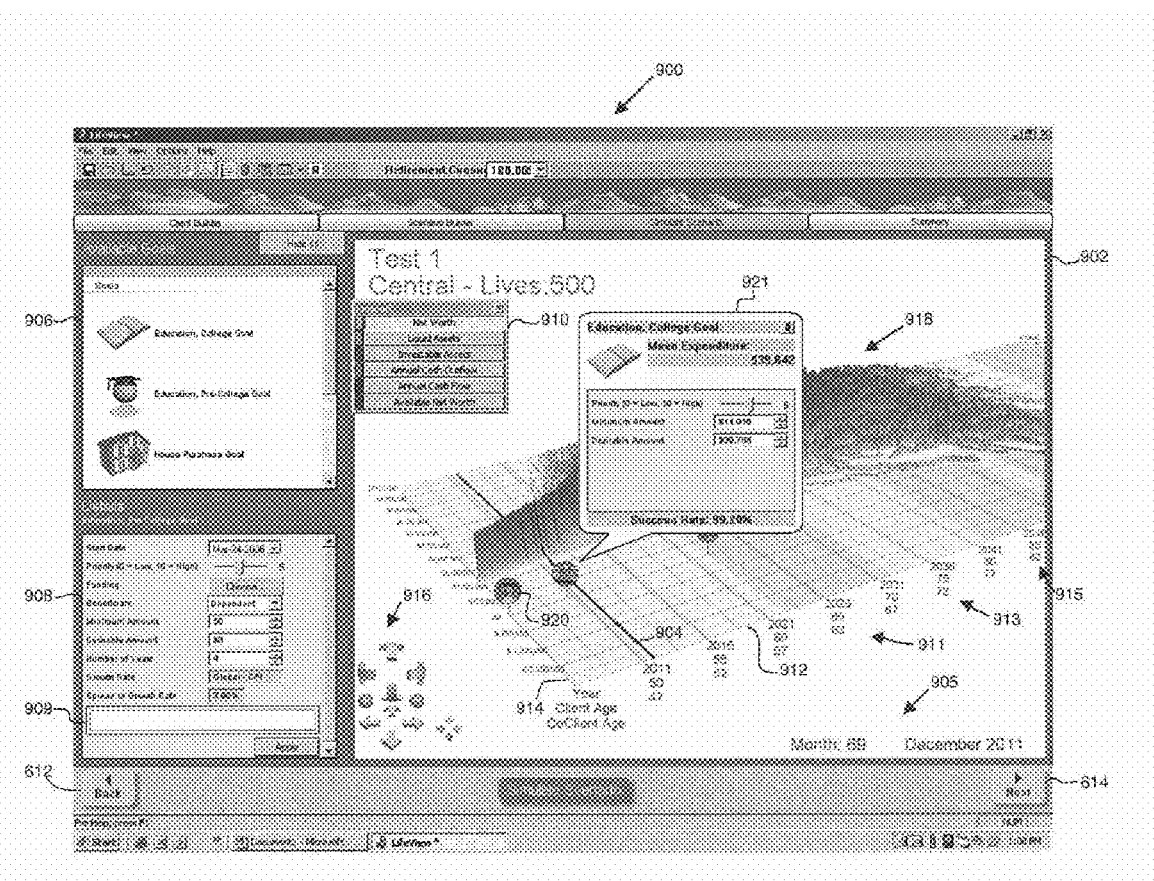
Figure 38A:
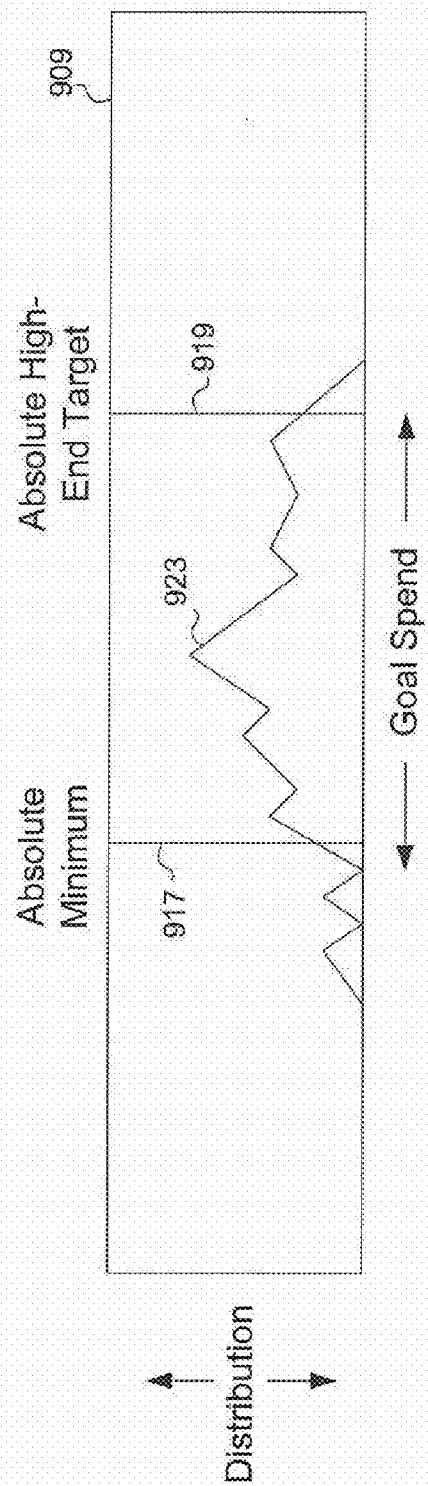

Selecting the representation 920, 922, 924 of a goal may cause additional detailed information about the goal to be displayed, as shown in pop-up field 921 in FIG. 38. Pop-up field 921 may include additional detailed information about goal 920 including, for example, the average amount that the client has available to spend on the selected goal in light of expenses and other goals (e.g., goal spend) the goal's priority, the goal's absolute minimum amount, the goals high-end target amount, and the client's success rate with the goal. Additional detailed information about the selected goal, in this case goal 920, may also be listed at details field 908. The details field 908 may include a chart 909, shown in more detail at FIG. 38A, that graphically displays the selected goal's absolute minimum amount 917, high-end target amount 919, and the distribution of amounts available for the goal over the simulations 923.

It will be appreciated that details of the selected goal may be modified at details field 908 and/or pop-up field 921. Also, the time horizon of the goal may be moved by selecting the representation for the goal and dragging it along the time axis 912. Additional goals may be added to the financial model, for example, by selecting a goal icon from field 906 and/or by selecting and dragging an icon from field 906 to field 902. It will be appreciated that different types of insurance, levels of borrowing and changes to asset allocation may also be added to the financial model. In other words, the client and/or user can test the implications of incurring different levels of risk in different ways (e.g., insuring or self insuring a risk; accepting a higher risk of failing to meet a goal versus taking more risk in the investment portfolio, etc.). It will be appreciated that adding additional goals, or modifying details and/or the time horizon of the selected goal causes the simulation module 112 to regenerate the simulations based on the modified goal. In that way, dynamic adjustments to the client's forecast can be achieved by modifying a goal.

Figure 39:
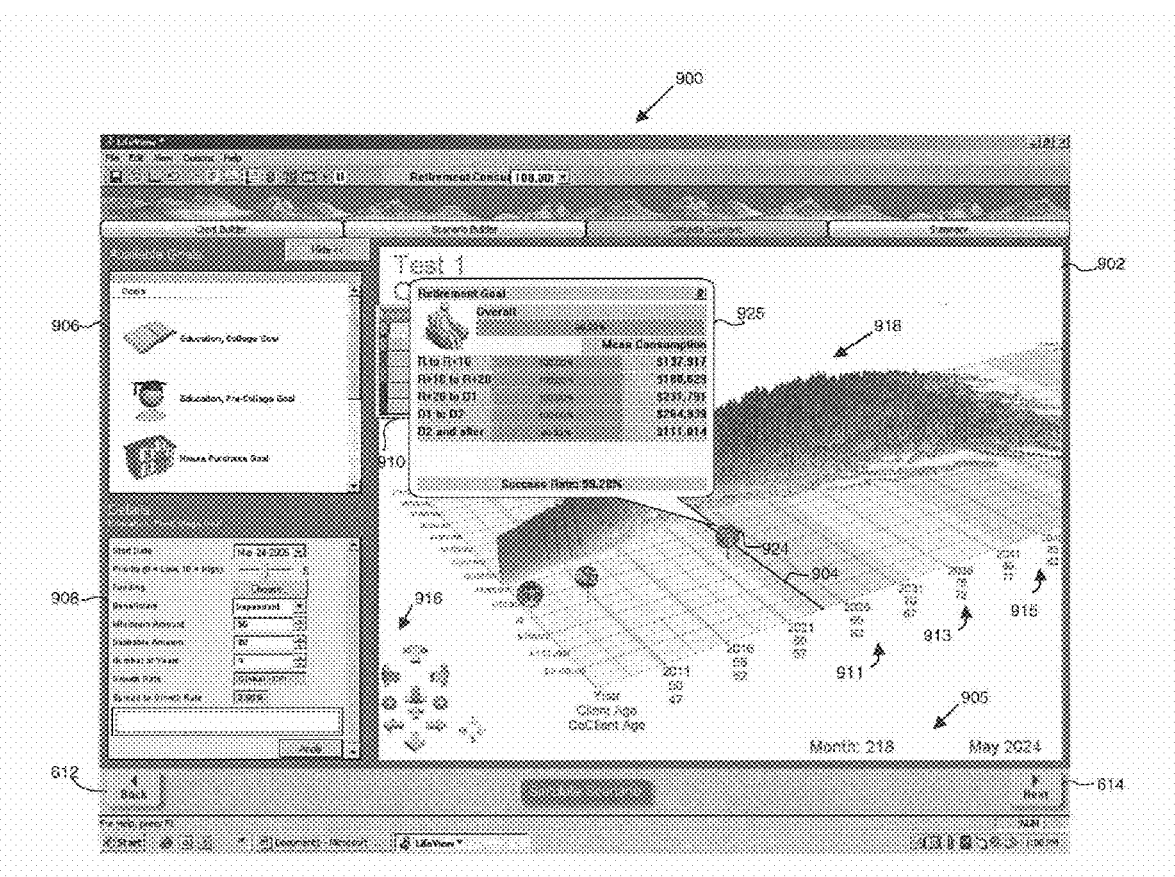

FIG. 39 shows an embodiment of the interface 900 with the retirement goal 924 selected according to various embodiments. Pop-up field 925 shows detailed information regarding the success rate of the retirement goal. Success for the retirement goal may be measured by whether the client has sufficient income and/or assets to maintain their desired level of consumption after retirement. In various embodiments, the success or failure of the retirement goal may be judged by dividing the client's retirement into multiple bands. Each band may represent a block of years during the client's retirement. For example, in the embodiment depicted by FIG. 36, the client's retirement is divided into three bands, with the first band representing the first ten years of retirement, the second band representing the second ten years of retirement and the third band representing subsequent years of retirement. The simulation module 112 may calculate a success rate for each of the retirement bands, as well as a success rate for the retirement goal overall. If, during a simulation, the client has died before the start of a band then that simulation may not be included in the statistics for that band. If no lives live into a band then that band is not included in the determination of retirement success. The various bands of the retirement goal may also be shown on the plane formed by axes 912 and 914, for example, as bands 911, 913, 915. The success rate of each band may be indicated, for example, by its color.

Figure 39A:
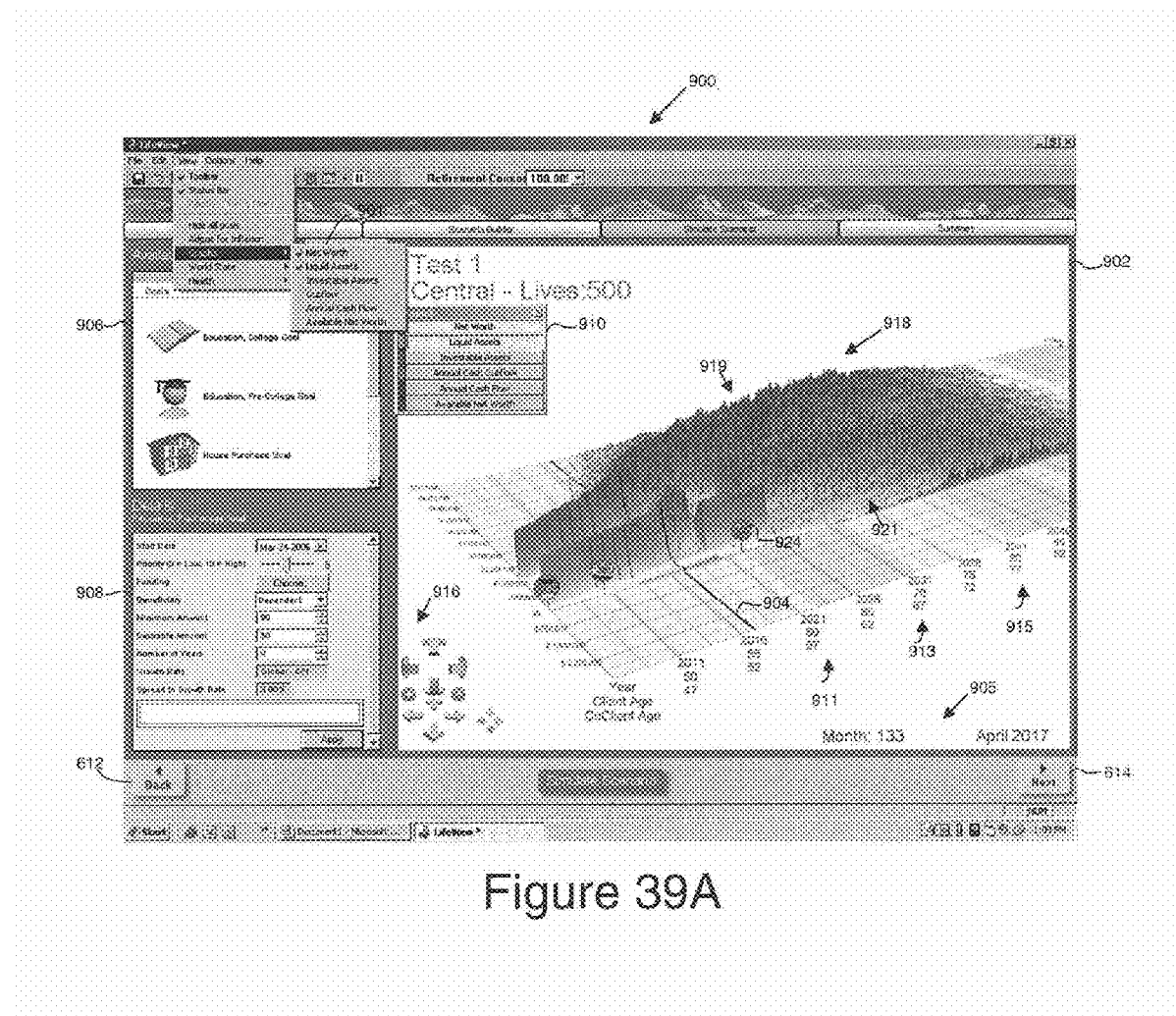

It will be appreciated that the topographical chart 918 may be configured to display results for multiple financial variables simultaneously, if desired. For example, FIG. 39A shows a representation of the client's net worth 919 and liquid assets 921. In various embodiments, the financial variables displayed by the topographical chart 918 may be selected from drop-down menu 901. Different financial variables may be displayed in different colors. For example, in FIG. 39A, net worth 919 is shown in shades of brown, while liquid assets 921 are shown in shades of green.

Figure 40:
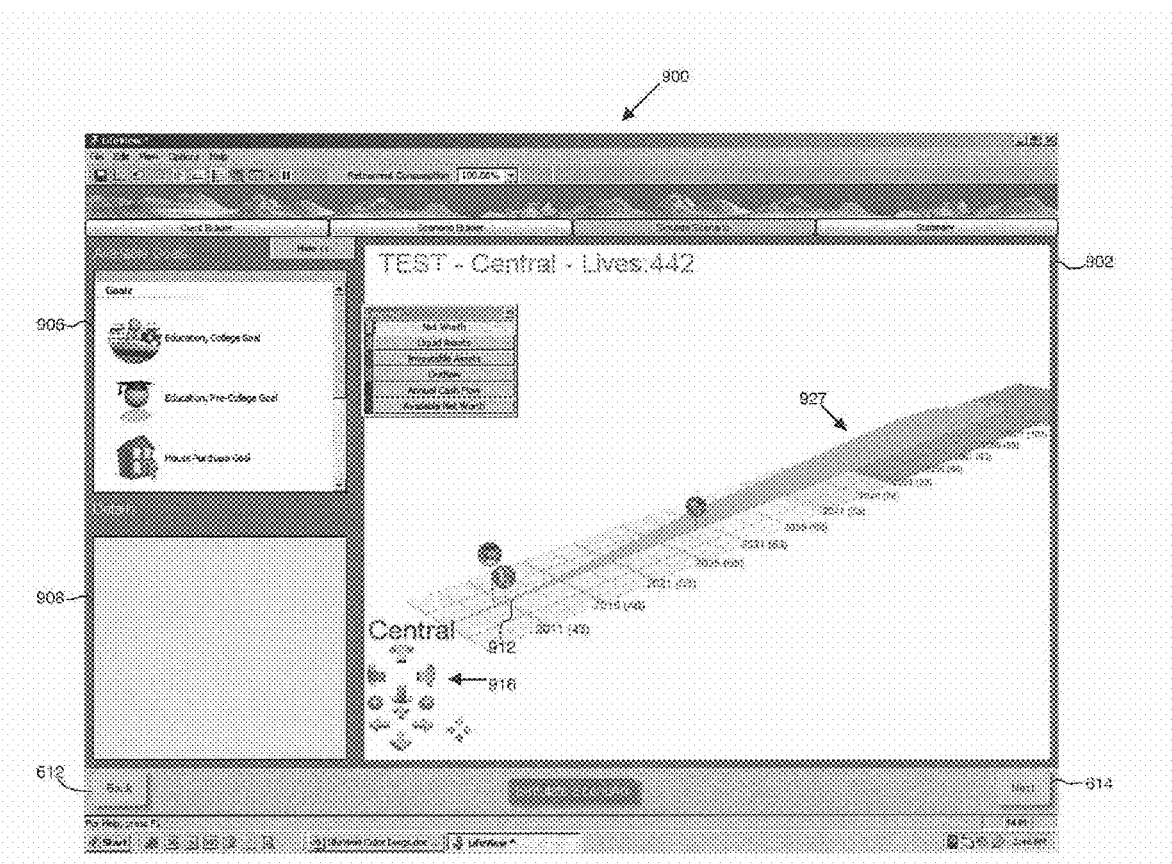
Figure 41:
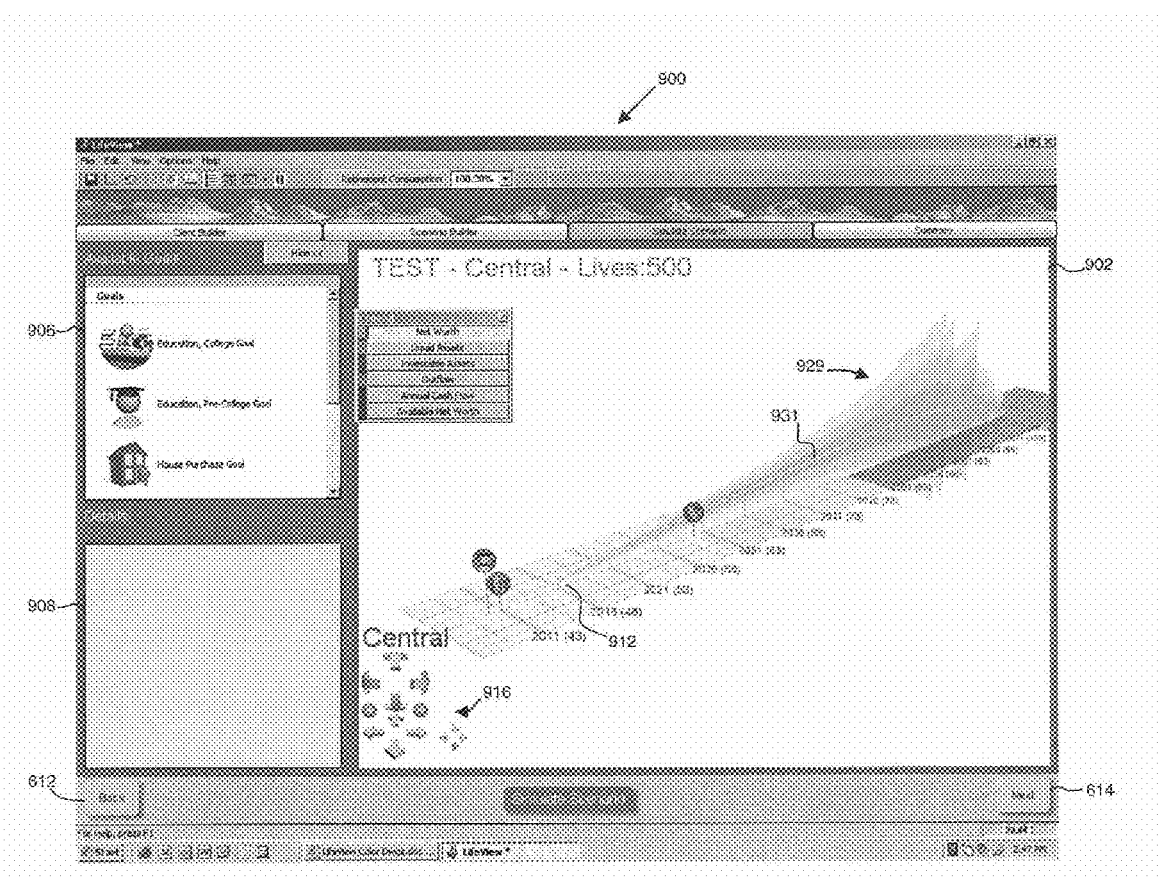
Figure 42:
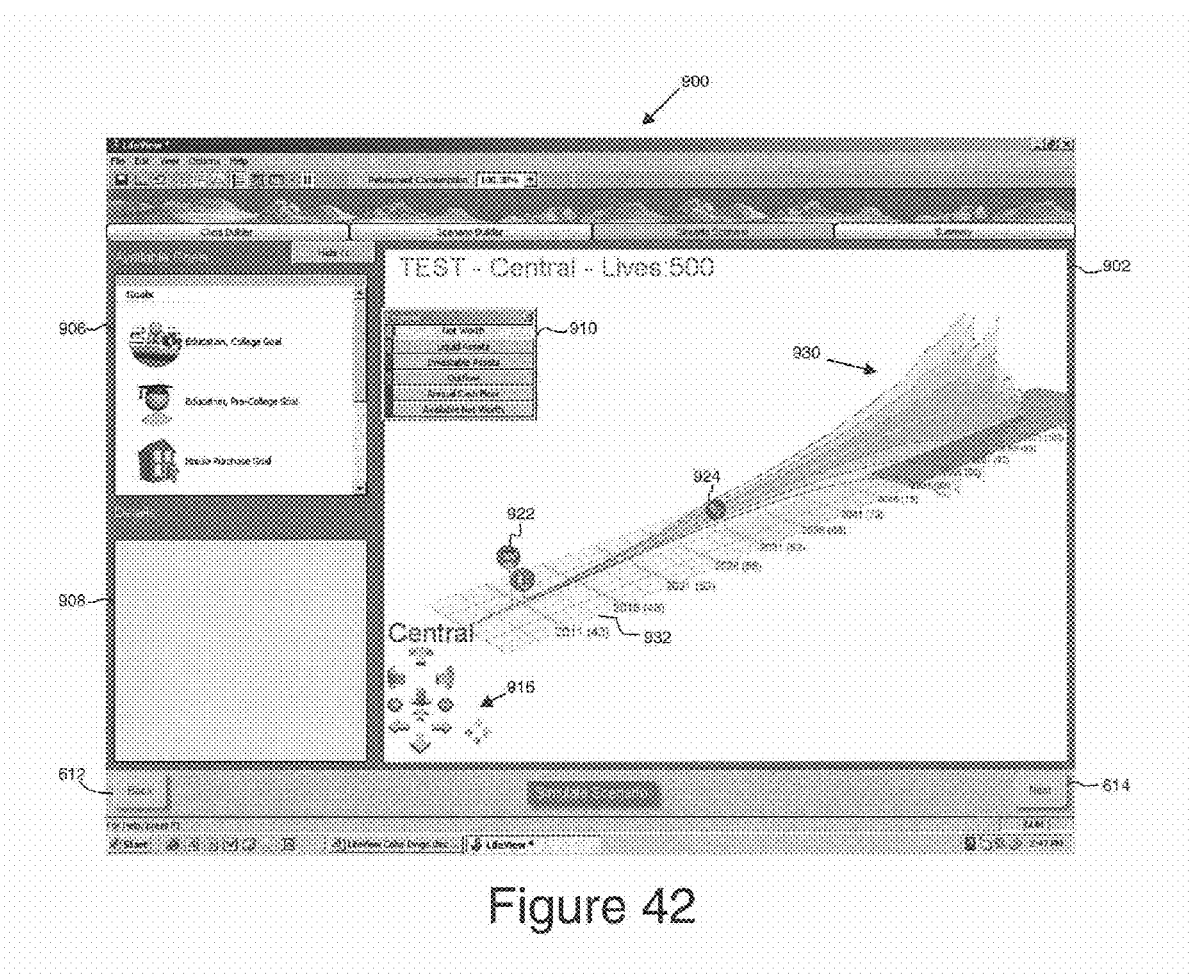

In various embodiments, other chart types may be used in addition to or instead of the topographical chart 918. For example, FIG. 40 shows the display field 902 configured to display a line chart 927. The expected average value of the selected financial variable and/or variable (based on the simulation) at a point in time along the time axis 912 is indicated by the height (or depth) of the line chart 927. Also, FIG. 41 shows the display field 902 configured to show a step chart 929. The height (or depth) of the step chart 929 at a position on the time axis 912 may indicate the range (e.g., from maximum through minimum) of values of the selected financial variable has over the various simulations. The color of the step chart 929 may indicate the likelihood of values within the range. For example, the step chart 929 includes a line 931 indicating an average value for the displayed variable or variables. A series of colored bands extend upward and downward from the line 931, with the color of each band indicating the number of simulations resulting in values of the displayed financial variable or variables within the band. For example, in FIG. 41, bands with darker colors represent values of the displayed financial variable that were returned by relatively more of the simulations. FIG. 42 shows a step chart 930 similar to the step chart 929, but having dark lines separating the various colored bands. It will be appreciated that the results of the various simulations may be displayed according to any suitable graph or chart format.

Figure 43:
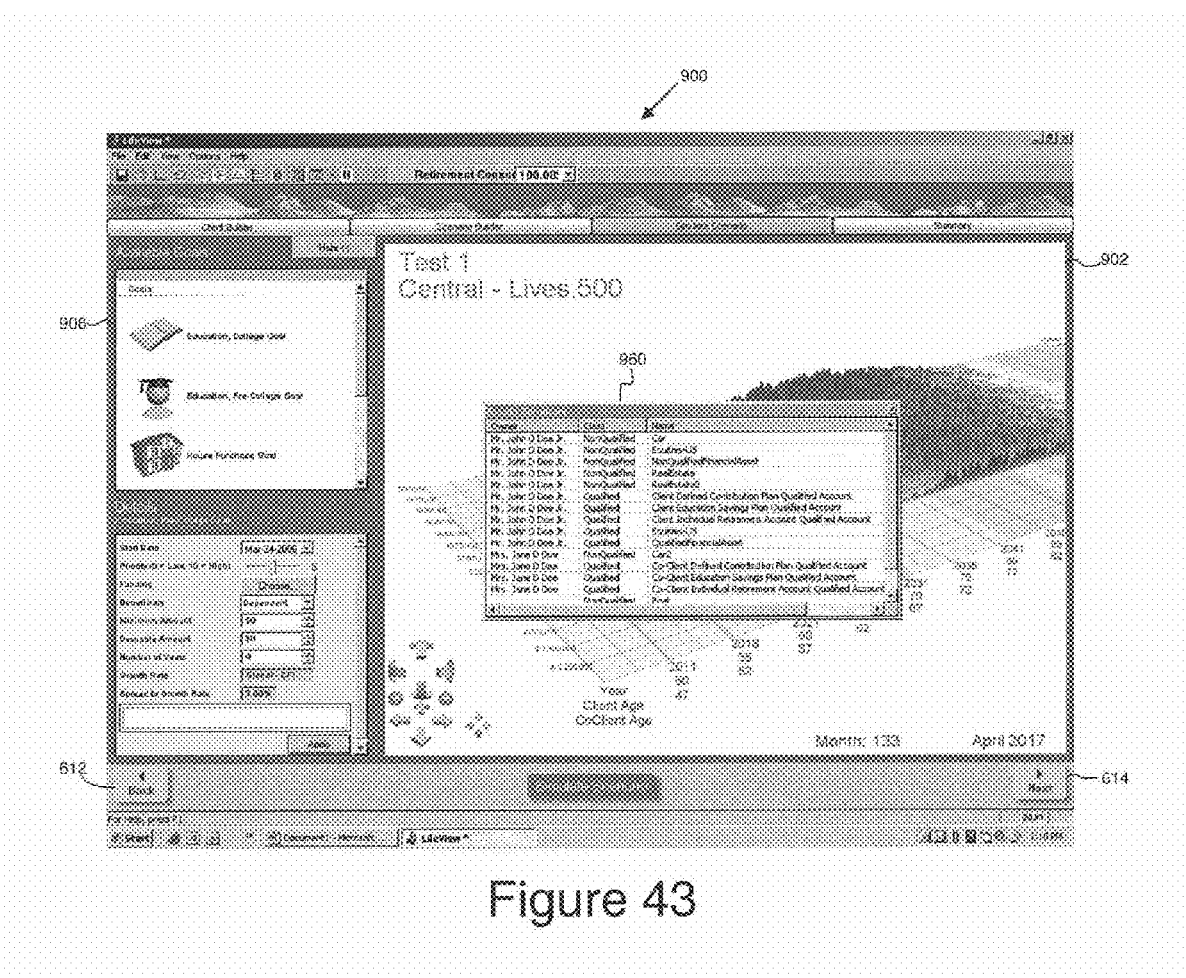
Figure 44:
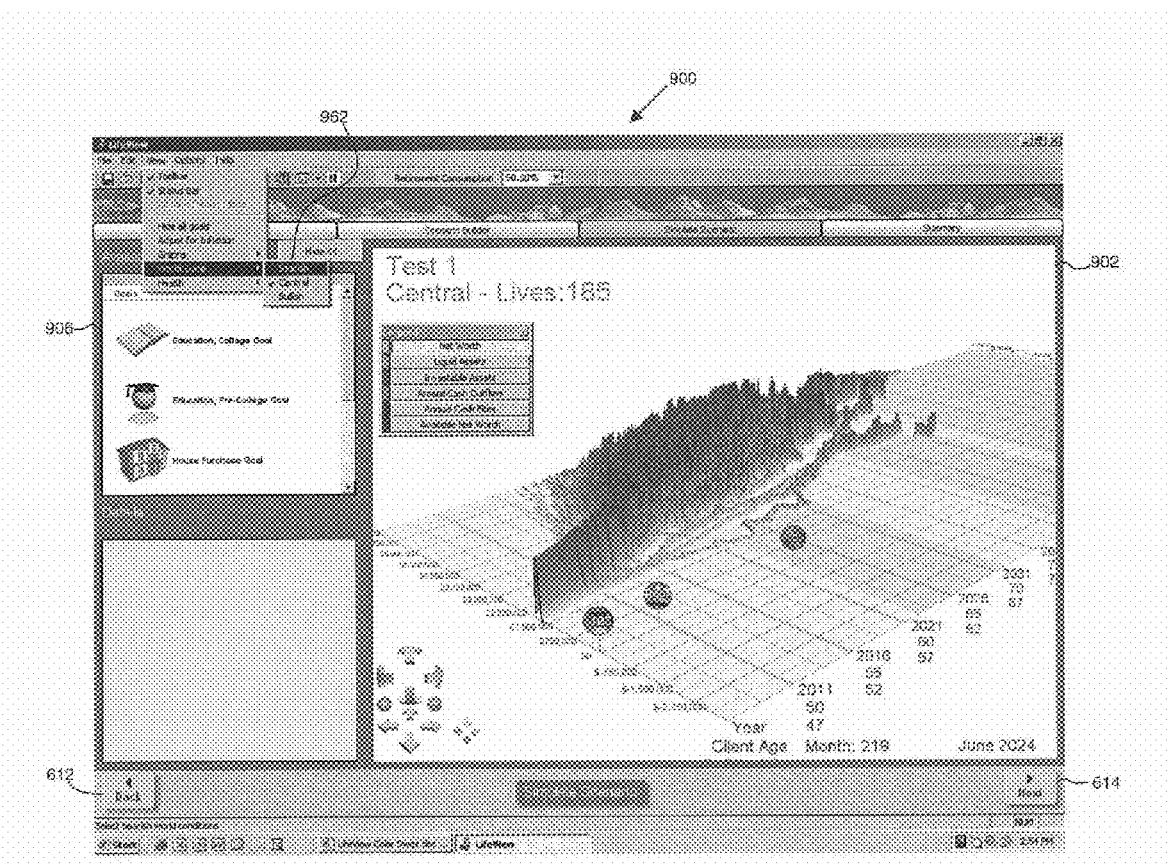
Figure 45:
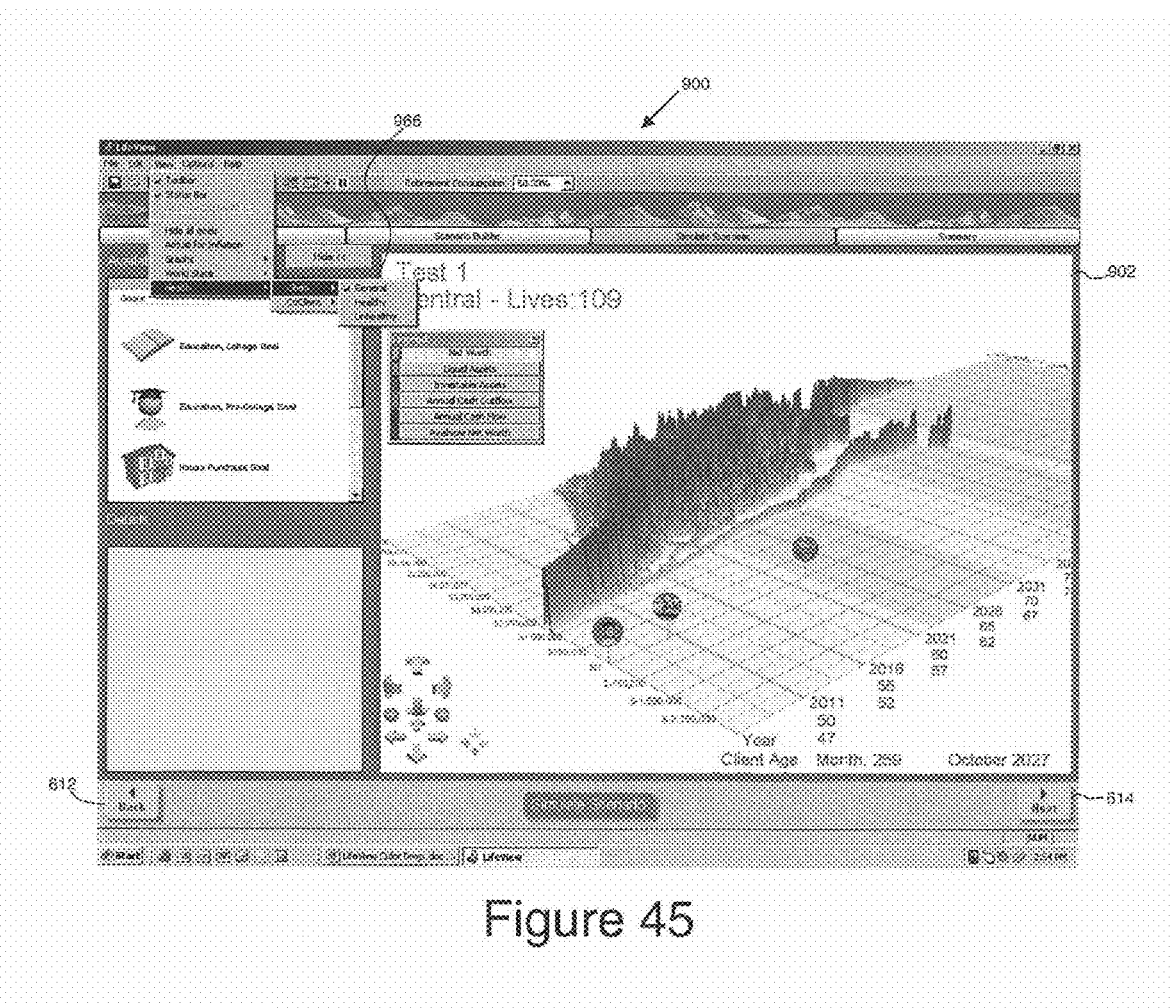
Figure 46:
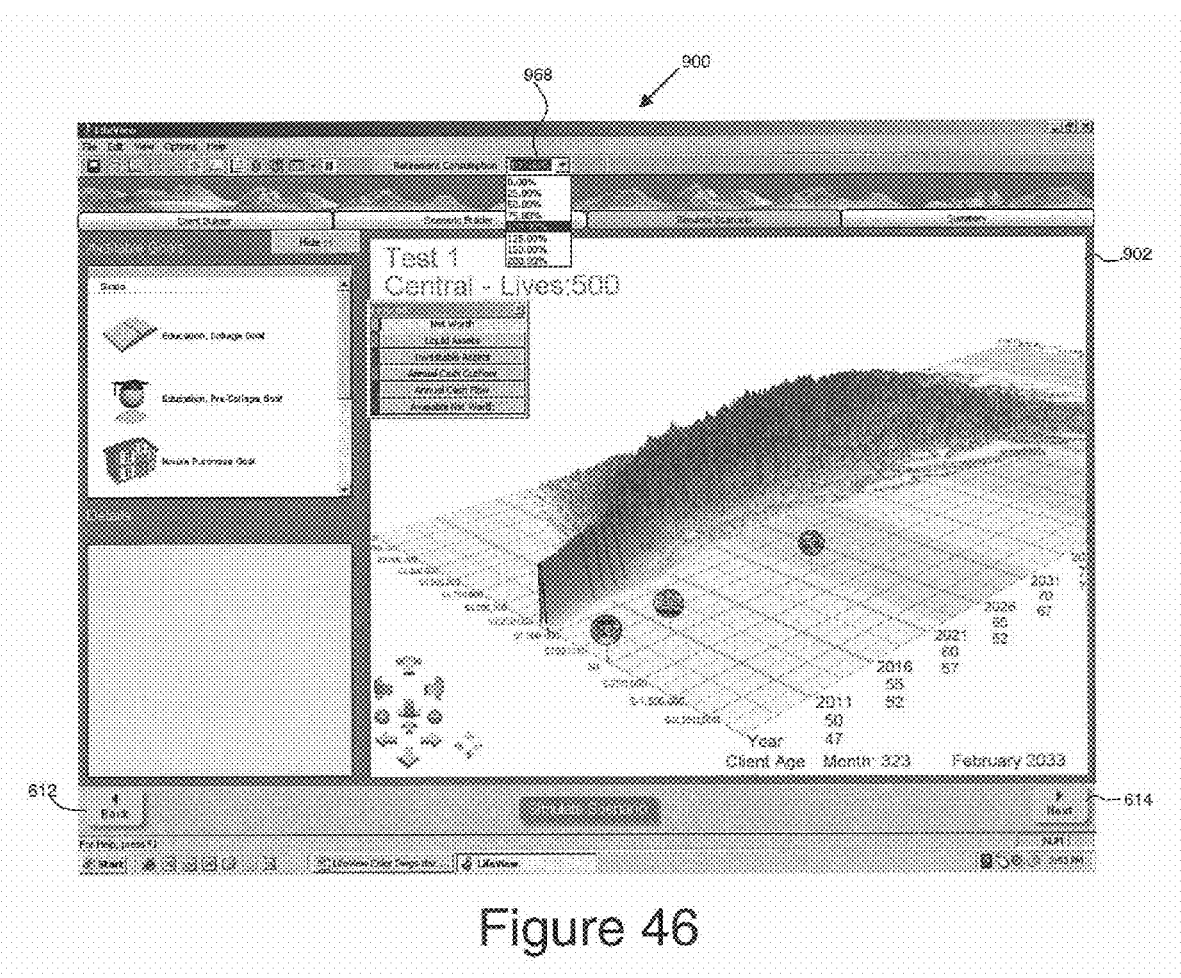

The interface 900 may provide various additional options for manipulating the view and/or simulations. Referring to FIG. 32, selecting the Inflation Adjustment button 950 may cause the display field 902 to show results that are adjusted for the rate of inflation (i.e., the results may be displayed in constant or future dollars). Also, selecting Asset button 958 may cause a table of the client's initial assets to be displayed at an asset window 960 as shown in FIG. 43. In addition, it will be appreciated that the user may be able to make additional dynamic adjustments to the parameters and assumptions underlying the model of the client's financial condition. For example, the user may dynamically adjust the economic world view by selecting the world state menu 962 from the view menu of the interface 900 as shown, for example, at FIG. 44. Also, the user may adjust assumptions regarding the client or co-client's health by selecting health field 966 from the view menu of the interface 900, for example, as shown in FIG. 45. The user may also modify assumptions regarding the client's post-retirement consumption using drop-down menu 968, shown in FIG. 46. It will be appreciated that dynamically adjusting a parameter or assumption may cause simulation module 112 to recalculate the various simulations considering the modified parameter or assumption.

As used herein: the term, "client" refers to an individual or household that is the subject of a financial modeling tool; and the term, "user" refers to an operator of the financial modeling tool. In various embodiments, the user may also be a client or an employee of a client. In other non-limiting embodiments, the user may be a financial advisor providing advice to the client.

It is to be understood that the figures and descriptions of the present invention have been simplified to illustrate elements that are relevant for a clear understanding of the present invention, while eliminating, for purposes of clarity, other elements, such as, for example, details of inputs and outputs for user interface screens 300, 600, 700, 900, 1000, etc. Those of ordinary skill in the art will recognize that these and other elements may be desirable. It will be appreciated, for example, that any of the input fields described above may be any kind of input field including, drop-down menus, text entry fields, etc. However, because such elements are well known in the art and because they do not facilitate a better understanding of the present invention, a discussion of such elements is not provided herein.

As used herein, a "computer" or "computer system" may be, for example and without limitation, either alone or in combination, a personal computer (PC), server-based computer, main frame, server, microcomputer, minicomputer, laptop, games console, personal data assistant (PDA), cellular phone, pager, processor, including wireless and/or wireline varieties thereof, and/or any other computerized device capable of configuration for processing data for standalone application and/or over a networked medium or media. Computers and computer systems disclosed herein may include operatively associated memory for storing certain software applications used in obtaining, processing, storing and/or communicating data. It can be appreciated that such memory can be internal, external, remote or local with respect to its operatively associated computer or computer system. Memory may also include any means for storing software or other instructions including, for example and without limitation, a hard disk, an optical disk, floppy disk, ROM (read only memory), RAM (random access memory), PROM (programmable ROM), EEPROM (extended erasable PROM), and/or other like computer-readable media.

The various modules 108,112 of the system 110 may be implemented as software code to be executed by a processor(s) of the system 110 or any other computer system using any type of suitable computer instruction type. The software code may be stored as a series of instructions or commands on a computer readable medium.

The term "computer-readable medium" as used herein may include, for example, magnetic and optical memory devices such as diskettes, compact discs of both read-only and writeable varieties, optical disk drives, and hard disk drives. A computer-readable medium may also include memory storage that can be physical, virtual, permanent, temporary, semi-permanent and/or semi-temporary. A computer-readable medium may further include one or more data signals transmitted on one or more carrier waves.

While several embodiments of the invention have been described, it should be apparent that various modifications, alterations and adaptations to those embodiments may occur to persons skilled in the art with the attainment of some or all of the advantages of the present invention. It is therefore intended to cover all such modifications, alterations and adaptations without departing from the scope and spirit of the present invention as defined by the appended claims.

We claim:

1. A computer-implemented method of displaying results of a financial model for forecasting at least one financial variable relating to a client comprising:

receiving with a computer, from a plan database, asset and liability data regarding the client, wherein the computer comprises at least one processor and operatively associated memory, wherein the computer is in electronic communication with the plan database;

receiving with the computer, from an assumption database, actuarial data describing probabilities of the client entering at least one state selected from the group consisting of: deceased, disabled, and requiring long-term care, wherein the computer is in electronic communication with the assumption database;

receiving with the computer, from an economic database, economic data describing historical economic data describing historic stock market performance, historic interest rate values and historic inflation rates;

receiving with the computer, from a regulation database, regulation data describing regulations affecting the financial model including at least one regulation selected from the group consisting of a tax code, a securities law, and a securities regulation, generating with the computer forecasted values for the at least one financial variable over a number of simulations of a predetermined time period using the asset and liability data, wherein the generating comprises for each simulation:

randomly determining at least one state of the client at a plurality of points during the predetermined time period considering a likelihood of the client assuming the at least one state, wherein the determining is based on the actuarial data; and randomly determining a first value for at least one economic variable selected from the group consisting of a stock market value, an interest rate and an inflation rate, considering a likelihood of the economic variable taking the first value;

calculating the value of the at least one financial variable based on the at least one state of the client and the first value for the at least one economic variable based on the economic data and the regulation data; and displaying with the computer a topographical chart on a user interface, wherein the topographical chart is positioned on a plane shown in the user interface, wherein the plane is defined by a time axis and a value axis for the at least one financial variable, such that a coordinate set on the plane represents the value of the at least one financial variable at a time point, and wherein a height of a first point on the topographical chart corresponding to the coordinate set indicates a portion of the simulations that result in the coordinate set.

2. The method of claim 1, wherein a height of a second point on the topographical chart indicates a portion of the simulations that result in a second coordinate set corresponding to the second point.

3. The method of claim 1, wherein a color of the first point indicates the portion of the simulations that result in the coordinate set.

4. The method of claim 1, wherein a color of the first point indicates the desirability of the value of the at least one financial variable at the time point represented by the coordinate set.

5. The method of claim 1, wherein the topographical chart further comprises a representation of a goal, wherein the representation comprises an indication of a portion of the number of simulations where the goal is met.

6. The method of claim 5, wherein the indication is at least one of a color of the representation of the goal, and a number associated with the representation of the goal.

7. The method of claim 5, wherein the goal describes a retirement of the client, and wherein a success rate of the retirement is indicated for each of a plurality of time blocks included in the retirement.

8. The method of claim 1, wherein the topographical chart further comprises:

a cursor configured to be placed on the topographical chart at a first point on the time axis; and an information field configured to display information about the values of the financial variables over the number of simulations at the first point on the time axis.

9. The method of claim 1, wherein the asset and liability data includes an estimate of yearly expenses of the client.

10. The method of claim 9, wherein the estimate of yearly expenses of the client are broken into categories, wherein the sum of the categories is equal to the estimate.

11. The method of claim 10, wherein one of the categories is an Other category and wherein the Other category includes a difference between the estimate and the sum of the remaining categories.

12. A computer-implemented method of displaying results of a financial model for forecasting at least one financial variable relating to a client, the user interface comprising:

receiving with a computer partial asset and liability data regarding the client, wherein the computer comprises at least one processor and operatively associated memory;

receiving with the computer, from an assumption database, actuarial data comprising a death distribution describing probabilities that the client will die, a disability distribution describing probabilities that the client will become disabled and a long-term care distribution describing probabilities that the client will require long term care, wherein the computer is in electronic communication with the assumption database;

receiving with the computer, from an economic database, economic data describing historical economic data describing historic stock market performance, historic interest rate values and historic inflation rates;

receiving with the computer, from a regulation database, regulation data describing regulations affecting the financial model including at least one regulation selected from the group consisting of a tax code, a securities law, and a securities regulation, generating with the computer forecasted values for the at least one financial variable over a number of simulations of a predetermined period using the partial asset and liability data wherein the generating comprises, for each simulation:

for each of a plurality of time points during the predetermined time period, randomly determining values for a plurality of states of the client considering the actuarial data, wherein the plurality of states comprise a state describing whether the client is dead, a state describing whether the client is disabled, and a state describing whether the client requires long term care, wherein determining the values for the plurality of states of the client comprises considering covariances between the plurality of states; and for each of the plurality of time points, calculating the value of the at least one financial variable based on the at least one state of the client, the economic data and the regulation data;

displaying with the computer a topographical chart on a user interface, wherein the topographical chart is positioned on a plane shown in the user interface, wherein the plane is defined by a time axis and a value axis for the at least one financial variable, such that a coordinate set on the plane represents the value of the at least one financial variable at a time point, and wherein a height of a first point on the topographical chart corresponding to the coordinate set indicates a portion of the simulations that result in the coordinate set;

displaying with the computer a movable cursor configured to be placed on the topographical chart, wherein the position of the cursor indicates a point in time;

displaying with the computer an information field configured to display information about the at least one financial variable at the point in time corresponding to a location of the cursor;

receiving additional asset and liability data regarding the client;

generating with the computer additional forecasted values for the at least one financial variable over a number of additional simulations of a predetermined period using the partial asset and liability data and the additional asset and liability data wherein the generating comprises, for each simulation:

for each of a plurality of time points during the predetermined time period, randomly determining values for a plurality of states of the client, wherein the plurality of states comprise a state describing whether the client is dead, a state describing whether the client is disabled, and a state describing whether the client requires long term care, wherein determining the values for the plurality of states of the client comprises considering covariances between the plurality of states; and for each of the plurality of time points, calculating the value of the at least one financial variable based on the at least one state of the client, the economic data and the regulation data; and displaying with the computer a second topographical chart on a user interface, wherein the second topographical chart is positioned on a plane shown in the user interface, wherein the plane is defined by a time axis and a value axis for the at least one financial variable, such that a coordinate set on the plane represents the value of the at least one financial variable at a time point, and wherein a height of a first point on the topographical chart corresponding to the coordinate set indicates a portion of the additional simulations that result in the coordinate set.

13. The method of claim 12, wherein the at least one financial variable comprises a return on at least one asset of the client.

14. The method of claim 12, wherein the at least one financial variable comprises a level of borrowing of the client.

15. The method of claim 12, wherein the information about the at least one financial variable comprises a distribution of the at least one financial variable at the point in time over the simulations.

16. The method of claim 12, wherein the user interface further comprises a plurality of navigation buttons, whereby selecting one or more of the plurality of navigation buttons changes the viewing angle of the topographical chart within the user interface.

17. The method of claim 12, further comprising a representation of a goal of the client, wherein the representation is positioned at a second point in time, and wherein the representation includes an indication of a portion of the simulations in which the goal is met.

18. The method of claim 17, wherein the second point in time corresponds to a start date of the goal.

19. The method of claim 17, wherein placing the cursor at the second point in time displays detailed information about the goal.

20. The method of claim 19, wherein the detailed information about the goal is editable.

21. The method of claim 17, wherein the indication is at least one of a color of the representation, and a number included in the representation.

22. The method of claim 17, wherein the goal describes a retirement of a client, and wherein a success rate of the retirement is indicated for a plurality of time blocks included in the retirement.

23. A system for displaying results of a financial model for forecasting at least one financial variable relating to a client, the system comprising at least one computer, wherein the computer comprises at least one processor and operatively associated memory, and wherein the memory comprises instructions thereon that, when executed by the at least one processor, causes the at least one computer to:

receive from a plan database, asset and liability data regarding the client;

receive from an assumption database actuarial data describing probabilities of the client entering at least one state selected from the group consisting of: deceased, disabled, and requiring long-term care, wherein the computer is in electronic communication with the assumption database;

receive from an economic database, economic data describing historical economic data describing historic stock market performance, historic interest rate values and historic inflation rates;

receive from a regulation database, regulation data describing regulations affecting the financial model including at least one regulation selected from the group consisting of a tax code, a securities law, and a securities regulation, generate forecasted values for the at least one financial variable over a number of simulations of a predetermined time period using the asset and liability data, wherein the generating comprises for each simulation:

randomly determining at least one state of the client at a plurality of points during, the predetermined time period considering a likelihood of the client assuming the at least one state, wherein the determining is based on the actuarial data; and randomly determining a first value for at least one economic variable selected from the group consisting of a stock market value, an interest rate and an inflation rate, considering a likelihood of the economic variable taking the first value;

calculating the value of the at least one financial variable based on the at least one state of the client and the first value for the at least one economic variable based on the economic data and the regulation data; and display a topographical chart on a user interface, wherein the topographical chart is positioned on a plane shown in the user interface, wherein the plane is defined by a time axis and a value axis for the at least one financial variable, such that a coordinate set on the plane represents the value of the at least one financial variable at a time point, and wherein a height of a first point on the topographical chart corresponding to the coordinate set indicates a portion of the simulations that result in the coordinate set.

24. A system of displaying results of a financial model for forecasting at least one financial variable relating to a client, the system comprising at least one computer, wherein the computer comprises at least one processor and operatively associated memory, and wherein the memory comprises instructions thereon that, when executed by the at least one processor, causes the at least one computer to:

receive partial asset and liability data regarding the client;

receive from an assumption database actuarial data comprising a death distribution describing probabilities that the client will die, a disability distribution describing probabilities that the client will become disabled and a long-term care distribution describing probabilities that the client will require long term care, wherein the computer is in electronic communication with the assumption database;

receive from an economic database economic data describing historical economic data describing historic stock market performance, historic interest rate values and historic inflation rates, wherein the computer is in electronic communication with the economic database;

receive from a regulation database regulation data describing regulations affecting the financial model including at least one regulation selected from the group consisting of a tax code, a securities law, and a securities regulation, wherein the computer is in electronic communication with the regulation database, generate forecasted values for the at least one financial variable over a number of simulations of a predetermined period using the partial asset and liability data wherein the generating comprises, for each simulation:

for each of a plurality of time points during the predetermined time period, randomly determining values for a plurality of states of the client considering the actuarial data, wherein the plurality of states comprise a state describing whether the client is dead, a state describing whether the client is disabled, and a state describing whether the client requires long term care, and wherein determining the values for the plurality of states of the client comprises considering covariances between the plurality of states; and for each of the plurality of time points, calculating the value of the at least one financial variable selected from the group consisting of a stock market value, an interest rate and an inflation rate based on the at least one state of the client, the economic data and the regulation data;

display a topographical chart on a user interface, wherein the topographical chart is positioned on a plane shown in the user interface, wherein the plane is defined by a time axis and a value axis for the at least one financial variable, such that a coordinate set on the plane represents the value of the at least one financial variable at a time point, and wherein a height of a first point on the topographical chart corresponding to the coordinate set indicates a portion of the simulations that result in the coordinate set;

display a movable cursor configured to be placed on the topographical chart, wherein the position of the cursor indicates a point in time;

display an information field configured to display information about the at least one financial variable at the point in time corresponding to a location of the cursor;

receive additional asset and liability data regarding the client;

generate additional forecasted values for the at least one financial variable over a number of additional simulations of a predetermined period using the partial asset and liability data and the additional asset and liability data wherein the generating comprises, for each simulation:

for each of a plurality of time points during the predetermined time period, randomly determining values for a plurality of states of the client, wherein the plurality of states comprise a state describing whether the client is dead, a state describing whether the client is disabled, and a state describing whether the client requires long term care, wherein determining the values for the plurality of states of the client comprises considering covariances between the plurality of states; and for each of the plurality of time points, calculating the value of the at least one financial variable selected from the group consisting of a stock market value, an interest rate and an inflation rate based on the at least one state of the client, the economic data and the regulation data; and display a second topographical chart on a user interface, wherein the second topographical chart is positioned on a plane shown in the user interface, wherein the plane is defined by a time axis and a value axis for the at least one financial variable, such that a coordinate set on the plane represents the value of the at least one financial variable at a time point, and wherein a height of a first point on the topographical chart corresponding to the coordinate set indicates a portion of the additional simulations that result in the coordinate set.

* * * * *